April 14, 1959 F. P. GOHOREL 2,882,343

AUTOMATIC TELEPHONE SYSTEMS

Filed June 10, 1953 15 Sheets-Sheet 1

Inventor
FERNAND P. GOHOREL

By Robert Harding Jr.
Attorney

April 14, 1959 F. P. GOHOREL 2,882,343

AUTOMATIC TELEPHONE SYSTEMS

Filed June 10, 1953 15 Sheets-Sheet 2

Inventor
FERNAND P. GOHOREL

By Robert Harding Jr.
Attorney

April 14, 1959 F. P. GOHOREL 2,882,343

AUTOMATIC TELEPHONE SYSTEMS

Filed June 10, 1953 15 Sheets-Sheet 3

Inventor
FERNAND P. GOHOREL

By Robert Harding Jr.
Attorney

April 14, 1959 F. P. GOHOREL 2,882,343

AUTOMATIC TELEPHONE SYSTEMS

Filed June 10, 1953 15 Sheets-Sheet 4

Inventor
FERNAND P. GOHOREL

By Robert Harding Jr.
Attorney

April 14, 1959 F. P. GOHOREL 2,882,343

AUTOMATIC TELEPHONE SYSTEMS

Filed June 10, 1953 15 Sheets-Sheet 7

Inventor
FERNAND P. GOHOREL

By [signature]
Attorney

Inventor
FERNAND P. GOHOREL
By [signature]
Attorney

AUTOMATIC TELEPHONE SYSTEMS

Filed June 10, 1953 15 Sheets-Sheet 9

Inventor
FERNAND P. GOHOREL
By Robert Harding Jr.
Attorney

AUTOMATIC TELEPHONE SYSTEMS

Filed June 10, 1953 15 Sheets-Sheet 10

Inventor
FERNAND P. GOHOREL

By Robert Harding Jr.
Attorney

Inventor
FERNAND P. GOHOREL
By Robert Harding Jr.
Attorney

Inventor
FERNAND P. GOHOREL
By Robert Harding Jr.
Attorney

AUTOMATIC TELEPHONE SYSTEMS

Filed June 10, 1953 15 Sheets-Sheet 13

*Inventor*
FERNAND P. GOHOREL
*By* [signature]
*Attorney*

Inventor
FERNAND P. GOHOREL

By Robert Harding Jr.
Attorney 2,882,343

AUTOMATIC TELEPHONE SYSTEMS

Fernand Pierre Gohorel, Antony, France, assignor to International Standard Electric Corporation, New York, N.Y., a corporation of Delaware Application June 10, 1953, Serial No. 360,679

Claims priority, application France June 18, 1952

13 Claims. (Cl. 179—18)

The present invention refers to automatic telephone systems wherein common members are used to control the operation of the finders and selectors. It describes specific arrangements intended to obtain better use of said members, which allows reducing the number thereof and reducing also the cost of an installation.

One of the features of the invention resides in a control device for finders or selectors, consisting of a combination of three means:

(*a*) A "connector" intended to establish a connection between any one of the finders or selectors of a group and the other control means;

(*b*) An "impulse-receiver" to receive the impulses required for the selection of the called line;

(*c*) A "tester" designed to choose the line in accordance with the impulses supplied by the receiver and to control the connection of the finder or selector to the line chosen, these means remaining locked for different periods of time, so that a tester can be provided having access to a plurality of impulse-receivers and an impulse-receiver having access to a plurality of connectors.

In U.S. application, Serial No. 279,624, filed March 31, 1952, for "Automatic Telephone Systems," now U.S. Patent 2,761,907, a system using cross-bar switches is described wherein the subscribers of an exchange are divided up into a number of groups, two switch groups being provided to establish the connections; one switch group, individual to each subscriber group, or "line-selecting means," being used, on the one hand, to connect a calling subscriber to the first selection stage and, on the other, to select the called subscriber within the group; the other switch group, common to all the subscribers of the exchange, or "group selecting means," is designed to effect the selection of the called subscriber's group within said exchange. The subscribers in a group are divided up into sub-groups; a call finder chooses the calling subscriber's sub-group, a sub-group selector performs the same functions for the called subscriber and, finally, a terminal selector chooses the subscriber within the sub-group, regardless of whether he is a calling or a called subscriber.

Another feature of the invention lies in a control device for line-selecting means, consisting of a combination of the following means:

(*a*) One connector per terminal-selector group to connect one of said selectors to a particular tester or marker, in order to choose the called line or to hunt for the calling line, within a subscriber sub-group;

(*b*) One connector for the group of sub-group selectors and call finders of one and the same section, that is to say, having access to the same terminal selectors, said connector connecting these sub-group selectors, on the one hand, to an impulse-receiver and, on the other hand, to the marker serving said terminal selectors;

(*c*) One impulse-receiver, associated with said sub-group selector connector, which receives the portion of the call number used for selecting the called subscriber within his group;

(*d*) One marker common to a plurality of terminal selector sub-groups, as also to the call finders and selectors of sub-groups having access to said terminal selectors.

Another feature of the invention lies in the fact that when a sub-group selector is seized to route the call towards a called subscriber, the connector assigned to the group comprising this selector proceeds to hunt for said selector in order to connect it to an impulse-receiver, said impulse-receiver then receiving the portion of the call number characterizing the called subscriber within his group, then connecting itself to the marker only when the reception of said called number has ended.

Another feature of the invention lies in the fact that the selectors used as cooperating selectors and hence connected to the banks of the sub-group selectors are also directly accessible to the selectors of the preceding stage and can thus be used as regular sub-group selectors, their grouping on the banks of the preceding selectors being so effected that they will be chosen last by said selectors, priority thus being given to the regular sub-group selectors.

Another feature of the invention lies in temporarily establishing a circuit between the calling line's equipment and the call finder's outlet across the terminal-selector connector, the marker and the call-finder connector, said circuit being designed to send to the register various indications individual to the calling line, such as the class of service to which the calling subscriber is entitled and whether he is a single or a party-line subscriber.

Another feature of the invention lies in arrangements in the marker for testing the subscriber line and for marking it busy before establishing the connection across the various switches of the line-selecting means, this busying being effected without acting upon the cut-off relay and hence without breaking the circuit controlling the hunting for the calling subscriber, by using a special potential different from the normal line-busying potential, said special potential allowing the operation of the test relays but preventing that of the cut-off relay, this relay operating only after the connection of the terminal selector to the called subscriber.

Another feature of the invention is a subscriber-line testing device included in the marker and consisting of the following combination:

(*a*) A high-resistance relay connected to the subscriber's test wire and showing whether the subscriber is free or busy;

(*b*) A low-resistance relay connected by the preceding one to said test wire, if the subscriber is free, in order to mark said subscriber as busy and show whether he is not being tested simultaneously by two markers (double test);

(*c*) A time device, placed in service at the same time as the preceding relay, which, in case the subscriber is tested simultaneously by two markers, operates after a predetermined period of time, but quicker in one of the two markers, and cuts out the low-resistance relay, thus allowing the second marker to test alone the line of said subscriber, the second marker controlling the connection of the various switches to the called subscriber, the first marker releasing all the members of the associated chain.

Another feature of the invention lies in an arrangement according to which the tester normally tests in a given order the lines of a group corresponding to the selective combination received by the impulse-receiver but can test these same lines in a different order if the selective combination is modified, which makes it possible, if the call could not be routed through a first chain of members, to release the chain of members seized and to choose some other chain.

Another feature of the invention lies in the use of a selective combination consisting of a plurality of code elements and allowing the tester to test the lines of the corresponding group in a given order, an additional code element combined with the preceding code elements allowing the tester to test the lines of the same group but in a different order.

Another feature of the invention lies in the fact that the first selector of a group-selecting means can choose a line either directly or in combination with a second selector, depending upon the group called, the choice of a group being determined by the reception of two selective combinations, the first identifying the group chosen by the first-selector and the second identifying the group chosen by the second selector if such a selector must be used or indicating there is no second selection.

Another feature of the invention lies in the fact that the two selective combinations are received by the first-selector receiver, the first combination controlling the first selection, the second combination being retransmitted to the second selector, if such a selector must be used, or otherwise controlling the connection of the first selector to the chosen line and hence the release of all the common members used for the first selection.

Another feature of the invention is an arrangement according to which a first selector of a group-selecting means can choose a line either directly or in combination with a second selector for one and the same given called group, depending upon whether said first selector can or cannot reach directly a free line of the group dialed, the choice of a group being then determined by the reception of two selective combinations, the first indicating that the first selector must or must not make a direct selection, depending upon the busy condition of the direct access paths to the group involved, the second selective combination characterizing the group called.

Another feature of the invention lies in the fact that the two selective combinations are received by the first-selector impulse-receiver, the second combination controlling the first selection, the first combination placing the impulse-receiver in a particular position so that:

(*a*) In case of the choice of a direct access to a group dialed, said impulse-receiver will immediately control the connection in the first selector;

(*b*) In the case of the choice of a line to a second selector, the impulse-receiver will retransmit the second combination to said second selector.

Another feature of the invention lies in the possibility of using the two different selection methods for one and the same impulse-receiver and one and the same first-selector marker, one of the methods using only the first selector for a given group and the other using only the first selector if said selector has free access paths to the group dialed.

Various other features will appear from the description that follows, given as a non-limitative example, with reference to the drawing, wherein.

Figure 1:
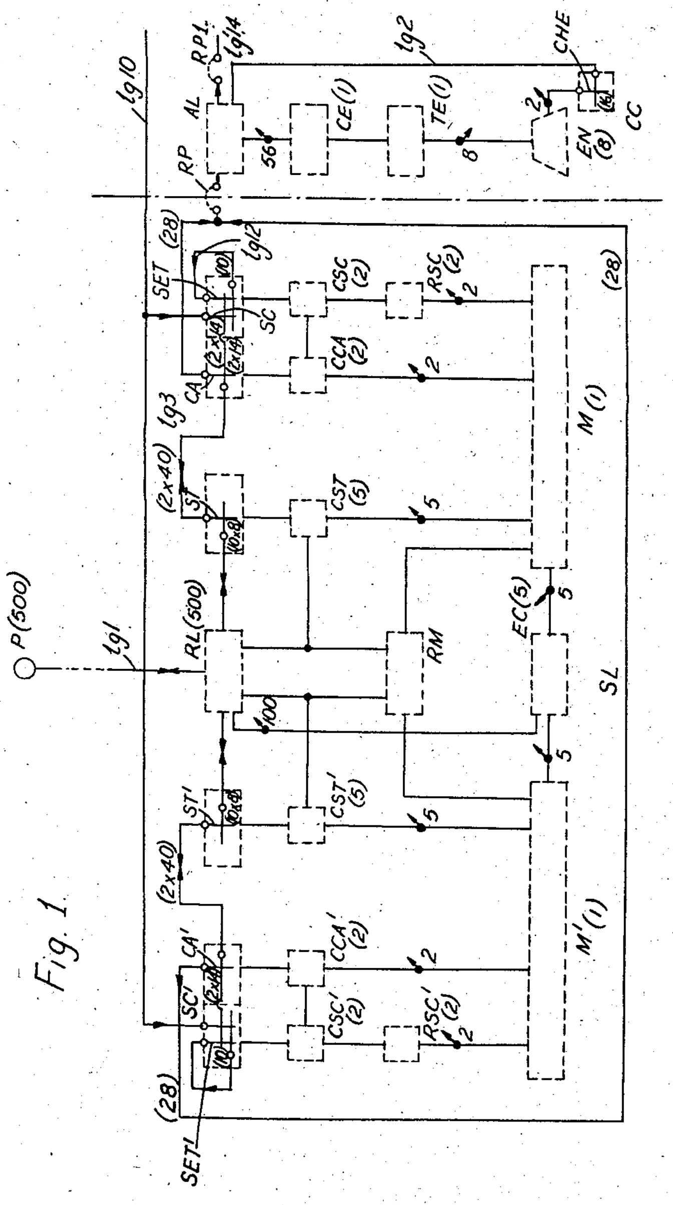
Fig. 1 shows the wiring diagram of the line-selecting means, of the feeders and of the associated registers.

The general operation of the system will now be explained with reference to the diagrams of Figs. 1 and 2.

It will be assumed throughout what follows that the switches used for establishing a connection are cross-bar switches or multi-connectors of a known type comprising a certain number of individual switches giving access in common to the same outgoing lines. The selection of a given outgoing line is effected by means of members called selection bars. Each of these bars is associated with two selecting electromagnets and can take two operative positions, depending upon the magnet energized. On taking one of these positions, said bar prepares the connection of two lines to two series of connecting bars. The choice of one of these two series is performed by one or the other of the positions taken by a supplementary connecting bar, according to a known principle. In the example described, 13 selecting bars have been provided, without counting the supplementary bar, that is, 26 selecting magnets; one thus obtains two series of 26 lines, or a total of 52 lines. The choice of one series of 26 lines is effected by one of the two magnets associated with the supplementary bar, the choice of the line in the series being effected by one of the 26 above-mentioned selecting magnets.

The selecting magnets only prepare the connection of an individual switch to a line, said connection being caused by an operating or connecting magnet individual to each individual switch. The connection is maintained as long as this magnet remains energized, regardless of the position of the selecting magnet that has prepared the connection. In the descriptions that follow, it will be assumed that each multi-connector comprises 17 individual switches; the first 15 or 16 switches are used to establish the connections, the last switch or the last two switches being provided to ensure the connection of one of the first 15 or 16 switches to a common control member.

Of course, it is possible to dispense with the use of the supplementary selecting bar for the choosing of one series of lines; in that case, only one out of the 26 lines is chosen, but each line will comprise twice as many wires (10 instead of the 5 in the example described).

The supplementary selecting bar will operate like the other bars and will allow selecting two other lines, namely, 26+2=28 lines all told.

Figure 2:
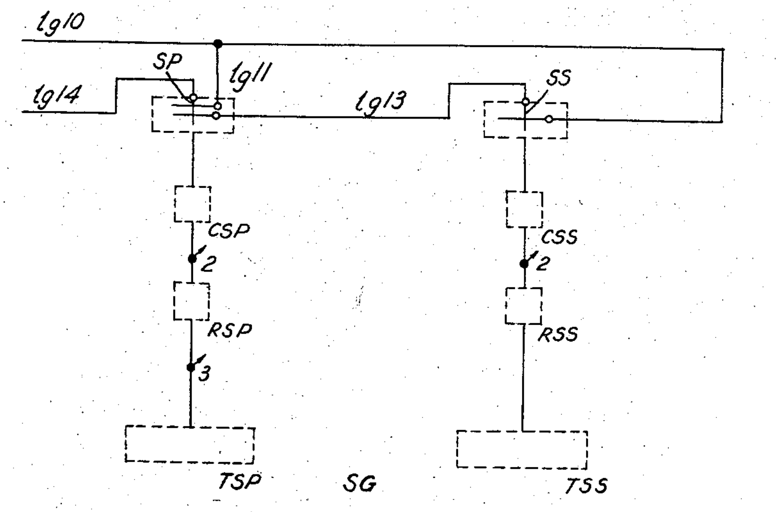
Fig. 2 shows the wiring diagram of the group-selecting means.

In Figs. 1 and 2, these multi-connectors are represented schematically by fine lines perpendicular to each other and enclosed in dotted-line rectangles. Each vertical line represents an individual switch used as a finder or as a selector having access to a certain number of outgoing lines (28 or 52, depending upon the case), each outgoing line being represented by a horizontal line. The various individual switches of one and the same multi-connector generally give access to the same outgoing line, that is, they constitute one and the same "section" of switches. In certain cases, the individual switches of a plurality of multi-connectors will be grouped together in order to constitute one and the same section.

It will be assumed throughout what follows that the automatic switchboard involved comprises 10,000 subscribers, divided into groups of 500 each. The diagrams of Figs. 1 and 2 comprise three distinctly different parts:

(1) One group-selecting means SG (Fig. 2) designed to effect the selection of a given group of 500 lines within the automatic switchboard;

(2) One line-selecting means SL (Fig. 1) designed to effect, on the one hand, the selection of a given subscriber line in a 500-line group and to connect, on the other hand, a calling subscriber to the selection stages;

(3) A means CC designed to effect the connection between the hunting members and the selecting members and consisting essentially of feeders AL, registers EN, cross-bar switches CHE and associated control members CE and TE (throughout what follows, feeder will be used to designate the assembly of members connecting the finders and connectors and comprising arrangements for supplying the calling and the called subscribers).

The 500 subscribers P of a group each have a line *lg*1 terminating at the exchange in an equipment RL individual to said line (subscriber line relay). To connect a calling line *lg*1 to a feeder AL, two identical chains of members have been provided, one shown in the right-hand portion of Fig. 1 and the other in the left-hand portion of the same figure. The first of these two chains comprises terminal selectors ST and call finders CA; the second chain comprises terminal selectors ST′ and call finders CA′. In the example described, the 500 subscribers served by line-selecting means SL are divided up into 10 fifties, each fifty being served by 8 terminal selectors ST. The second chain being identical with the first, there are likewise 8 terminal selectors ST′ to serve each fifty, which gives a total, for the 500 subscribers of the group, of 8×10=80 terminal selectors ST and 8×10=80 terminal selectors ST′.

The first chain comprises 28 call finders CA. Each of said finders has 52 outgoing lines, as follows from the explanations given at the beginning of this description, but only 40 out of these 52 lines are used. The 28 call finders CA are divided into two groups or "sections" of 14 finders each, the finders of one and the same section having their outgoing lines of the same position multipled. The 40 outgoing lines of the first section of call finders CA are divided up into 10 groups of 4 lines each, the 4 lines of one and the same group being connected respectively to the 4 terminal selectors ST serving the same fifty subscribers. Likewise, the 40 outgoing lines of the second section of call finders CA are divided up into 10 groups of 4 lines each, the 4 lines of one and the same group being connected respectively to the other 4 terminal selectors ST serving the same fifty subscribers. The call finders CA′ of the second chain are arranged in identical fashion. Therefore, all told, there are 28+28=56 call finders for line-selecting means SL.

Call finders CA and CA′ are connected, through distributor RP, to feeders AL. Each feeder AL gives access to a certain number of registers EN through register finders CHE. In the example described it has been assumed that the assembly designated by CC in the diagram comprised 56 feeders AL and 8 registers EN. However, the 56 feeders AL are connected, across distributor RP, to call finders CA, CA′ belonging to different line-selecting means SL, so that one and the same group of 8 registers EN can be reached by a plurality of different 500-subscriber groups.

Each register EN can be associated with two finders CHE each serving 28 lines *lg*2 terminating at feeders AL; each register EN thus serves a total of 28×2=56 feeders. The 16 finders CHE are grouped together in a single multi-connector. Register No. 1 is associated with finders Nos. 1 and 9, register No. 2 is associated with finders Nos. 2 and 10, . . . register No. 8 is associated with finders Nos. 8 and 16. The various finders Nos. 1 to 8 are used by the registers to reach the first 28 feeders AL of the group of 56; finders Nos. 9 to 19 are used by the registers to reach the last 28 finders of the group of 56. Finders Nos. 1 to 8 therefore give access to the same feeders and form a first section; finders Nos. 9 to 16 give access in common to the other feeders and form a second section. The preceding arrangements result from the fact that the connecting lines *lg*2 between the registers and the finders are lines comprising more than 5 wires; under these conditions, the supplementary selecting bar is not used; the lines outgoing from the multi-connector comprise 10 wires each, but there are only 28 outgoing lines, as follows from the explanations given at the beginning of the description.

The sole purpose of terminal selectors ST, call finders CA and register finders CHE is to ensure the connection of a calling subscriber P to a register EN; the positioning of these various switches is ensured by means of a certain number of common members that will now be described. The 16 terminal selectors ST of one and the same multi-connector, which are designed in addition to serve one and the same fifty, have access to one and the same common member CST, called terminal-selector connector. Since there are 80 selectors ST, 5 connectors CST have been provided to serve said selectors. Likewise, the 28 call finders CA are divided up into two multi-connectors each comprising the 14 finders of one and the same section, the finders of one and the same multi-connector being served by a common member CCA called call-finder connector. There are therefore two connectors CCA for the 28 call finders CA.

The five terminal-selector connectors CST and the two call-finder connectors CCA are served in turn by a single marker M. The essential role of connectors CST and CCA is to connect terminal selectors ST and call finders CA to marker M; the fundamental role in the hunting for the calling line is played by said marker, which receives the various indications relative to the subscriber's place in the 500-subscriber group and then controls the position of a call finder CA and of a terminal selector ST.

The chain of members ST′ and CA′ shown in the left-hand portion of Fig. 2 is controlled by common members CCA′, CST′ and M′ in the same manner as the other chain. There is therefore a total of two markers M and M′ to serve all the calls coming from the 500 subscribers in the group involved.

The positioning of register finders CHE is likewise controlled by two common members CE and TE. The essential function of the first one of them, that is, register connector CE, is to hunt for a calling feeder AL and to connect said feeder to register tester TE. Tester TE is designed to hunt for a free register EN among the 8 registers of group CC and to control the connection of the chosen register EN to the calling feeder AL through a finder CE.

Equipment EC is common to 100-subscriber line relays; there are therefore 5 equipments EC for line-selecting means SL. The 5 equipments EC are connected on the one hand to marker M and on the other hand to marker M′. The essential role of equipment EC is to receive a call coming from a subscriber and to cause the seizure of the two markers M and M'.

The various members used to route the call from a feeder AL up to a called subscriber P will now be described. The selection of a group of 500 lines within an exchange is effected by means of group-selecting means SG (Fig. 2). This means comprises two selection stages; the first stage consists of first selector SP and the associated common members CSP, RSP and TSP; the second stage consists of second selector SS and the associated common members CSS, RSS and TSS. Line *lg*14 incoming into the selector is connected to a feeder AL through a distributor RP1. Each selector SP gives access to 52 outgoing lines, as follows from the explanations given at the beginning of the description, but only 50 out of these 52 lines are used for the normal routing of calls, the last two being reserved for tests or any other desirable purpose. Likewise, each second selector SS gives access to 52 outgoing lines, only 50 of which are used for the routing of calls. The assembly constituted by first selector SP and second selector SS thus allows making a selection from among 50×50=2500 lines. The 50 lines outgoing from the banks of first selector SP are divided up into a certain number of groups, the number of which may vary from 2 to 5, depending upon the case; on the other hand, the lines outgoing from second selector SS are always divided up into 10 groups of 5 lines each. The assembly consisting of the the first selector and the second selector therefore allows making a selection from among a number of groups that can vary from 2×10=20 to 5×10=50. Lines *lg*10 of the 20 first groups are connected respectively to the 20 line-selecting means SL and correspond to local traffic; the other lines, which have not been shown in order not to complicate the drawing, correspond to outgoing traffic.

First selector SP and second selector SS are intended only to ensure the connection between feeder AL and a line-selecting means SL; the positioning of said selectors is controlled by a certain number of common members. The 15 first selectors SP of one and the same multi-connector are served by one and the same connector CSP, the essential function of said connector being to hunt for the selector SP seized and to connect said selector to an available impulse-receiver RSP. In the example shown, one impulse-receiver RSP corresponds to two connectors CSP, that is, to two multi-connectors. The essential function of impulse-receiver RSP is to receive the portion of the call number used for positioning first selector SP. A tester TSP, common to a certain number of impulse-receivers (three in the example described), is provided for testing a free line in the group corresponding to the call number received by RSP.

The means provided for controlling the positioning of a first selector SP are therefore distributed among a plurality of different members; the inoperative periods of these members not being the same, neither is the number of them.

Likewise, second selector SS comprises common control members, namely, one connector CSS, one impulse-receiver RSS and one tester TSS, arranged similarly to connector CSP, impulse-receiver RSP and tester TSP. In the example described it has been assumed that there was only one tester TSS for each impulse-receiver RSS.

Second selector SS is not used in certain cases; selector SP is then connected directly to line-selecting means SL over a line *lg*11.

Lines *lg*10 outgoing from group-selecting means SG terminate, in line-selecting means SL, partly at fifties selectors SC and partly at fifties selectors SC'. Each fifties selector SC gives access to 52 outgoing lines, but only 40 out of these 52 lines are used for the normal routing of calls. There are 28 fifties selectors SC, which are divided up into two groups or sections of 14 selectors each, the selectors of one and the same group having their outgoing lines of the same position multipled. The 40 outgoing lines of the first group of fifties selectors SC are divided up into 10 groups of 4 lines each, the four lines of one and the same group being connected respectively to 4 terminal selectors ST serving one and the same fifty subscribers. Likewise, the 40 outgoing lines of the second section of fifties selectors SC are divided up into 10 groups of 4 lines each, the 4 lines of one and the same group being connected respectively to the other 4 terminal selectors ST serving the same fifty subscribers. From the preceding explanations it follows that the lines outgoing from the fifties selectors are arranged in the same manner as the lines outgoing from call finders CA and hence serving the same terminal selectors ST. Fifties selectors SC' are arranged in identical fashion. There are, therefore, all told, 28+28=56 fifties selectors for line-selecting means SL.

As has been indicated, 40 out of the 52 lines outgoing from fifties selectors SC are used for the normal routing of the calls. Out of the 12 remaining lines, 10 are used as cooperating lines *lg*12 in the case where the fifties selector gives access to no free line to the terminal selector serving the 50-subscriber group comprising the called subscriber. These 10 lines terminate at cooperating selectors SET which allow reaching free terminal selectors connected to the other section of fifties selectors. From the preceding explanations it follows that each section of fifties selectors can have access, in a 50-subscriber group, to 4 terminal selectors directly and to 3×4=12 terminal selectors through the medium of cooperating lines.

In order not to complicate the drawing, it has been assumed that cooperating lines *lg*12 outgoing from fifties selectors SC terminated only at selectors SET belonging to the chain of members controlled by marker M, but in fact they are also connected to cooperating selectors belonging to the chain of members controlled by marker M'. Likewise, certain cooperating lines outgoing from fifties selectors SC' are connected to selectors SET belonging to the chain of members controlled by marker M.

The operation of fifties selectors SC is controlled by means of a certain number of common members. The 14 fifties selectors SC of one and the same section have access, through a connector CSC, to an impulse-receiver RSC. Thus, two connectors CSC and two impulse-receivers RSC are obtained for fifties selectors SC. The essential function of a connector CSC is to hunt for a calling SC fifties selector and to connect said selector to impulse-receiver RSC. Impulse-receiver RSC receives from the register the portion of the call number used to effect the selection within the 500-line group. The two impulse-receivers RSC have access in common to one and the same marker M, the purpose of said marker being to choose, on the banks of selector SC, a free line in the group of lines corresponding to the call number received by RSC. The operation of fifties selector SC' is controlled by common members CSC', and RSC' and M', which are arranged in the same manner as CSC, RSC and M.

A marking distributor RM, common to the 500 subscribers served by line-selecting means SL, is connected on the one hand to markers M, M' and on the other hand to terminal-selector connectors CST, CST'. Its role consists in receiving from one of the two markers M or M' the portion of the call number characterizing the called subscriber in the 500-subscriber group and to determine the place of said subscriber on the banks of the various switches SC and ST.

The operation of the various members shown in the diagrams of Figs. 1 and 2 will now be described and the case of the routing of a call from a subscriber P up to a register EN will be discussed first. When a subscriber P removes his impulse-receiver, his call is registered by the equipment of line relay RL individual to him. The call is then sent to common equipment EC, which causes the seizure of two markers M and M'. At the same time, the equipment of line relay RL transmits to the terminal-selector connectors CST, CST′ serving the calling fifties two indications, the first concerning the position of the subscriber in the fifties and the second the position of the fifties in the 500-subscriber group served by one and the same line-selecting means SL. Connectors CST stores the first of these two indications, which will be used subsequently, but sends the second to marker M. The same applies to connector CST′.

Marker M then chooses a connector CCA corresponding to a section of call finders giving access to at least one free ST terminal selector capable of serving the calling fifties and then transmits to said connector CCA the indication corresponding to the position of the fifties comprising the calling subscriber. It thereupon selects a free line from among the 4 lines *lg*3 serving the called fifties and transmits to connector CCA an indication relative to the position of that line among the four. Call-finder connector CCA and terminal-selector connector CST have therefore registered all the indications that will subsequently allow the positioning of call finder CA and terminal selector ST.

Marker M then chooses in the section involved an available call finder having access to a free register. Register connector CE then chooses a feeder AL, from among the various feeders that can be simultaneously in call position, and connects said feeder to register tester TE. This latter then chooses a finder CHE that on the one hand is associated with a free register EN and that on the other hand can give access to the group of 28 feeders comprising the calling feeder. It thereupon causes the connection of said finder CHE to said calling feeder.

As has been indicated, marker M′ has been seized at the same time as marker M; operations identical with those that have just been described occur then in the chain of members controlled by marker M′. If the operations of hunting for the calling line are completed simultaneously by members of the two chains, arrangements (double test) are provided to eliminate one of the chains. It will be assumed throughout what follows that only the chain shown to the right in Fig. 1 remains in service. Marker M then controls the connetion of call finder CA to line *lg*3 and the connection of terminal selector ST to the equipment of the calling RL line relay. Calling subscriber P is then connected to register EN over the following circuit: subscriber P, line *lg*1, equipment of line relay RL, terminal selector ST, line *lg*3, call finder CA, distributor RP, feeder AL, line *lg*2, finder CHE, register EN. The various common members used for hunting for the calling line, namely, common equipment EC, marker M, terminal-selector connector CST and call-finder connector CCA, are then released and ready to be used for hunting for another calling line.

The case of the routing of a call from register EN up to a called subscriber P will now be discussed. When the calling subscriber has been connected to a feeder AL and to a register EN, first selector SP (Fig. 2) associated with feeder AL is seized. First-selector connector CSP chooses a selector SP from among the selectors that can be seized simultaneously. It will be assumed that the selector SP chosen is the one connected to the calling subscriber. Connector CSP then connects selector SP to the impulse-receiver RSP to which it has access, provided said impulse-receiver is available. Otherwise, this connection will be postponed until said impulse-receiver becomes available. Since the inoperative period of receiver RSP for the routing of a call is very short, the connection will never be postponed for a very long time. Impulse-receiver RSP then sends to register EN an "invitation to transmit" signal, said register then transmitting to impulse-receiver RSP the digits that will be used for positioning selectors SP and SS. The digit used for positioning selector SS should in effect be received by the members controlling the operation of selector SP, and said members should choose a second selector SS that is available and has access to at least one free line in the group dialed. The digits are sent out by register EN in the form of codes constituted by polarities or combinations of polarities.

When the reception of the first two codes in inpulse-receiver RSP has ended, said impulse-receiver is connected to tester TSP, if it is available. If the tester is busy, the connection will be postponed, as has previously been explained. Tester TSP then chooses a line *lg*13 terminating at a second selector SS that is available and has access to at least one free *lg*10 line in the group dialed, and then sends to connector CSP an indication relative to the place of the chosen line on the banks of selector SP.

The second selector SS thus chosen is then seized. Connector CSS proceeds to hunt for the SS selector seized and connects said selector to impulse-receiver RSS, if the latter is available, and to the associated TSS tester. The code that is to be used for positioning selector SS is then sent from impulse-receiver RSP to impulse-receiver RSS. When the reception of the code in impulse-receiver RSS has endeed, tester TSS selects a free *lg*10 outgoing line from among the various lines corresponding to the call number dialed and then sends to connector CSS an indication relative to the place of the chosen line on the banks of second selector SS. Impulse-receiver RSS then sends impulse-receiver RSP a signal indicating that the selection of an *lg*10 line has been completed. Impulse-receiver RSP then simultaneously controls the connection of selector SP to line *lg*13 and the connection of selector SS to line *lg*10. The various members used for controlling the operation of first selector SP and of second selector SS are then released and ready to be used for the routing of another call. Feeder AL is then connected to a fifties connector SC over the following circuit: feeder AL (Fig. 1), distributer RP1, line *lg*14 (Fig. 2), first selector SP, line *lg*13, second selector SS, line *lg*10 and fifties selector SC.

The fifties selector SC (Fig. 1) connected to line *lg*10 is then placed in seizure position. Connector CSC proceeds to hunt for said selector SC and connects it to impulse-receiver RSC. As in the preceding case, impulse-receiver RSC sends register EN an "invitation to transmit" signal, said register then transmitting to impulse-receiver RSC the last three digits of the called subscriber's number, always in the form of polarities or combinations of polarities. When the reception of these digits in impulse-receiver RSC has ended, said impulse-receiver is connected to marker M, if this latter is available, the connection being otherwise postponed, as has already been indicated. The three digits registered in impulse-receiver RSC are sent to the marker and from there to marking distributor RM. Said distributor analyzes the three digits received, it deduces therefrom an indication relative to the place occupied by the called subscriber's line with respect to the selectors and sends this indication to the CST connector serving the terminal selectors of the called hundreds. Connector CST analyzes that position indication in order to deduce therefrom two other indications, the first relative to the subscriber's position in the fifties and retained in the connector, and the second relative to the position of the fifties in the group and transmitted to the marker. As follows from the preceding explanations, distributor RM therefore allows assigning to a subscriber having a given call number an arbitrary position with respect to the selectors.

Marker M sends connector CSC the indication relative to the position of the fifties and then chooses, from among the 4 lines serving that fifties group, an *lg*3 line terminating at a free ST terminal selector. The marker thereupon sends said connector CSC an indication relative to the position of the chosen *lg*3 line among the 4 lines.

Connector CST and marker M then test the called line. If that line is free, it controls the connection of fifties selector SC to line *lg*3 and the connection of terminal selector ST to the equipment of line relay RL of the called subscriber. Feeder AL is then connected to called subscriber P over the following circuit; feeder AL, distributor RP1 (Fig. 2), line *lg*14, first selector SP, line *lg*13, second selector SS, line *lg*10 (Fig. 1), fifties selector SC, line *lg*3, terminal selector ST, equipment of line relay RL, line *lg*1, called subscriber P. Marker M, impulse-receiver RSC, connector CSC and connector CST are then released.

It may happen that the 4 lines outgoing from selector SC and serving the called fifties are all busy; there may be free lines in the other sections of fifties selectors and it may be necessary to hunt for such a line. The busy condition of all the *lg*3 lines of one section, for a given fifties, is revealed by terminal-selector connector CST, which sends an appropriate indication to marker M. This latter then proceeds to hunt for a free line among the ten *lg*12 lines terminating at cooperating selectors SET and then immediately controls the connection of fifties selector SC to the chosen SET cooperating selector. Thereupon, the digits registered in impulse-receiver RSC are sent to the impulse-receiver that controls the SET cooperating selector chosen (this impulse-receiver is not shown, in order not to complicate the drawing). Marker M, impulse-receiver RSC and connectors CSC and CST are then released. The routing of the call from cooperating selector SET to called subscriber P is then effected following the same method as for the routing of a call from fifties selector SC to a subscriber P.

If the called subscriber is busy, this busy condition is revealed by connector CST, which transmits an appropriate indication to marker M and from there to impulse-receiver RSC. Said impulse-receiver then sends a signal to register EN, this latter releasing the whole chain of members seized, with the exception of the equipment of line relay RL of the calling subscriber. The sending of the busy tone is effected from said equipment.

If the called subscriber's line is tested simultaneously by the two markers M and M' (double test), only one chain of members, corresponding to one of the markers, remains seized, the other chain being eliminated. It will be assumed that the chain under consideration is the one eliminated. Marker M then sends an appropriate indication to impulse-receiver RSC, which itself sends a signal to register EN. This latter releases the whole chain of members seized, as in the preceding case.

Second selector SS (Fig. 2) is not used in certain cases; first tester TSP selects an *lg*11 outgoing line terminating directly at line-selecting means SL without passing through a second selector SS and then also controls the connection of first selector SP to line *lg*11. The various common members used for controlling the selection are thereupon released.

An embodiment example will now be given with reference to Figs. 3 to 12 and the detailed operations involved in the routing of a local call will be described.

In the descriptions that follow the contacts associated with the relays or magnets are designated by the same letter or the same group of letters as the relay or the magnet, followed by one of the references 1 to 9. Small letters have been used only to reference said contacts.

Only the circuit elements required for an understanding of the invention are shown in the schematics. For example, certain relay assemblies are connected up in a "chain," that is to say, they are so arranged that they cannot be energized simultaneously; the details of these chain circuits are not shown.

In order to simplify the drawing, not all the similar members or circuits are shown but only one member or circuit of each kind, their number being shown in parentheses. For instance, when there are 4 test relays, only one is shown.

Individual members have been separated from common members by dots and dashes. The same applies to the various common members.

It will be assumed to begin with that the various selectors and finders used for the routing of the calls, as also the associated common members, are available. Under these conditions all the relays and magnets shown in Figs. 3 to 12 are unoperated, with the exception of relay *etg* of the register tester (Fig. 8). In fact, if there is at least one available register among the 8 registers to which this tester has access, one back contact *u*5 at least will be closed. Relay *etg* has 56 contacts such as *etg*1, which are connected respectively to chain wires *ch* of the 56 feeders served by the 8 registers involved. The grounding of a chain wire *ch* in a feeder thus indicates that said feeder can have access to at least one available register. Each feeder AL is associated with a call finder CA (Fig. 6). The 14 wires *ch* corresponding to the call finders of one and the same section are all multiplied to one and the same wire 535, the grounding of wire 535 thus indicating that in the call-finder section involved at least one of them corresponds to a feeder capable of having access to an available register.

When the calling subscriber P removes his impulse-receiver (Figs. 3, 4 and 5), the following circuit is completed: battery, lower winding of relay *la*, back *lc*1, line wire *a*, subscriber's loop, line wire *b*, back *lc*2, ground. Relay *la* energizes.

Over its front *la*2 it completes the energizing circuit of relay *lp* common to 100 subscribers: battery, relay *lp*, wire 301 multiplied to 100 subscriber lines, back *lc*3, front *la*2, ground. This relay *lp* that energizes is the relay of the equipment common to a group of 100 subscribers. This relay *lp* will remain energized as long as there is an unattended call in the hundreds group served by it. As has already been explained, there are 5 common equipments EC to which the two markers M and M' have access. In fact, the two markers M and M' are seized at the same time and both start hunting for calls. It is to be noted that the hunting circuits thus completed from the two markers are strictly identical. Throughout what follows the operations described will be those of marker M.

Over its front *lp*1 relay *lp* of the equipment common to 100 subscribers completes the energizing circuit of relay *maa* of marker M: battery, right-hand winding of relay *maa*, back *mld*1 and *mab*1, wire 401 multiplied to the 5 common equipments EC, front *lp*1, ground. Over its front *lp*2 relay *lp* completes a circuit for relay *maa* of the second marker M'; from this moment onward identical operations will occur in both markers. Over its front *lp*3 it prepares a circuit that will allow registering in terminal-selector connector CST the position of the subscriber in the calling fifties. Over its front *lp*5 it prepares an identical circuit for the second marker.

Relay *maa* of marker M energizes, indicating to said marker M that one or more subscribers among the 500 are calling. Over its front *maa*1 relay *maa* completes the circuit of relay *mab*, but since this latter is shunted by a large-capacity condenser, the condenser starts to charge and relay *mab* does not energize at the instant involved. Over its front *maa*2 it short-circuits its second winding, the effect of which will be to make the relay slow to release. Over its front *maa*3 relay *maa* completes the following circuit: battery, winding of relay *mp*, back *mja*4, *mjd*3, *mba*1, *mjd*2, *mba'*1, *mja*3, *mp*1, resistance *Re*51, winding of relay *mac*, front *maa*3, ground.

Relays *mac* and *mp* energize in series. Over its front *mac*1 relay *mac* ensures the continuity of the energizing circuit of relays *mp* and *mac* opened by back *mp*1 of relay *mp*. Over its front *mac*3 it completes the following energizing circuit for relays *mtg* and *mth*: battery, winding of relay *mtg*, back *mtb'''*4 . . . *mtb*4, front *mac*3, windings in series of relay *mth*, ground. Relay *mtg* will be energized by the short-circuiting of one of the windings of relay *mth*. Over its front *mac*6 it completes the energizing circuit of relay *mad*. This relay *mad* determines the seizure of marker M and allows it to perform the operations of identifying the calling fifties. Over its front *mac*7 it completes the energizing circuit of relay *mgd*: battery, relay *mgd*, front *mac*7, wire 535 grounded as has been indicated in the description. Over its front *mac*8 it completes a similar circuit for relay *mgd'*, belonging to the second section of call finders. Over its front *mac*9 it prepares the holding circuit of the test relay characterizing the call finder that must effect the connection.

Over its back *mp*2 and *mp*3 relay *mp* prevents the energization of relays *mba* and *mba'*, corresponding to the seizure of the marker by a call to a called subscriber. Over its front *mp*4 it places a ground on wire 402 which will be used to cause the energization or the holding of certain relays in the course of the operation; moreover, it causes the energization of relays *mtf* and *mja*. Over its front *mp*5 it completes the following circuit: battery, resistance R*e*41, lower winding of relay *mlb*, resistance R*e*42, front *mp*5, ground. Relay *mlb* energizes and completes the following circuit over its front *mlb*1: ground, back *mla*5, relay *mlc*, front *mlb*1, resistance R*e*43, battery. Relay *mlc* energizes.

The preliminary operations in marker M that have resulted in the seizure of said marker have been described thus far. The sequence of operations that from the marker onward will allow identifying the calling subscriber will now be described.

Upon energizing, relay *mad* prepares the energizing circuit of relay *acg* over its front *mad*1. Over its front *mad*4, *mad*5, *mad*6 it prepares the energizing circuit of test relays *mtb*, *mtb'*, *mtb''* of a call finder. Over its front *mad*2 it completes the following circuit: battery (Fig. 3), winding of relay *tca*, wire 302, resistance R*e*31, wire 303, back *lc*4, front *la*3 and *lp*3, wire 304 (Fig. 4), front *mad*2, ground. As has been indicated, contact *mad*2 is multipled to the 5 common equipments EC serving each 100 subscribers. The 100 wires 304 corresponding to the 100 subscribers served by equipment EC are divided up into 4 groups of 25 each, the 25 wires of one and the same group being all multipled to one and the same relay *tca*. There are thus obtained for the hundreds group involved 4 *tca* relays each characterizing a 25-subscriber group. The *tca* relay that is therefore going to be energized will thus determine the 25-subscriber group comprising the calling subscriber.

Over its front *tca*1 relay *tca* completes the energizing circuit of relay *mga* of marker M: battery (Fig. 4), winding of relay *mga*, wire 403, front *tca*1, ground. Over its front *tca*2 it prepares the energizing circuit of a relay *tcb* that subsequently will allow selecting the calling subscriber in the fifties group chosen.

Figure 4:
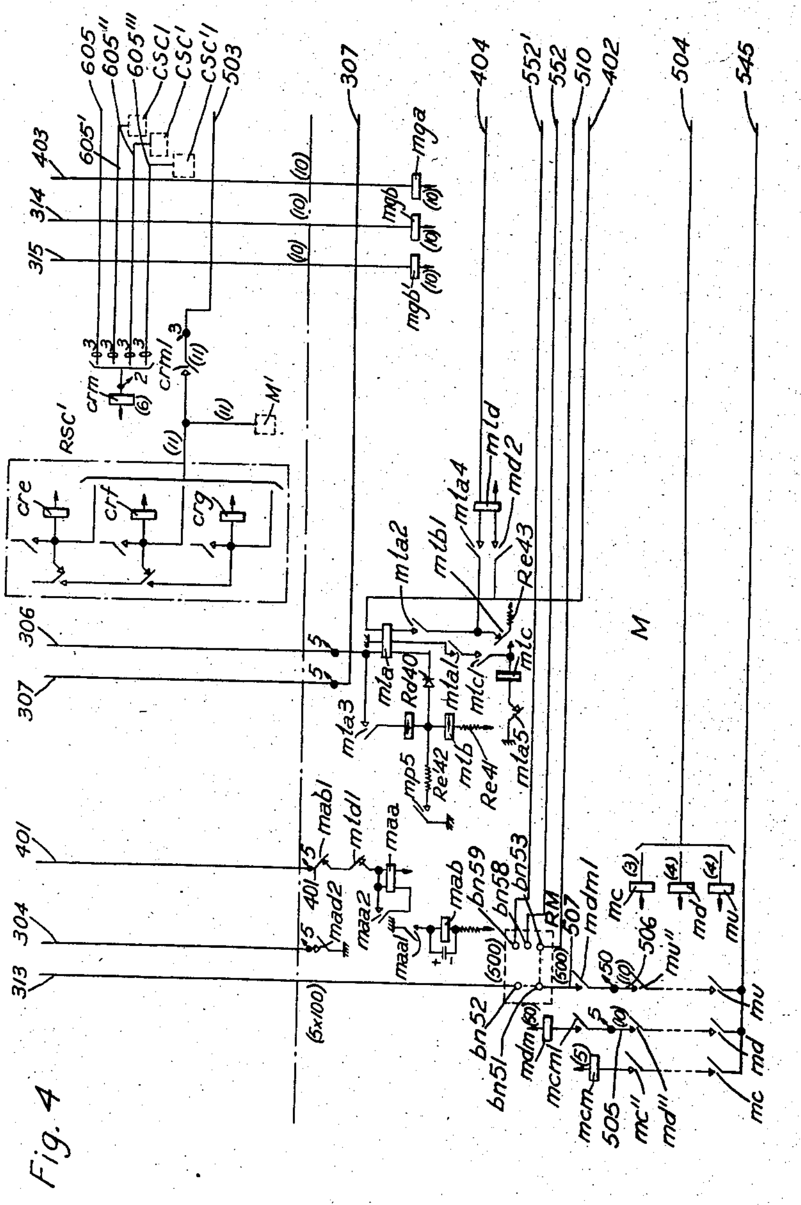
Figs. 4 and 5 show the schematics of the marker and of the impulse-receiver controlling the various switches of the line-selecting means.

The two *tca*1 contacts corresponding to two 25-subscriber groups of one and the same fifties are multipled to one and the same relay *mga* in marker M (Fig. 4). The *mga* relay energized thus indicates to the marker the position of the fifties comprising the calling subscriber. Of course, since the marker serves 10 fifties, 10 *mga* relays have been provided.

The circuit used for selecting the calling fifties will be found in the call-finder connectors CCA for each section. One of the two connectors each serving one section is first chosen.

In effect, over its front *mgd*1 relay *mgd* completes the following circuit: battery, resistance R*e*62 (Fig. 6), winding of relay *acc*, wire 528, right-hand winding of relay *mgc*, back *mgc'*1, front *mgd*1, back *mgb*1, front *mga*2, ground. Similarly, front *mgd'*1 of relay *mgd'* completes through the left-hand winding of relay *mgc'* a circuit identical with the preceding one for the second call-finder connector.

Relays *mgc* and *mgc'* comprise a second winding, which can be looped to resistances ranging in value from zero to infinity. These resistances vary cyclically and impart to the relay to which they are connected a varying degree of slowness in operating. This device has been described in the patent application filed by applicant on January 17, 1952, for "Improvements in Telephone Systems." This cyclically-given priority to one or more relays constitutes a mode of distributing the calls at random and will be found over and over again in the description of the system.

It will be assumed that relay *mgc* energizes first, giving the priority to one of the call-finder connectors.

Over its back *mgc*1 relay *mgc* opens the seizure circuit of the second call-finder connector.

Relay *acc* energizes and over its front *acc*2 it completes the following circuit characterizing the calling fifties: ground, front *mga*4 (Fig. 5), back *mgb*3, front *mgc*2, wire 526 (Fig. 6), winding of relay *ach*, front *acc*2, chain of back contacts such as *ach*1 of relay *ach*, back *acd'*1, lower winding of relay *acd*, battery.

In marker M (Fig. 5) there are 10 *mga*4 contacts each corresponding to one fifties group. The first 5 *mga*4 contacts are connected respectively over wires 526 to the 5 *ach* relays of the call-finder connector involved; the last 5 *mga*4 contacts are connected respectively to the 5 *ach'* relays of said connector. The *ach* relay operating in call-finder connector CCA thus characterizes the calling fifties group.

Over its front *acd*2 relay *acd* short-circuits relay *acc*, which releases slowly.

The following circuit is then completed: battery, relay *acg* in call-finder connector GCA (Fig. 5), wire 523, front *mad*1, wire 502, back *mcg'*1, front *mgd*1, back *mgb*1, front *mga*2, ground. Relay *acg* energizes and causes the connection of the various call-finder wires to the marker by front *acg*1, *acg*2, *acg*3, *acg*4 and *acg*5.

The selection of the calling subscriber within the fifties group will now be described.

Over its front *ach*2 relay *ach* completes the following circuit across front *acd*3 of relay *acd*: ground, front *acd*3, back *acc*1, wire 603 multipled to 10 contacts of relays *ach*, *ach'*, such as *ach*2, wire 604 (Fig. 3), front *tca*2, back *tcb'*1, lower winding of relay *tcb*, battery. A *tcb* relay energizes.

Two out of the ten 604 wires outgoing from the call-finder connector are connected to connector CST of the terminal selectors of the two fifties groups comprising the subscriber, the other 8 wires of the 604 bundle, grouped by twos, having access to the other 4 terminal-selector connectors. The arrow indicating the multipling by twos of the 604 wires is explained by the choice that is going to be made in the chosen fifties groups of a 25-subscriber sub-group.

Over its front *tcb*2 the *tcb* relay energized prepares the energizing circuit of a magnet S*t* or S*t'* and of a relay *tcd* or *tcd'*. Over its front *tcb*3 it completes the energizing circuit of magnet S*tx*, which is one of the two magnets of the subdividing bar of the switch. As has been indicated, terminal-selector connector CST serves 100 subscribers divided up into 4 groups of 25 each. Each group corresponds to a *tca* relay. The two *tca*2 contacts as well as the two *tcb* relays correspond respectively to the first and third 25-subscriber groups; the two *tca'*2 contacts and the two *tcb'* relays correspond respectively to the second and fourth 25-subscriber groups. The two *tcb*3 contacts corresponding to the first and third 25-subscriber groups are multipled to one and the same subdividing magnet S*tx*, since in the terminal selector the operations are the same regardless of whether the subscriber is comprised in the first or in the third 25-subscriber group.

Over its front *tcb*6 it completes the following circuit: battery, winding of relay *tcc*, front *tcb*6, back *tcd'*2 and *tcd*2, ground. The multipling arrows placed on either side of contact *tcb*6 are explained by the fact that there are, all told, four *tcb* relays and only one *tcc* relay. Over its front *tcb*4, relay *tcb* prepares the double-test circuit of the calling subscriber. Over its front *tcb*5 it prepares the sending of his class indication to the register.

Relay *tcc* energizes. Over its front *tcc*2 it completes the following circuit: ground, front *mad*2 in marker M, wire 304, front *lp*3 in common equipment EC, front *la*3, back *lc*4, wire 303, front *tcb*2, wire 308, selecting magnet S*t*, front *tcc*2, back *tcd'*1, upper winding of relay *tcd*, battery.

As has already been explained, there are one hundred 303 wires, which are distributed among four *tca* relays, which gives 25 wires per relay, one *tca* relay determining one 25-subscriber group.

The first thirteen 303 wires of a 25-subscriber group are connected respectively to 13 selection magnets S*t*; the next 12 are connected to 12 magnets S*t'*. The magnet S*t* operating characterizes the subscriber's position within a 25-subscriber group. Relay *tcd* energizes in series with magnet S*t*.

Over its back *tcd*2 relay *tcd* opens the energizing circuit of slow relay *tcc*, which releases. Over its front *tcd*2 is prepares the energizing circuit of magnet X*t*.

On releasing, relay *tcc*, over its back *tcc*1, completes the energizing circuit of magnet X*t*, subdividing magnets S*t* and S*tx/y* being energized: ground, front *tcd*2, back *tcc*1, front *stx*1 and *st*2, magnet X*t*, battery. The front contacts of magnet S*tx* or of magnet S*ty* are placed in parallel with the circuit of magnet X*t*, as indicated by the multipling arrows placed on either side of said contacts, the same applying to the 25 *st*2 contacts respectively associated with the 25 S*t* magnets. This allows energizing magnet X*t* regardless of the S*t* and S*tx/y* magnets that have operated.

The X*t* magnet energized is the connecting magnet of the 17th individual switch of a multi-connector. It has the function of ensuring the connection of one of the 16 other terminal selectors to the terminal-selector connector CST in service. Magnet X*t* causes the closing of the contacts of individual switch *cist* and hence the connection of connector CST to the calling subscriber. The 4 contacts *xt*1, *xt*2, *xt*3 and *xt*4 prevent breaking sparks on the contacts of cross-bar switch *cist* on the release of magnet X*t*.

It has been seen that before determining the calling fifties group and determining the calling line, the marker has chosen a call-finder group that offered at least one free call finder having access to a free register.

The marker will now proceed to select a call finder in the finder group chosen and a terminal selector serving the fifties group comprising the calling subscriber.

It has been seen in the selection of a call-finder group that relay *mth* was energized over front *mac*3 of relay *mac* over the following circuit: battery, relay *mtg*, chain of back contacts *mtb'''*4 . . . *mtb*4, front *mac*3, series windings of relay *mth*, ground. Over its front *mth*1 *mth* short-circuits its high-resistance upper winding and then allows the energization of relay *mtg*.

Moreover, relay *mad* being energized over front *mac*6 of relay *mac*, relay *mtg* completes the following circuit over its front *mtg*1: ground, front, *mad*4, wire 537, front *mtg*1, rectifier R*d*55, upper and lower series windings of relay *mtb*, wire 533 (Fig. 6), front *acg*4, back *va*3, test wire *ta* extending into the register finder (Fig. 7), back *h*1, resistance R*e* 70, wire 701, back *u*1 (Fig. 8), resistance R*e*80, battery. Parallel to this circuit and over front *mad*5 and *mtg*2, on the one hand, and over front *mad*6 and *mtg*3, on the other hand, the similar energizing circuits of test relays *mtb'* and *mtb''* are completed.

The 12 *mtb* relays as also relays *mtb'* and *mtb''*, which gives 14 test relays, take part in choosing a free call finder from among the 14 of the call-finder group previously chosen, as had already been explained. The four 537 wires issuing from contacts *mad*4 are each multipled to three *mtg*1 contacts, which gives 12 wires respectively connected to the 12 *mtb* relays, which are grouped with the wires respectively issuing from relays *mtb'* and *mtb''* in order to provide fourteen 533 wires. These fourteen 533 wires are multipled twice to give access both to the 14 finders of the first call-finder group and to the 14 finders of the second call-finder group. Register-finder connector CE having access to 56 feeders, the 701 wire terminating at these feeders is multipled 56 times. Eight contacts such as *u*1, belonging respectively to the 8 registers serving these feeders, have been provided; since it has been assumed that at least one of the registers was available, at least one of these back contacts *u*1 is closed and wire 701 is connected to the battery.

It will be assumed, by way of example, that the call finder selected corresponds to one of the 12 *mtb* relays. The *mtb* relay energized completes a holding circuit for itself over its upper winding across the ground on front *mac*9.

Over its front *mtb*4 it opens the energizing circuit of relays *mth* and *mtg*, which release. Over its front *mtb*5 relay *mtb* completes the following circuit: ground, back *mth*1, front *mtb*5, wire 534 (Fig. 6), front *acg*5, starting wire *mm* of the register finder which extends into the register-finder connector (Fig. 7) over back *h*2, wire 702, resistance R*e*71, relay *eca*, battery. Relay *eca* energizes.

The fifty-six 702 wires corresponding to the 56 feeders are divided up into 14-wire groups, the wires of each group being multipled to one and the same *eca* relay. The *eca* relay energized therefore characterizes the 14-feeder group comprising the calling feeder. Over its front *mtb*6 (Fig. 5) relay *mtb* prepares the energizing circuit of connecting magnet V*a* of the call finder chosen. Over its front *mtb*7 is prepared the circuit for sending the class indication of the calling subscribed to the register. Had there been several call finders available in the group involved, several relays such as *mtb*, *mtb'*, *mtb''* could have operated simultaneously. After the release of relay *mtg*, all these relays have their energizing circuits opened at *mtg*1, *mtg*2 and *mtg*3; one of the *mtb* relays holds over its front *mtb*1 and over its back *mtb*1 it prevents the other relays from holding over similar circuits.

As has been indicated, relay *acd* upon energizing short-circuits the winding of relay *acc*, which releases slowly. Over its back *acc*1, this relay *acc* completes the following circuit: ground (Fig. 6), front *acd*3, back *acc*1, wire 525 (Fig. 5), back *mtc*3, upper winding of relay *mtc*, battery.

Relay *mtc* energizes. Over its front *mtc*1 it completes the following circuit: battery, resistance R*e*53, front *mtc*1, relay *mtd*, ground. Relay *mtd* energizes. Over its front *mtc*2 relay *mtc* completes the following circuit: ground, front *mtc*2, wire 539, series winding of relay *mta*, wire 521 (Fig. 6), front *ach*3, wire 612 (Fig. 3), back *vt*1, resistance R*e*32, battery.

In order to choose a free terminal selector from among the 4 selectors serving the calling fifties group, there are 4 *mta* relays in the marker. These 4 *mta* relays are common to the 40 lines connected to the banks of the call finders and each one of them characterizes the position of a line in a 4-line group giving access to the terminal selectors of a fifties group.

The four 539 wires connected to the 4 *mtc*2 contacts of relay *mtc* are connected to the 4 *mta* relays. The four 521 wires issuing respectively from the 4 *mta* relays are multipled to the two call-finder connectors and then connected to the 10 *ach*3 contacts of the 10 *ach* relays of the call-finder connector. The 40 wires issuing from *ach*3 correspond to the 40 lines outgoing from the first call-finder section. These 40 lines are divided up into 10 groups of 4 lines each, the *mta* relay energized therefore characterizing the position of the terminal selector chosen from among those serving the calling fifties group. Over its front *mtc*4 relay *mtc* completes the following holding circuit for itself: battery, relay *mtc*, front *mtc*4, back *mta'''*1 . . . *mta*1, lower winding of differential relay *mtf*, ground. The fluxes produced in the two windings of relay *mtf* oppose each other, but the flux produced in the upper winding is preponderant and the relay remains energized.

Upon energizing, relay *mtd* closes over its front *mtd*2 the energizing circuit of relay *mte*, which energizes. Over its front *mtd*3 it completes a holding circuit for itself.

The *mta* relay that has operated opens over its back *mta*1 the holding circuit of relay *mtc*, which releases. Over its front *mta*1 it places the low-resistance lower winding of relay *mtf* in parallel with its own high-resistance lower winding, in order to decrease the test potential on wire 521 and to mark the chosen terminal selector busy; the fluxes produced in the two windings of relay *mtf* being equal and of opposite sense, relay *mtf* releases.

Upon releasing, relay *mtc* short-circuits, over its back *mtc*1, relay *mtd*, which releases slowly.

Relay *mte* energized over its left-hand winding completes a holding circuit for itself over its right-hand winding over the following circuit: battery, right-hand winding of relay *mte*, front *mte*2, back *mtf*1, front *mp*4, ground. It will be noted that the energizing circuit of relay *mte* over its left-hand winding is opened by front *mtd*2 when relay *mtd* releases.

Had there been several terminal selectors available in the calling fifties group, several of the 4 *mta* relays could have energized simultaneously; when relay *mtc* releases, all these *mta* relays have their energizing circuits opened at *mtc*2; one of them holds over its front *mta*1 and prevents the other relays from holding over similar circuits.

The following circuit is completed by front *mte*1, associated with front *mta*2 of the *mta* relay energized: ground, front *mp*4, front *mte*1, back *mtd*1 and *mtf*2, wire 540, front *mta*2, wire 522 (Fig. 6), front *ach*4, wire 613, magnet S*a*, battery. Selection magnet S*a* energizes.

To serve the 40 lines outgoing from the first section of call finders CA there are 20 selection magnets S*a*, each magnet thus serving 2 lines. One and the same magnet will therefore serve the lines terminating at the first two terminal selectors of a group, another magnet S*a* serving the lines terminating at the last two terminal selectors of the same group. This explains wire 540 being multipled to 4 contacts such as *mta*2 of the 4 *mta* relays, these contacts being grouped by twos. There are thus only two 522 wires multipled to the *ach*4 contacts of the 10 *ach* relays. The twenty 613 wires are then connected respectively to the 20 S*a* magnets.

Parallel to this circuit, ground is applied by front *mp*4 to wire 540 extending in the following circuit: ground, front *mp*4, wire 540, front *mta*3, wire 520 (Fig. 6), subdividing magnet S*ax/y*, battery. One of the subdividing magnets S*ax* or S*ay* corresponding to the terminal selector energizes. In this circuit, too, as in the one previously described, wire 540 is multipled to the 4 *mta*3 contacts grouped by twos of the 4 *mta* relays so as to have only two 520 wires respectively connected to the two magnets S*ax/y*.

Over its front *sax*1 the S*ax* magnet operating completes the following circuit over front *sa*1 of the energized S*a* magnet: ground, front *sax*1 and *sa*1, wire 517 (Fig. 5), relay *mle*, battery.

Figure 3:
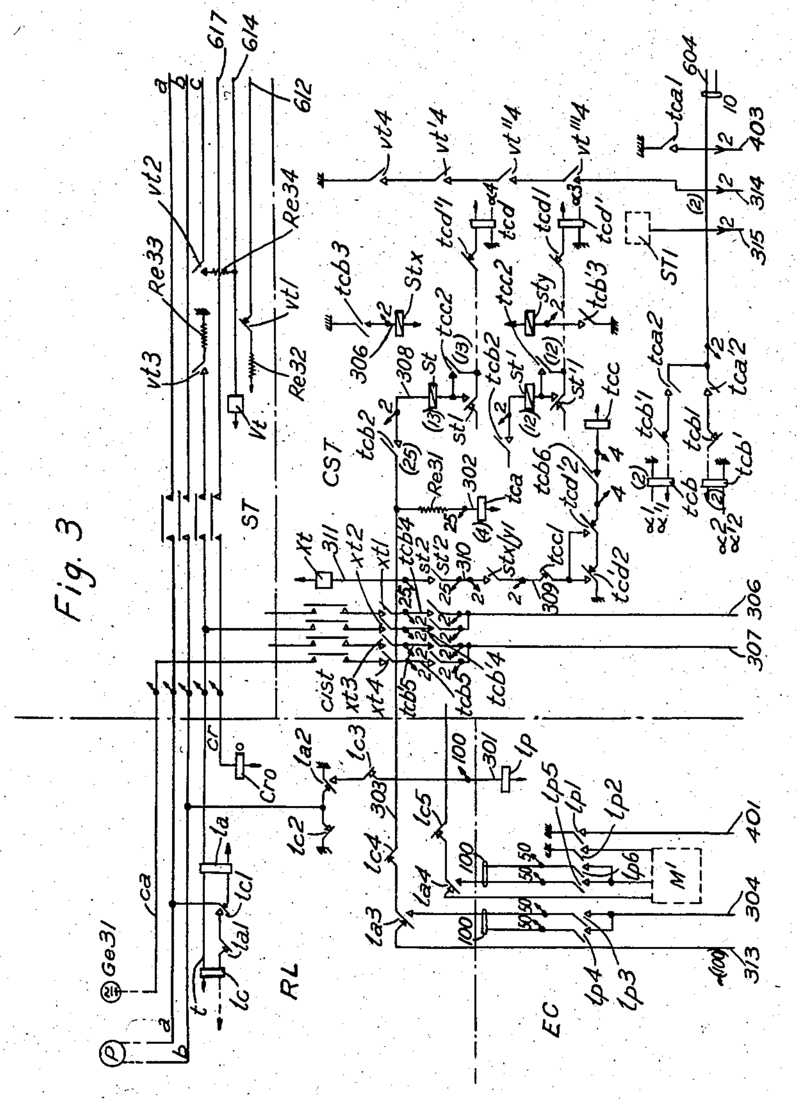
Fig. 3 shows the schematics of the subscriber line relays, of the terminal selector and of the associated connector.

The 20 *sa*1 contacts respectively associated with the 20 S*a* magnets are placed in parallel over the preceding circuit, as indicated by the two multipling arrows placed on either side of said contacts; the same applies to contacts *sax*1 and *say*1. Relay *mle* energizes regardless of the magnets S*a*, S*ax* or S*ay* that have operated. The *mle* relay energized in marker M informs said marker of the operations that have just occurred and allows double testing the calling subscriber before controlling the connection. Over their front contacts *sax*2 and *sa*2 magnets S*ax* and S*a* prepare the energizing circuit of connecting magnet V*t* (Fig. 3).

As has been indicated, the two markers M and M' hunt for the calling subscriber simultaneously. It will be assumed in all that follows that the marker involved is the first to reach the calling subscriber. When the contacts of individual switch *cist* are closed, the following circuit is completed: battery, upper windings of relays *lc* and *la* in series, contacts of individual switch *cist*, front *xt*2 and *tcb*4, wire 306 (Fig. 4), left-hand winding of relay *mla*, rectifier R*d*40, resistance R*e*42, front *mp*5, ground. Relay *mla* energizes. The winding of relay *mla* being much more resistant than that of relay *lc*, relay *lc* does not energize.

Four series of contacts have been provided in individual switch *cist*. The series of contacts connected to *xt*4 and *xt*2 give access to the subscribers of the first fifties group, the series of contacts connected to *xt*3 and *xt*1 giving access to the subscribers of the second fifties group. The cutting in of the series of contacts corresponding to the calling fifties group is done by means of relay *tcb* which characterizes a 25-subscriber group.

Wire 306 is connected to both front *tcb*4 and *tcb'*4 and in each case multipled to the contacts of the two relays *tcb* and *tcb'*. In effect, the *tcb* relays correspond to the first and third 25-subscriber groups, while the *tcb'* relays correspond to the second and fourth 25-subscriber groups, common equipment EC and terminal-selector connector CST being common to two neighboring fifties groups. The same applies to wire 307 of the circuit for sending the subscriber's class indication.

Over its front *mla*1 (Fig. 4) relay *mla* completes the following holding circuit for itself during the period the test is being made: ground, middle winding of relay *mla*, front *mla*1, *mlc*1 and *mlb*1, resistance R*e*43, battery. Over its front *mla*3 it shunts its high-resistance left-hand winding by the low-resistance upper winding of relay *mlb*, in order to decrease the test potential on wire 306 and to mark the calling subscriber busy. The fluxes produced in the two windings of relay *mlb* being equal and of opposite sense, this relay releases. Over its back *mla*5 relay *mla* causes the release of relay *lmc*, which, being slow to release, does not open its contacts immediately. Over its front *mla*2 relay *mla* completes a second holding circuit for itself over its third winding: battery, resistance R*e*43, back *mlb*1, front *mla*2, right-hand winding of relay *mla*, wire 402 (Fig. 5), front *mp*4, ground. Over its front *mla*4 it prepares the energizing circuit of relay *mld*, which indicates to the marker that the connection can be made once a register has been connected.

As has been indicated, a ground was placed upon the release of relay *mth* on the starting circuit of the register finder giving access to the call-finder section containing the call finder chosen. A relay *eca* (Fig. 7) corresponding to the 14-feeder group containing the calling feeder energizes.

Over its front *eca*1 relay *eca* completes the following circuit: ground, front *eca*1, wire 705, back *ecf'*1, left-hand winding of relay *ecf* energized, battery.

One *ecf* relay and one *ecf'* relay have been provided; the *ecf* relay controlled by contacts *eca*, *eca'*1 characterizes the first two 14-feeder groups, while the *ecf'* relay controlled by contacts *eca''*, *eca'''*1 characterizes the third and fourth 14-feeder groups. It will be assumed throughout what follows that the calling feeder forms part of the first group. Over its front *eca*2 relay *eca* prepares the energizing circuit of relay *ecb*.

Over its front *ecf*2 relay *ecf* completes the following circuit: ground, front *ecf* and *eca*2, back *ecb'*1, left-hand winding of relay *ecb* energized, battery.

Four *ecb*, *ecb'*, *ecb''* and *ecb'''* relays have been provided. These relays are controlled respectively by contacts *eca*2 . . . *eca'''*2 and therefore respectively characterize the first, second, third and fourth 14-feeder groups. Over its front *ecf*5 relay *ecf* completes the following circuit: ground, front *ecf*5, wire 706 (Fig. 8), back *eta*1 . . . *eta'*1, relay *etc*., battery.

Over its front *ecb*2 relay *ecb* completes the following circuit: ground, back *ecd*2 and *ecd'*2, front *ecb*2, relay *ecc*, battery. One *ecc* relay and one *ecc'* relay have been provided; the first, controlled by contacts *ecb*, *ecb''2*, characterizes the first and the third 14-feeder groups; the second relay, controlled by contacts *ecb'*, *ecb'''2*, characterizes the second and the fourth 14-feeder groups. Over its front *ecb3* relay *ecb* prepares the energizing circuit of a relay *ecd* associated with an S*e* magnet and of a relay *ecd'* associated with an S*e''* magnet.

Relay *ecc* energizes and over its front *ecc2* completes the following circuit: register-finder starting wire *mm* (Fig. 7), back *h2*, wire 702, front *ecb3*, wire 708, magnet S*e*, front *ecc2*, back *ecd'1*, upper winding of *ecd*, battery.

Each group of 14 calling feeders comprises two subgroups of 7 feeders each. Relay *ecd* and the associated S*e* magnets characterize the first feeder sub-group within the first and third groups; relay *ecd* and the S*e'* magnets characterize the first 7-feeder sub-group within the second and fourth 14-feeder groups; relay *ecd'* and the S*e''* magnets characterize the second 7-feeder sub-group within the first and third 14-feeder groups; finally, relay *ecd'* and the S*e'''* magnets characterize the second 7-feeder sub-group within the second and fourth 14-feeder groups. In the example described it has been assumed that the calling feeder formed part of the first 7-feeder sub-group within the first 14-feeder group. Over its back *ecd2* relay *ecd* opens the energizing circuit of relay *ecc*, which releases slowly.

Seven selection magnets S*e* have been provided, each characterizing the position of a feeder within a 7-feeder sub-group; likewise, 7 magnets S*e'*, 7 magnets S*e''* and 7 magnets S*e'''* have been provided, which perform the same function in the corresponding sub-groups.

The S*e* magnet corresponding to the calling feeder energizes. Over its front *se1* it completes a holding circuit for itself. Over its front *se2*, associated with front *ecf3*, it prepares the circuit for sending to the register the class indication of the calling subscriber.

As was indicated at the beginning of the description, the 56 feeders have access in common to 8 registers. For testing for a free register there are 8 *eta* relays, each corresponding to one register. When a register is available, the corresponding *eta* relay is connected to the battery over wire 800, back *u2* and resistance R*e*81. As soon as relay *etc* operates, it causes over its contacts *etc2* the energization of the *eta* relays corresponding to all the free registers.

Over its back *eta1* relay *eta* opens the energizing circuit of relay *etc*, which releases. If several registers are free, several *eta* relays operate simultaneously; upon releasing, relay *etc* opens at *etc2* the energizing circuit of the *eta* relays. It is assumed that the tester TE involved has never been used or has been used 8 *n* times, *n* being a whole number. In this case, terminal *bn*80 of distributor DI is grounded, the other terminals *bn*81 . . . *bn*87 being isolated. One of the *eta* relays holds over its front *eta2*, terminal *bn*80 and ground, and over its back *eta2* it prevents the other relays from holding over similar circuits. The *eta* relay that holds is the one whose back *eta2* is the nearest to terminal *bn*80. Over its front *eta3* and *eta4* it prepares the energizing circuit of a connecting magnet V*e* or V*e'* of the register-finder connector. Over ilts front *eta5* it completes the circuit for sending the calling subscriber's class indication to the register: device *d*, front *eta5*, wire 709 (Fig. 7), front *ecf3* and *se2*, wire 704, back *h3*, wire *cr* extending to a call finder (Fig. 6), back *va2*, front *acg2*. wire 531 (Fig. 5), front *mtb7*, wire 307 (Figs. 4 and 3), front *tcb5* and *xt4*, contacts of switch *cist*, generator G*e*31.

Each *ecf3* and *ecf'3* contact (Fig. 7) connected to wire 709 is multipled to 28 contacts such as *se2* or *se3*, which gives at the outlet of said contacts 56 wires 704 each characterizing one feeder. Each subscriber is associated with a generator producing a current whose nature depends upon said subscriber's class. The register tester having access to 8 registers, wire 709 is multipled to 8 *eta5* contacts corresponding to the 8 register test relays *eta*.

Over its back *etc1* relay *etc* completes the following circuit: ground (Fig. 8), back *etc1*, left-hand winding of relay *etb*, back *etb2*, wire 721 (Fig. 7), front *ecd3*, back *ecc1* and *ecc'1*, wire 711 multipled to the 28 *se4* front contacts of the 28 S*e* magnets, front *ecf4*, wire 712 (Fig. 8), front *eta3*, wire 722 (Fig. 7), magnet V*e*, battery. Wire 712 is multipled to 8 *eta3* contacts, respectively associated with the 8 *eta* relays; the eight 722 wires thus obtained are connected to the 8 V*e* magnets associated with the 8 CHE finders of a first section. Eight other magnets V*e'* are associated with the 8 finders of a second section. The first 8 finders of the first section give access to the first 28 feeders AL of the 56-feeder group. The other eight give access in common to the other 28 feeders. Each register is associated with a V*e* magnet and a V*e'* magnet; the V*e* magnet is used for making the connection to one of the first 28 feeders and the V*e'* magnet for making the connection to one of the last 28 feeders.

Relay *etb* energizes and completes a holding circuit for itself over its right-hand winding over its front *etb1* and contact *ecf5* (Fig. 7), its energizing circuit over its left-hand winding being opened by back *etb2* (Fig. 8).

The connecting magnet V*e* corresponding to the seized register energizes in series with relay *etb* and holds over the ground on contact *etb2*. This magnet causes the connection of the register to the feeder chosen.

Over its front *ve2* and *ve3* it prepares the connection of the calling subscriber to the register. Over its front *ve4* it completes the following circuit: battery, relay *g* (Fig. 7), contact of switch CHE, front *ve4*, wire 715 (Fig. 8), front *d1* closed when the class indication has been registered in device *d*, ground. Relay *g* energizes.

Relay *g* completes a holding circuit for itself at *g1*. At *g3* it completes the circuit of relay *h*, which operates only with a certain delay. At *g2* it completes the following circuit: ground (Fig. 7), front *g2*, wire *t* (Fig. 6), back *va4*, front *ag1*, wire 530 (Fig. 5), front *mtb8*, front *mle1*, back *mle3*, wire 404 (Fig. 4), upper winding of relay *mld*, front *mla4*, back *mlb1*, resistance R*e*43, battery. The *mld* relay that is going to cause the connection energizes.

Over its back *mld1* relay *mld* opens the circuit of relay *maa*, which, having its second winding short-circuited, releases slowly. Over its front *mld2* relay *mld* completes a holding circuit over its lower winding and the ground placed on wire 402 over front *mp4*. Over its front *mld6* it completes the following circuit: ground (Fig. 5), front *mld6*, wire 544 multipled to 14 front contacts *mtb6* belonging respectively to the 14 *mtb* test relays, wire 532 (Fig. 6), front *acg3*, magnet V*a*, battery. The chosen V*a* connecting magnet of the call finder energizes. Over its front *mld7* relay *mld* completes the following circuit: ground (Fig. 5), front *mld7*, wire 519 (Fig. 6) multipled to two front contacts such as *sax/y2* respectively belong ing to the two S*ax/y* magnets, wire 616 multipled to 20 front contacts *sa2/3* of 20 S*a* magnets, wire 614 (Fig. 3), magnet V*t*, battery. Magnet V*t* energizes.

Over its back *vt1* magnet V*t* opens the energizing circuit of terminal-selector test relay *mta*, which releases. Over *vt2* it completes a holding circuit for itself: battery, magnet V*t*, resistance R*e*34, front *vt2*, wire *c* (Fig. 6), call-finder contacts, front *va5*, ground. Over its front *vt3* magnet V*t* completes the following circuit: ground, resistance R*e*33, front *vt3*, terminal selector ST, upper windings in series of ringing relay *la* and cut-off relay *lc*, battery. Slow-acting relay *lc* energizes. Over its front *val* magnet V*a* completes the following holding circuit for itself: battery, magnet V*a*, resistance R*e*66, front *va1*, wire *t* extending into the register finder (Fig. 7), front *g2*, ground. Over its back *va2* it opens the circuit for sending the subscriber's class indication to the register, connecting the portion of this circuit passing through the register finder to meter *Cro* (Fig. 3), over wire 617 across front *va*2. Over its back *va*3 it opens the circuit of call-finder test relay *mtb*, which falls back. Over its front *va*6 and *va*7 it completes through the call finder and the terminal selector the supply circuit of calling subscriber P to the register: battery (Fig. 8), left-hand winding of relay *k*, wire 713 (Fig. 7), front *ve*2 and register finder CHE, wire *a* (Fig. 6), call finder and terminal selector, subscriber's loop, wire *b* (Fig. 3), terminal selector and call finder (Figs. 6 and 7), register finder and front *ve*3, wire 714 (Fig. 8), right-hand winding of relay *k*, ground. Relay *k* energizes. The connection of subscriber P to the register has thus been effected. The subscriber can then dial. Various operations still to follow will bring about the release of the control members.

Over its front *maa*1 the *maa* relay releasing opens the energizing circuit of relay *mab* shunted by a high capacity. Over its front *maa*3 it opens the energizing circuit of relay *mac*, which releases, and of relay *mp*, which falls back slowly.

Upon releasing, relay *mta* opens over its front *mta*2 the energizing circuit of magnet S*a*, which releases. Over its front *mta*3 it opens the energizing circuit of relay S*ax*/*y*, which releases.

Upon releasing, relay *mtb* opens over its front *mtb*5 the starting circuit of the register finder, causing the release of the *eca* relay of the feeder seized.

Upon releasing, relay *mac* opens its front *mac*6 the energizing circuit of relay *mad*. Relay *mad* releases. Over its front *mac*7 it opens the chain circuit, causing relay *mgd* to fall back.

Upon releasing magnets S*a* and S*ax*/*y* open the energizing circuit of relay *mle*, which releases.

It has been seen that cut-off relay *lc* energized once the connection had been established between the subscriber and the register. Over its back *lc*3 it opens the energizing circuit of relay *lp* of common equipment EC, which releases. Over its back *lc*4 it opens the energizing circuit of relay *tca*, which releases, as well as the energized *tcd* relay and the energized S*t* magnet.

Upon releasing, relay *mad* opens over its front *mad*1 the energizing circuit of relay *acg* of the call-finder connector, which releases.

Over its front *tca*1 relay *tca* opens the energizing circuit of relay *mga*, which releases. Over its front *tca*2 it opens the energizing circuit of relay *tcb*, which likewise releases.

Over its front *tcb*3 relay *tcb* opens the energizing circuit of magnet S*tx*, which releases. Over its front *tcd*2 relay *tcd* opens the energizing circuit of magnet X*t*, which releases, breaking the connection of the calling subscriber to the terminal-selector connector.

Upon releasing, relay *mga* opens over its front *mga*2 the energizing circuit of relay *mgc*, which releases. Over its front *mga*4 it opens the energizing circuit of relays *ach* and *acd*, which release.

The releasing *mp* slow relay removes the general ground from wire 402 over its front *mp*4, causing relays *mte*, *mld* and *mla* to release. At this instant all the control equipments of the marker, of the terminal-selector connectors and of the call finders are released. Relay *mja* holds as will be explained later.

Relay *k* energized at the moment calling subscriber P was connected to register EN. Over its front *k*1 it completes the circuit of relay *u*, which releases and signals that a register has been seized.

Upon energizing, relay *u* completes over its front *u*4 the following holding circuit for magnet V*e*: ground (Fig. 8), front *u*4, wire 723 (Fig. 7), resistance R*e*72, front *ve*1, magnet V*e*, battery. Over its front *u*3 it completes a holding circuit for relay *g* across the seized register finder, which relay also holds over another circuit comprising its front *g*1. Over its back *u*2 relay *u* opens the energizing circuit of relay *eta*, which releases.

In the register finder relay *eca* upon releasing opens over its front *eca*1 the energizing circuit of relay *ecf*, which releases, and over its front *eca*2 the energizing circuit of relay *ecb*, which likewise releases.

Over its front *eta*3 relay *eta* opens the first holding circuit of magnet V*e*, which then holds over its front *ve*1.

Upon releasing, relay *ecf* opens over its contact *ecf*5 the holding circuit of relay *etb*, which releases.

Upon releasing, relay *ecb* opens over its front *ecb*3 the energizing circuit of relay *ecd* and of magnet S*e*, which release.

When relay *h* energizes, it makes, over its various back contacts *h*1, *h*2, *h*3 and *h*4, breaks in wires *ch*, *mm*, *ta* and *cr* in order to busy the feeder and the associated call finder.

All the common members that have taken part in establishing the calling subscriber-register connection are released and the only magnets and relays that remain energized are connecting magnets V*t*, V*a* and V*e* and relays *k*, *u*, *lc* and *la*.

The calling subscriber receives from the register an invitation-to-transmit tone. He then dials the number of the called subscriber by causing breaks in the line wires by means of his dial. The various pulses thus sent are received by the register over relay *k* and are registered according to a known method, the register then placing a ground on wires *c* and *t* (Fig. 7) of a first selector.

The detailed operations relative to the routing of a call from a feeder AL up to a called subscriber P will now be described with reference to Figs. 9, 10, 11, 12, 6, 4, 5 and 3. It will first be assumed that the various selectors used for the routing of the call are available, as also the common members controlling the operation of said selectors. In that case, the magnets shown in Figs. 9, 10, 11, 12, 6, 4, 5 and 3 are all unoperated.

When feeder AL is seized (Fig. 7), a ground is placed on wire *c*, as has been indicated, and the following circuit is completed: ground, wire *c* (Figs. 7 and 9), back *vp*5, resistance R*e*91, energized relay *pca*, battery. Contacts *vp*5 of the first 8 first selectors of the multi-connector are all connected to one and the same relay *pca* across resistance R*e*91; contacts *vp*5 of the last 7 first selectors of the multi-connector are all connected to another *pca* relay. The *pca* relay energized thus indicates whether calling selector SP is among the first 8 selectors of the multi-connector or among the last seven. Overs its front *pca*1 relay *pca* completes the following circuit: battery, left-hand winding of relay *pcb*, front *pca*1, back *pcb*′1, *xp*1 and *pce*1, ground. Relay *pcb* energizes. There is one relay *pcb* that operates when the first *pca* relay operates and one relay *pcb*′ that operates when the second *pca* relay energizes. The *pcb* relay that energizes thus indicates which half of the multi-connector contains the calling SP selector.

Relay *pcb* prevents at *pcb*1 any subsequent energization of relay *pcb*′ as long as the routing of a call in progress has not been completed; over its front *pcb*2 it completes the following circuit: battery, energized *pcc* relay, front *pcb*2, back *pcd*′2 and *pcd*2, ground; over its front *pcb*3 it prepares an energizing circuit for one of the selection magnets S*p* of the multi-connector.

Relay *pcc* completes the following circuit at *pcc*2: battery, upper winding of energized *pcd* relay, back *pcd*′1 and *pce*2, front *pcc*2, selection magnet SP of the multi-connector, front *pcb*3, wire 900, back *vp*5, wire *c* and ground in feeder AL over a circuit already described. Twenty-five selection magnets have been provided for the multi-connector assembly, namely, 4 S*p* magnets, 4 S*p*′ magnets, 4 S*p*″ magnets, 4 S*p*‴ magnets and 9 S*po* magnets. Fifteen out of the 16 S*p* magnets, in the present phase of operation, correspond respectively to the 15 S*p* selectors of the multi-connector. The S*p* magnet that operates therefore characterizes the position of the calling selector in the multi-connector. Of course, there are 15 wires such as 900 each corresponding to one first selector SP; therefore, 8 *pcb*3 contacts and 7 *pcb'*3 contacts must be provided.

Relay *pcd* opens at *pcd*2 the energizing circuit of relay *pcc*, which releases with a certain delay; over its front *pcd*3 it prepares the energizing circuit of connecting magnet X*p*.

Selection magnet S*p* prepares the connection of connector CSP to first selector SP across individual switch *cisp*; over its front *sp*1 it completes a holding circuit for itself; over its front *sp*3 it prepares the energizing circuit of connecting magnet X*p* of individual switch *cisc*.

Upon releasing, relay *pcc* completes the following energizing circuit for magnet X*p*: battery, magnet X*p*, back *pcc*1 and *pcc'*1, front *pcd*3, front *sp*3, back *pce*4, ground. The two multipling arrows placed on either side of contact *sp*3 indicate that contacts *sp*3 of the selection magnets are all placed in parallel. Magnet X*p* therefore energizes regardless of the S*p* magnet that has operated.

Magnet X*p* causes the connection of connector CSP to first selector SP across individual switch *cisp*. It will be noted that *cisp* forms part of the same multi-connector as first selectors SP; said multi-connector comprises in fact 17 individual switches, 15 of which are used as first selectors and two effect the connection between a given first selector and the common members serving the multi-connector. Over its back *xp*1 connecting magnet X*p* opens the circuit of relay *pcb*, which releases; over its front *xp*1 it completes the following circuit: ground, back *pce*1, front *xp*1, relay *pcf*, wire 905 (Fig. 10), back *prl*1, resistance R*e*101, battery. Relay *pcf* energizes and controls the various operations involved in the seizure of impulse-receiver RSP by connector CSP.

Over its front *xp*2 (Fig. 9) magnet X*p* prepares an energizing circuit for relay *pcg*; over its front *xp*3 it completes the following holding circuit for itself: battery, magnet X*p*, front *xp*3, contact of individual switch *cisp*, back *vp*2 and wire *t* grounded in the feeder; over its front *xp*4 and *xp*5 it prepares the circuit for receiving the various coded digits in the impulse-receiver; over its front *xp*6 it completes the following holding circuit for relay *pca*: battery, relay *pca*, resistance R*e*91, contacts of switch *cisp*, front *xp*6, ground.

Upon releasing, relay *pcb* opens at *pcb*3 the circuit of selection magnet S*p* and that of relay *pcd*, but the contacts of individual switch *cisp* remain closed as long as magnet X*p* remains energized.

Relay *pcf* completes at *pcf*1 the following circuit: battery, right-hand winding of relay *pcg*, front *pcf*1 and *xp*2, back *pcg'*1, ground. Contact *pcg'*1 is associated with the *pcg* relay of the other CSP1 connector associated with the same RSP impulse-receiver. This arrangement prevents the simultaneous seizing of an impulse-receiver, by two connectors.

Relay *pcg* opens its back *pcg*1 in order to prevent the operation of the similar *pcg* relay in the other connector associated with the same impulse-receiver; over its front *pcg*2 it completes the following circuit; ground, front *pcg*2 and *pcg*6, wire 908 (Fig. 10), relay *prg*, resistance R*e*102, battery, and in parallel with the preceding circuit, relay *prl*, battery; over its front *pcg*3 it completes a holding circuit for itself; over its front *pcg*4 it prepares the circuit of the *prn* relay connecting the impulse-receiver to the tester; over its front *pcg*8 it causes the operation of relay *pce*; over its other front contacts *pcg*5, *pcg*7, *pcg*9 and *pcg*10 it establishes the continuity of certain connecting wires between connector CSP and impulse receiver RSP.

Upon releasing, selection magnet S*p* opens at *sp*3 the energizing circuit of operating magnet X*p*, but this latter then holds over *xp*3 and a circuit already described.

Relay *pce* opens over its back *pce*1 the circuit of relay *pcf*, which releases; over its front *pce*1 and *pce*6 it causes the energization of relays *pcc'* and *pcc*; over its front *pce*2 and *pce*3 it prepares an energizing circuit for one of the 16 selection magnets S*p*, S*p'*, S*p''*, S*p'''*. It will be noted that these selection magnets are seized twice, first for choosing a calling SP selector and then for choosing a free line to the second selector, as will be indicated subsequently. Over its front *pce*5, *pce*8 and *pce*9 it establishes the continuity of various connecting wires between connector CSP and impulse-receiver RSP.

In impulse-receiver RSP (Fig. 10), relays *prg* and *prl* have pulled up as has been indicated. The energization of relay *prg* produces no effect at the instant involved. Relay *prl* makes at *prl*1 a break in wire 905 to busy impulse-receiver RSP.

In first-selector connector CSP (Fig. 9), relays *pcc* and *pcc'* prepare over their front *pcc*2 and *pcc'*2 an energizing circuit for one of the 16 selection magnets S*p*.

Code-receiving relays *pra* (Fig. 10), *prc*, *prd* are then connected to the two line wires *a* and *b* over the following two circuits:

(1) Wire *a* (Fig. 9), distributor RP1, contact of individual switch *cisp*, front *xp*4, front *pce*8, wire 901 (Fig. 10), rectifier R*d*101, relay *pra*, ground;

(2) Wire *b* (Fig. 9), distributor RP1, contact of switch *cisp*, front *xp*5, front *pce*9, wire 902 (Fig. 10), back *pry*1, rectifier R*d*103, *prc*, ground, and in parallel with the preceding circuit, rectifier R*d*104, *prd*, ground.

Register EN, finding a ground across relays *pra*, *prc*, *prd*, then transmits to impulse-receiver RSP the digit to be used for controlling the positioning of selector SP. This digit is sent, in the form of polarities or of combinations of polarities, over the previously-described circuit. More specifically, the register can send over wire *a* either a positive polarity or an alternating current. In the first case, only relay *pra* energizes; in the second case, relay *pra* energizes first under the effect of the positive alternation and closes its contact *pra*2, thus allowing the energization of relay *prb* under the effect of the next alternation. The register can transmit to line wire *b* a positive polarity, a negative polarity or an alternating current. In the first case, only relay *prc* energizes; in the second case, only relay *prd* energizes; and in the third case, both relays *prc* and *prd* energize. Thus, by means of 4 receiving relays *pra*, *prb*, *prc* and *prd*, $2^4=16$ possible combinations could be obtained. In fact, relay *prb* cannot energize without relay *pra*, which already excludes 4 combinations; moreover, in the case of the reception of the first digit, relay *prd* is not used, which reduces to 6 the number of combinations. Out of these 6 combinations, 5 at most will be used for the first selection, the sixth corresponding to a special assignment, as will be indicated subsequently.

To be specific, it will be assumed by way of example that only relay *pra* operated at the time of the reception of the first digit. At *pra*1 it completes the following circuit: battery, relay *prc*, back *prx*1, front *pra*1, wire 909 (Fig. 9), front *pcg*2, ground.

Relay *pre* (Fig. 10) short-circuits relay *prx* over: front *pre*1, relay *prx*, front *pra*1 and back *prx*1. The various relays *pre* . . . *pre'''* comprise contacts such as *pre*2 . . . *pre'''*2 which are arranged according to a known method to provide a pyramid of contacts P*y*1. This pyramid comprises a single incoming wire connected to front *prn*6 and as many outgoing wires 920 as there are combinations used to make the first selection; as has been indicated, 5 combinations at most are used to make that selection; therefore, a total of 5 wires 902 outgoing from pyramid P*y*1 have been provided.

When the reception of the first digit ends, relay *pra* releases, removing at *pra*1 the short-circuit of relay *prx*. Relay *pre* holds and relay *prx* energizes over the following circuit: battery, relay *pre*, front *pre*1, relay *prx*, wire 909, and ground in the first-selector connector over a circuit already described.

Relay *prx* upon opening its 4 back contacts *prx*1 . . . *prx*4 cuts out first-digit registering relays *pre* . . . *pre'''*;

over its 4 front contacts *prx*1 . . . *prx*4 it prepares the operation of second-digit registering relays *prf* . . . *prf'''*.

The second digit is received over relays *pra* . . . *prd* according to the same method as for the first digit, with the sole difference that in this case relay *prd* is used. As has been indicated, 12 possible combinations can thus be received, out of which only 10 are used. This second digit is provided to control the positioning of the second selector, but it should nevertheless be received first by the first-selector control members, because these members must select a free second selector giving access to at least one free line in the group corresponding to the second digit sent by the register.

To be specific, it will be assumed, by way of example, that relay *pra* is still the one that operates. Out of the 4 second-digit registering relays *prf* . . . *prf'''*, only relay *prf* operates, the following circuit being completed: battery, relay *prf*, front *prx*1 and *pra*1, wire 909 and ground in the connector over contact *pcg*2.

Relay *prf* establishes the following short-circuit for relay *pry*: relay *pry*, front *pra*1, *prx*1 and *prf*1; over its front *prf*3 it prepares the sending of the combination received to the second selector. Relays *prf* . . . *prf'''* comprise contacts such as *prf*2 . . . *prf'''*2 which are likewise arranged in a pyramid Py2; this pyramid comprises, on the one hand, an incoming wire connected to front *prn*5, and, on the other hand, 10 outgoing wires such as 921, because 10 combinations are used.

When the reception of the second digit ends, relay *pra* releases, eliminating at *pra*1 the short-circuit of relay *pry;* relay *prf* holds and relay *pry* energizes over the following circuit: battery, relay *prf*, front *prf*1, relay *pry*, wire 909 and ground over front *pcg*2 in connector CSP.

At *pry*1 relay *pry* make a break in wire 902 in order to signal to the register that the two digits have been properly registered in the first-selector impulse-receiver; over its front *pry*2 it causes the seizure of tester TSP, the following circuit being completed: battery, resistance Re103, front *pry*2, back *prn'*1 and *prn''*1 respectively associated with the *prn* relays of the other impulse-receivers having access to the same tester, back *pte*1, left-hand winding of relay *prn*, wire 906 (Fig. 9), back *yp*1, front *pcg*4 and *pcg*2, ground.

Relay *prn* has a contact such as *prn*1 *prn*2 in each of the other impulse-receivers RSP1, RSP2 having access to the same tester, said contacts being included in the circuits of the *prn* relays of these impulse-receivers; the energization of said *prn* relays and the seizure of the tester by the other impulse-receivers are thus prevented. Over its front *prn*3 relay *prn* causes the operation of relay *ptb* over its lower winding; over its front *prn*4 it prepares the energizing circuit of relay *pcj* in the connector; over its front *prn*5 and *prn*6 it prepares the circuits of contact pyramids Py1 and Py2; over its front *prn*8 it completes a holding circuit for itself; over its front *prn*9 it causes the energization of relay *prp*.

Relay *prp* prepares at *prp*1 the energization of a relay such as *ptg*. Tester TSP comprises 10 *ptg* relays corresponding to the various combinations used for the first selection; in the case involved only 5 combinations at most are used, as has been indicated; thus, only 5 *ptg* relays are used, which are connected respectively to the 5 outgoing wires of pyramid Py1.

Relay *ptb* completes the following circuit at *ptb*3: battery, relay *ptc*, front *ptb*3, chain of back contacts *pta*1, back *ptf*1, upper winding of relay *ptb*, ground. The two windings of relay *ptb* are designed to produce fluxes of opposite sense, but in the case involved the flux produced by the upper winding is insufficient to cause the release of relay *ptb*. Twenty-five *pta* relays have been provided, back contacts *pta*1 of these various relays being all in series with the circuit of relay *ptc*. Upon energizing, relay *ptc* indicates that all the *pta* relays are definitely unoperated.

Relay *ptc* causes the energization of relay *ptd* over its front *ptc*1; over its front contacts *ptc*2 it prepares an energizing circuit for one of the 25 *pta* relays.

Relay *ptd* causes at *ptd*2 the operation of relay *pte*.

Relay *pte* opens its contacts *pte*2, *pte*3, to busy the tester with respect to the other impulse-receivers capable of having access to said tester; over its front *pte*4 it completes the following three circuits:

(1) Ground, front *prn*3, *pte*4, *prn*4, wire 910 (Fig. 9), front *pcg*9, relay *pcj*, battery;

(2) Ground, front *prn*3, *pte*4, *prn*6, contacts of pyramid Py1, outgoing wire 920 corresponding to the first combination received, connection *cn*101, front *prp*1, relay *ptg*, battery;

(3) Ground, front *prn*3, *pte*4, *prn*5, contacts of pyramid Py2, outgoing wire 921 corresponding to the second combination received, relay *pth*, battery (each 921 wire is multipled to 5 *pth* relays, so that 5 *pth* relays operate simultaneously).

Relay *pte* prepares a holding circuit for itself at *pte*5; at *pte*6 it completes a holding circuit for relay *ptd*.

Relay *pcj* (Fig. 9) completes the following circuit at *pcj*1: battery, relay *pch*, front *pcj*1, wire 913 (Fig. 10), dotted-line connection *cn*101, wire 920 corresponding to the first digit received from the register, contact pyramid Py1, front *prn*6, *pte*4, *prn*3, ground. Ten *pch* relays have been provided; in the case involved, only 5 of these relays are capable of playing an active role and they are connected respectively to the 5 outgoing wires of contact pyramid Py1. The *pch* relay operating thus corresponds to the first digit received from the register and indicates the line group that must be selected on the banks of the first selector.

Twenty-five *pta* relays (Fig. 10) are available to select an outgoing line on the first-selector banks. Each of these *pta* relays is common to all the line groups and characterizes the position of a given line in the various groups. Twenty-five *pta* relays had to be provided due to the fact that the maximum number of lines contained in a group is 25. In effect, the number of line groups may range from 2 to 5, as has been indicated; if there are two groups, each will comprise 25 lines and the 25 *pta* relays will be used; on the other hand, if there are more than two groups, some of them will comprise less than 25 lines and not all the *pta* relays will be used.

It will be assumed throughout what follows, by way of example, that two groups of 25 outgoing lines have been provided on the banks of the first selectors. Therefore, 2 *pch* relays (Fig. 9) and 25 *pta* relays (Fig. 10) are used. The twenty-five 915 wires respectively connected to the 25 *pta* relays are each multipled to two contacts such as *pch*3 (Fig. 9) belonging to the two *pch* relays used. Thus, 50 wires *t* corresponding respectively to the 50 outgoing lines of the SP selectors are obtained at the outlet of contacts *pch*3. When an outgoing line is connected to a free second selector associated with the connector and to a free impulse receiver, the *t* wire corresponding to said line is connected to the battery over the following circuit: wire *t* (Fig. 11), back *vq*2, wire 1104 (Fig. 12), resistance Re110, back *qrl*1, *qrk*1, *qrh*4, *qrx*1, resistance Re111, battery.

The above-described circuit does not suffice to effect the selection of an outgoing line of the first selector; as has been indicated, the line chosen must in effect meet two conditions:

(1) It must be connected to a free second selector associated with a connector and to a free impulse-receiver;

(2) It must be connected to a second selector giving access to at least one free line in the group corresponding to the second digit sent by the register.

Chain circuits arranged as follows have been provided in order to meet the second condition. Each of the twenty-five 922 wires (Fig. 10) connected to the *pta* relays is multipled, through a front contact *ptc*2 and a rectifier Rd106, to two *ptg*1 contacts respectively associated with the two *ptg* relays used. Thus, fifty 923 wires respectively corresponding to the fifty outgoing lines of first selector SP are obtained at the outlet of contacts *ptg*1. Each of the 923 wires is multipled to 10 contacts *pth*1 respectively associated with the *pth* relays characterizing the 10 different second combinations. Thus, 500 wires 924 are obtained at the outlet of contacts *pth*1, each of said wires characterizing both the place of an outgoing line on the first-selector banks and the group that must be selected by the second selector by means of the second digit sent by the register. Each outgoing line of the first selector therefore corresponds to 10 wires 924, one or another of which are cut in according to the nature of the second digit.

Figure 12:
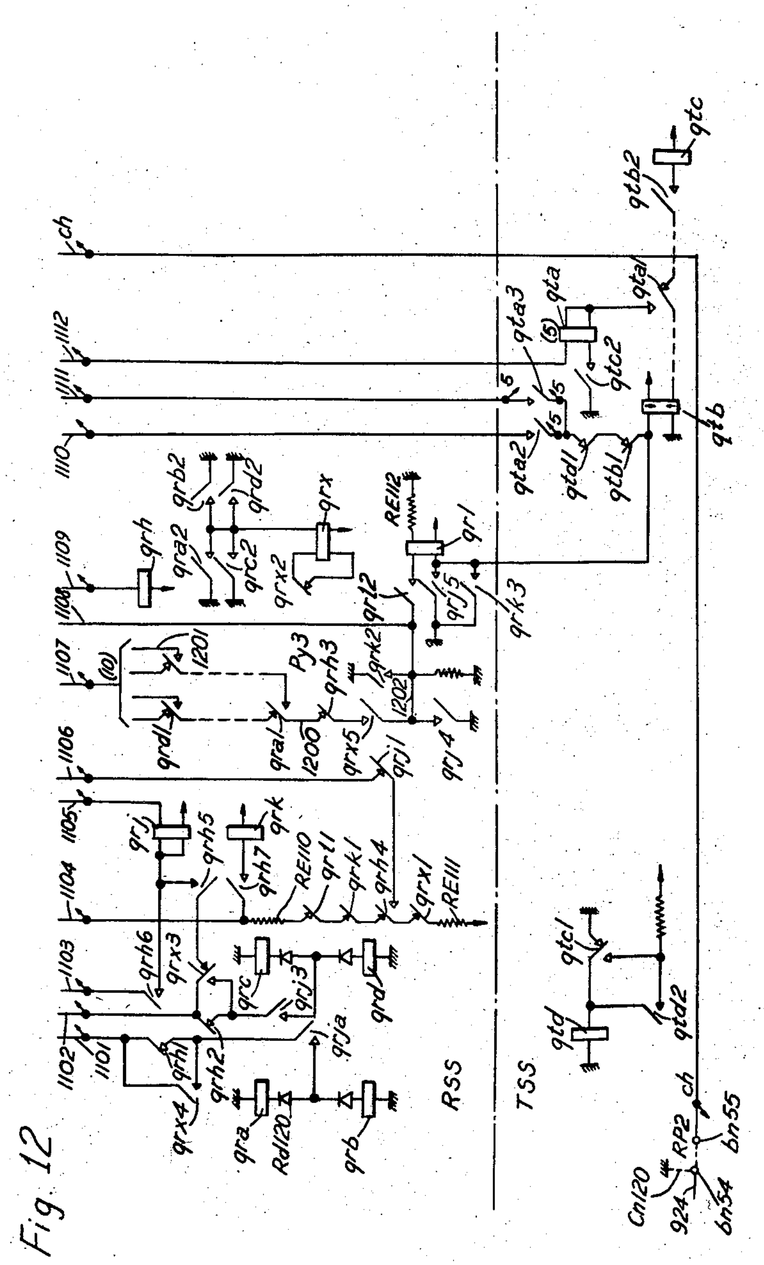
Fig. 12 shows the schematic of the impulse-receiver and of the tester provided for controlling the operation of the second selector of Fig. 11.

Each 924 wire is connected to a left-hand terminal *bn*54 of distributer RP2 (Fig. 12). This distributer comprises, in addition, a certain number of terminals *bn*55, each corresponding to the assembly of lines of one and the same group that are capable of being reached by one and the same second-selector section. If $q$ is used to designate the number of second-selector sections and if it is borne in mind that there are 10 second combinations that can be received, the number of terminals *bn*55 will be equal to $10 \times q$.

The connections within distributer RP2 will depend upon the connections made between the first and the second selectors. Generally, if an outgoing line of a first selector gives access to a second selector belonging to the section of position *n*, the 10 *bn*54 terminals associated with that line will be connected respectively to the *bn*55 terminals of that section. If it is assumed, for example, that the first outgoing line of the calling selector terminates at a second selector of section No. 1, the second outgoing line of the calling selector terminating at a second selector of section No. 2, and so forth, the 10 *bn*54 terminals associated with the first outgoing line of the calling selector will be connected respectively to the 10 *bn*55 terminals corresponding to the first second-selector section; the 10 *bn*54 terminals associated with the second outgoing line of the calling selector will be connected respectively to the 10 *bn*55 terminals of the second second-selector section, and so forth.

Each *bn*55 terminal is connected to a chain wire *ch*, each *ch* wire being common to the various lines served by one and the same second-selector section and corresponding to one and the same call number. In the case of calls intended for local subscribers, the outgoing lines of the second selectors terminate at fifties selectors SC. Each *ch* wire (Figs. 12, 11 and 6) is multipled to the *vc*2 contacts of all the fifties selectors SC connected to the outgoing lines of a second-selector section and corresponding to one and the same call number. In the example described it has been assumed that each second-selector section gave access to 50 lines, or 5 lines per call number; each *ch* wire will therefore be multipled to 5 back contacts such as *vc*2.

From the preceding explanation it follows that if there is a second-selector section having access, in the group dialed, to a free fifties selector associated with a free connector, the *bn*55 terminal (Fig. 12) corresponding to one section and to this group will be grounded over the following circuit: wire *ch* (Figs. 12, 11 and 6), wire 600, back *vc*2, back contact of individual switch *cisc*, ground. If the calling selector has a line terminating at a second selector of this section the *bn*54 terminal associated with that line and corresponding to the second digit received is connected to the above-mentioned *bn*55 terminal and is therefore grounded.

The following circuit is then completed: terminal *bn*54 grounded, wire 924 (Fig. 10), front *pth*1, *ptg*1, rectifier R*d*106, front *ptc*2, windings in series of relay *pta*, wire 915 (Fig. 9), front *pch*3, wire *t* (Fig. 11), back *vq*2, wire 1104 (Fig. 12), resistance R*e*110, back *qrl*1, *qrk*1, *qrh*4, *qrx*1, resistance R*e*111, battery. Relay *pta* energizes.

It will be noted that if several outgoing lines of the first selectors give access to second selectors of one and the same section, several *bn*54 terminals of distributer RP2 (Fig. 12) are combined into one and the same *bn*55 terminal, which entails the risk of causing confusion between the circuits of two *pta* relays (Fig. 10); rectifiers R*d*106 have been provided to prevent such confusion.

It will be noted also that one and the same fifties selector can be reached from a number of first testers; each chain wire *ch* is therefore multipled to several distributers RP2 (Fig. 12).

Relay *pta* (Fig. 10) opens over its back *pta*1 the circuit of relay *ptc*, which releases; over its front *pta*1 it completes the following holding circuit for itself: ground, upper winding of relay *ptb*, back *ptf*1, front *pta*1, upper winding of relay *pta*, wire 915 and the previously-described circuit. The upper winding of relay *ptb* being of low resistance as compared with the lower winding of relay *pta*, the potential on test wire 915 drops, so as to mark the selected line busy. Further, equal fluxes of opposite sense are produced in relay *ptb* assuming the line is selected only by the tester involved and said relay releases. Over its front *pta*3 and *pta*4 relay *pta* prepares the energization of the selection magnets corresponding to the line selected.

Upon releasing, relay *ptb* prepares at *ptb*1 the energization of the selection magnets corresponding to the line selected.

Relay *ptc* short-circuits over its back *ptc*1 relay *ptd*, which releases with a certain delay.

If there are several outgoing lines of the first selector that meet the conditions required, several *pta* relays have been able to operate simultaneously; however, all these various relays have their energizing circuits opened at *ptc*2; only one of them can hold over its front *pta*1 and over back *pta*1 prevents the other relays from holding over similar circuits. Priority is thus given to the *pta* relay whose back *pta*1 is placed the nearest to relay *ptb*.

Relay *ptd* releases and at *ptd*1 controls the energization of the selection magnets corresponding to the line chosen, the following two circuits being completed.

(1) Ground, front *prn*3 and *pte*4, back *ptb*1 and *ptd*1, front *pta*3, wire 914 (Fig. 9), front *pch*1, magnet S*po*, battery, or magnet S*p*, front *pcc*2, *pce*2, resistance R*e*93, battery;

(2) Ground, front *prn*3 and *pte*4 (Fig. 10), back *ptb*1 and *ptd*1, front *pta*4, wire 911 (Fig. 9), front *pch*2, magnet S*px* or S*py*, battery.

As has been indicated, the 50 lines served by a multi-connector are divided up into two series of 25 each. To choose one or the other of these two series there are two selection magnets S*px* and S*py*; to choose a given line within one series there are 25 selection magnets, namely, 4 magnets S*p*, 4 magnets S*p′*, 4 magnets S*p″*, 4 magnets S*p‴* and 9 magnets S*po*. To allow the operation of a series-selecting magnet and of a magnet selection a line within a series by means of a combination of a *pta* relay and a *pch* relay, the energizing circuits of said magnets are arranged as follows.

Back *ptd*1 (Fig. 10) is multipled to 25 *pta*3 contacts respectively belonging to the 25 different *pta* relays; the 25 wires 914 outgoing from the *pta*3 contacts are multipled each to two *pch*1 contacts (Fig. 9) respectively belonging to the two *pch* relays characterizing the two first combinations used. At the outlet of the *pch*1 contacts there are thus obtained fifty 923 wires, respectively corresponding to the 50 outgoing lines of the first selector. The two 923 wires respectively corresponding to the two lines served by one and the same selection magnet are multiplied to one and the same 924 wire. There are thus obtained twenty-five 924 wires corresponding respectively to the 25 selection magnets of the multi-connector. The first sixteen 924 wires are connected to the 16 magnets S*p*, S*p′*, S*p″*, S*p‴*; the last nine 924 wires are connected to the 9 magnets S*po*. As follows from the preceding explanations, the Sp . . . Sp''' magnets can be used during two phases of operation, namely, first to select the calling first selector and then to select an outgoing line of said first selector. On the other hand, the 9 Spo magnets take no part in selecting a calling first selector.

Contact *ptd*1 (Fig. 10) is multipled to 25 *pta*4 contacts belonging to the 25 *pta* relays. Twenty-five 1000 wires are thus obtained at the outlet of the *pta*4 contacts. These wires are divided up into 5 groups of 5 each, the wires of one and the same group being all multipled to one and the same 911 wire. The five 911 wires thus obtained are each multipled to two *pch*2 contacts (Fig. 9) belonging to the two *pch* relays characterizing the two first combinations used. Ten 925 wires are thus obtained at the outlet of the *pch*2 contacts. These wires are divided up into two 5-wire groups, the 5 wires of one and the same group being all multipled to one and the same 926 wire. The two 926 wires are thus obtained, one of which is connected to the Spx magnet and the other to the Spy magnet. All these multiplings are so made that two lines served by one and the same Sp or So selection magnet will correspond to two different 926 wires.

Throughout what follows it will be assumed by way of example that one of the four Sp magnets and the Spx magnet have operated.

Relay *ptd* completes a holding circuit for relay *pte* at *ptd*2.

The Sp selection magnet operating completes the following holding circuit for itself: battery, resistance Re93, front *pce*2 and *sp*1, magnet Sp, wire 924, front *sp*2, *pcg*10, wire 912 (Fig. 10), front *prg*1, wire 909 (Fig. 9), front *pcg*2, ground. Of course, the *sp*2 and *spo*2 front contacts respectively associated with the 25 line-selecting magnets are all multipled to the same *pcg*10 contact.

The Spx selection magnet operating completes the following holding circuit for itself: battery, magnet Spx, front *spx*2, *pcg*10 and the previously-described circuit.

Further, the Sp and Spx magnets complete together the following circuit: battery, connecting magnet Yp of individual switch *cisp*1, front *pcg*5, wire 916 (Fig. 10), back *prq*3, *prm*1, wire 904 (Fig. 9), front *pcg*7, *spx*1, *sp*3, *pce*4, ground. Front contacts *spx*1 and *spy*1 of the two magnets Spx and Spy are placed in parallel with the preceding circuit, as indicated by the multipling arrows on either side of said contacts. The same applies to the *sp*3 and *spo*3 contacts of the 25 magnets selecting lines within a series. The preceding circuit is therefore completed regardless of the selection magnets that have operated.

Magnet Yp causes the connection of first-selector connector CSP to the selected outgoing line over the contacts of individual switch *cisp*1. This causes the placing of a ground on wire *t* over front *yp*5 in order to maintain the busy marking on the line chosen; further, it causes the seizure of the second selector SS connected to said line, the following circuit being completed: ground, back *prh*3 (Fig. 10), right-hand winding of relay *prj*, wire 917 (Fig. 9), front *yp*4, contact of individual switch *cisp*1, wire *c* (Fig. 11), back *vq*6, relay *qcj*, wire 1105 (Fig. 12), windings in series of relay *qrj*, battery. Relays *qcj* and *qrj* energize in series over the preceding circuit, but relay *prj* remains unoperated owing to the high resistance of the upper winding of relay *qrj*.

Operating magnet Yp (Fig. 9) opens over its back *yp*1 the circuit of relay *prn* (Fig. 10), which releases.

Relay *prn* opens at *prn*3 the lower-winding circuit of relay *pte*, which releases, and the lower-winding circuit of relay *ptb*, which reenergizes over its upper winding; at *prn*4 it opens the circuit of relay *pcj* (Fig. 9), which releases; at *prn*5 (Fig. 10) it opens the circuit of relay *pth* and at *prn*6 the circuit of relays *ptg* and *pch* (Fig. 9), which also release; at *prn*9 (Fig. 10) it opens the circuit of relay *prp*.

The second digit sent by the register to first-selector impulse-receiver RSP is then retransmitted by said impulse-receiver to second-selector impulse-receiver RSS in the form of a positive polarity over the following circuit: ground, A.C. generator Ge10, rectifier Rd105, resistance Re105, front *prf*3, back *prj*1, wire 919 (Fig. 9), front *yp*2, contact of individual switch *cisp*1, wire *a* (Fig. 11), back *vq*4, wire 1101 (Fig. 12), back *qrh*1, front *qrj*2, rectifier Rd120, relay *qra*, ground.

Relays *qra* . . . *qrd* are arranged in the same fashion as the relays that have received the first digit in the first-selector impulse-receiver and operate identically. The sole difference lies in the fact that only 10 out of the 16 combinations that can be obtained are used, respectively corresponding to the 10 outgoing-line groups of the second selectors. In the example described it was assumed that only relay *prf* (Fig. 10) operated out of the 4 relays *prf* . . . *prf'''*, this explaining why only relay *qra* (Fig. 12) operates out of the 4 relays *qra* . . . *qrd*.

Relay *qrj* causes at *qrj*5 the operation of relay *qtb* over its upper winding and that of relay *qr*1.

Relay *qtb* completes the following circuit at *qtb*2: ground, lower winding of relay *qtb*, back *qta*1, front *qtb*2, relay *qtc*, battery. Relay *qtc* energizes and relay *qtb* remains energized for reasons already explained in the description of the operation of the first-selection stage. Five *qta* relays have been provided, the back contacts *qta*1 respectively associated with said relays being all placed in series with the previously-described circuit.

Relay *qtc* causes at *qtc*1 the operation of relay *qtd*; at *qtc*2 it prepares the test circuit of a free line.

Relay *qtd* completes a holding circuit for itself at *qtd*2.

In first-selector connector CSP (Fig. 9) relay *pch* opens at *pch*3 the circuit of relays *pta* and *ptb* (Fig. 10), which release.

First-selector tester TSP is released completely and ready to be used for the routing of a new call.

In second-selector impulse-receiver RSS (Fig. 12) the contacts associated with the various receiving relays *qra* . . . *qrd* are arranged, according to a known method, in a pyramid Py3 comprising one incoming wire 1200 and 10 outgoing wires 1201 respectively corresponding to the 10 digits that can be received.

Relay *qra* completes an energizing circuit for relay *qrx* at *qra*2. This relay is slowed down somewhat by the short-circuit of its left-hand winding. When it operates, it removes this short-circuit at *qrx*2; over its front *qrx*4 it completes a holding circuit for receiving relay *qra*; over its front *qrx*5 it completes the following circuit: ground, front *qrj*4 and *qrx*5, back *qrh*3, wire 1200, contacts of pyramid Py3 in the position corresponding to the digit received, wire 1107 (Fig. 11), front *qcj*1, relay *qch*, battery. Ten *qch* relays have been provided, respectively characterizing the 10 digits that can be received.

Relay *qch* prepares the circuit of the selection magnets at *qch*1 and *qch*2; at *qch*4 it completes the following holding circuit for itself: battery, relay *qch*, front *qch*4, wire 1108 (Fig. 12), front *qrj*4, ground.

Five relays *qta* are available to select a free line in the group corresponding to the digit received. These relays are common to the various line groups and each characterizes the position of a line within a group. Five 1112 wires are thus obtained at the outlet of relays *qta*. Each of said wires is multiplied to 10 contacts *qch*3 (Fig.11) respectively associated with the 10 *qch* relays. At the outlet of the *qch*3 contacts are thus obtained fifty 1114 wires, respectively corresponding to the 50 outgoing lines of the second selector. A line terminating at a free fifties selector has its *t* wire connected to the battery over the following circuit: wire *t* across distributor RP3 and cable 1115 (Fig. 6), back *vc*3, resistance Re61, battery.

If there is a free line in the group corresponding to the second digit sent by the register, the *qta* relay (Fig. 12) characterizing the position of that line energizes over the following circuit: ground, front *qtc*2, windings in series of relay *qta*, wire 1112 (Fig. 11), front *qch*3 corresponding to the digit received, wire 1114 and wire *t* connected to the battery over the circuit already described.

Relay *qta* completes the following holding circuit for itself over its front *qta*1: ground, lower winding of relay *qtb*, front *qta*1, upper winding of relay *qta*, wire 1112 and the previously-described circuit. The resistance of the lower winding of relay *qtb* being low as compared with the resistance of the lower winding of relay *qta*, the potential on wire 1112 is lowered in order to busy the selected line; in addition, if that line is selected only by the TSS tester involved, the fluxes produced in the two windings of relay *qtb* are equal and of opposite sense; said relay releases. Relay *qta* prepares at *qta*2 and *qta*3 the circuit of the multi-connector's selection magnets.

Relay *qtb* also prepares at *qtb*1 the circuit of the multi-connector's selection magnets; at *qtb*2 it causes the release of relay *qtc*.

Relay *qtc* causes over its back *qtc*1 the short-circuiting of relay *qtd*, the latter releasing after a short period of time. Had there been other lines free in the group dialed, several *qta* relays could have operated; however, these relays have their energizing circuit opened at *qtc*2; one of them holds over its front *qta*1 and through the opening of its back *qta*1 prevents the other relays from holding over similar circuits.

Relay *qtd* complete at *qtd*1 the following circuits for the multi-connector's selection magnets:

(1) Ground, front *qrj*5, back *qtb*1 and *qtd*1, front *qta*2, wire 1110 (Fig. 11), front *qch*1, selection magnet S*q*, battery;

(2) Ground, front *qrj*5 (Fig. 12), back *qtb*1 and *qtd*1, front *qta*3, wire 1111 (Fig. 11), front *qch*2, selection magnet S*qx* or S*qy*, battery.

Like the first multi-connector, the second multi-connector comprises two selection magnets S*qx* and S*qy* for choosing a 25-line series and 25 magnets S*q* for choosing a line within a series. From a multipling standpoint, the circuits of the S*q* magnets are arranged according to the same method as test relays *qta*, with the difference that two lines are made to correspond to one and the same selection magnet. For example, one S*q* selection magnet will be assigned to the first line of group No. 1 and to the first line of group No. 6, a second selection magnet to the first line of group No. 2 and to the first line of group No. 7, and so forth. Under these conditions, the 10 *qch*1 contacts will be placed in parallel in pairs and each of the 1110 wires will be multipled to the 5 contact groups thus made up.

On the other hand, over the energizing circuit of series-selection magnets S*qx* and S*qy*, all the 5 *qta*3 contacts are placed in parallel, as indicated by the multipling arrows placed on either side of said contacts, which will give a single 1111 wire. If the first series comprises all the lines corresponding to groups 1 to 5 and the second series all the lines corresponding to groups 6 to 10, the 1111 wire will be multipled on the one hand to the *qch*2 contacts of the first five qch relays placed in parallel and on the other hand to the *qch*2 contacts of the second five *qch* relays placed in parallel. At the outlet of the *qch*2 contacts are thus obtained two 1116 wires, one connected to the S*qx* magnet and the other to the S*qy* magnet.

The following circuit is completed when one S*qx* selection magnet and one S*q* selection magnet have operated: ground, front *sqx*1 or *sqy*1, front *sq*1, wire 1109 (Fig. 12), relay *qrh*, battery.

Relay *qrh* opens at *qrh*1 one of the circuits of receiving relay *qra*, which nevertheless holds over *qrx*4; over its front *qrh*4 it prepares the energizing circuit of connecting magnet V*q* of second selector SS (Fig. 11); over its front *qrh*6 (Fig. 12) it short-circuits the high-resistance upper winding of relay *qrj* as also relay *qcj*; owing to this, relay *qcj* releases and relay *prj* energizes in first-selector impulse-receiver RSP (Fig. 10); at *qrh*7 (Fig. 12) it causes the energization of relay *qrk* over the following circuit: battery, relay *qrk*, front *qrh*7, wire 1104 (Fig. 11), back *vq*2, wire *t* (Fig. 9), front contact of individual switch *cisp*1, front *yp*5, ground.

In first-selector impulse-receiver RSP (Fig. 10) the operation of relay *prj* characterizes the end of the selection operations in the second stage. Relay *prj*, through the opening of its back *prj*1, ends the transmission of the coded combination to the second-selector impulse-receiver, thus causing the release of relay *qra;* over its front *prj*1 it prepares an energizing circuit for relay *prk*; over its front *prj*2 it prepares an energizing circuit for relay *prh*.

In second-selector impulse-receiver RSS (Fig. 11) relay *qrk* ensures at *qrk*2 the holding of the ground on wire 1202 after the subsequent opening of back *qrj*4; over its front *qrk*3 it holds the ground on the lower winding of relay *qr*1 and on the upper winding of relay *qtb*.

Second-digit receiving relay *qra* opens at *qra*2 the circuit of relay *qrx*, which releases.

Relay *qrx* completes the following circuit over its back *qrx*3: battery, lower winding of *qrj*, front *qrh*5, back *qrx*3, wire 1102, (Fig. 11), back *vq*5, wire *b* (Fig. 9), front contact of switch *cisp*1, front *yp*3, wire 918 (Fig. 10), front *prj*2, right-hand winding of *prh* energized, back *prh*2, ground.

Relay *prh* completes at *prh*1 the following holding circuit for itself and for relay *prj*: battery, left-hand windings of relays *prj* and *prh* in series, front *prh*1, wire 909 (Fig. 9), front *pcg*2, ground; at *prh*2 and *prh*3 (Fig. 10) it opens the two holding circuits of relay *qrj* in the second-selector impulse-reeciver RSS of Fig. 12; at *prh*4 it prepares an energizing circuit for relay *prk*.

In second-selector impulse-receiver RSS (Fig. 12) relay *qrj* completes the following circuit at *qrj*1 upon releasing: battery, resistance R*e*111, back *qrx*1, front *qrh*4, back *qrj*1, wire 1106 (Fig. 11), connecting magnet V*q* of the second multi-connector, back *vq*3, wire *a* (Fig. 9), front contact of individual switch *cisp*1, front *yp*2, wire 919 (Fig. 10), front *prj*1 and *prh*4, right-hand winding of relay *prk*, back *prk*2, left-hand winding of relay *prk*, ground. Relay *prk* energizes but connecting magnet V*q* cannot operate owing to the high resistance of the left-hand winding of relay *prk*.

In first-selector impulse-receiver RSP (Fig. 10) relay *prk*, through the action of its two contacts *prk*1 and *prk*2, cuts out its high resistance left-hand winding, causing connecting magnet V*q* of the second multi-connector to operate; at *prk*3 it completes the following energizing circuit for the connecting magnet of the first multi-connector: ground, front *prk*3, wire 903 (Fig. 9), front *pce*5, front *xp*7, contact of individual switch *cisp*, operating magnet V*p* of the first multi-connector, battery.

Magnet V*p* causes, in first selector SP, the connection of incoming-line wires *a, b, c* to the *a, b, c* wires of the line selected. Over its front *vp*1 it completes the following holding circuit for itself: battery, magnet V*p*, resistance R*e*94, front *vp*1, wire *t* and ground in feeder AL; at *vp*2 it opens the holding circuit of connecting magnet X*p*, which releases; at *vp*4 it removes the ground polarity from line wire *a*.

Magnet V*q* (Fig. 11) causes, in second selector SS, the connection of incoming-line wires *a, b, c* to the *a, b, c* wires of the line selected. At *vq*1 it completes the following holding circuit for itself: battery, upper winding of magnet V*q*, front *vq*1, wire *t* (Fig. 9), contact of first selector SP front *vp*6, ground; through the opening of its various back contacts *vq*2 . . . *vq*6 it isolates second selector SS from the associated control members.

The connection is held between feeder AL and the chosen fifties selector SC through first and second selectors SP and SS. The common control members used to control the operation of said selectors will now be released as follows.

Relay *pca* (Fig. 9) releases, having its circuit opened at *xp6*. It will be noted that the various switches are so adjusted that the various contacts associated with the connecting magnets will always be opened before the switch contacts themselves; thus, for example, contacts *xp4* and *xp7* are opened before the corresponding contacts of switch *cisp*. A switch therefore never opens a circuit, and this prevents its premature wear. Relay *pcg* releases, having its circuit opened at *xp2*.

Relay *pcg* removes at *pcg2* the ground on wires 908, 909, which causes the release of relay *prg*, of selection magnets S*px* and S*p* and of relays *pre*, *prf*, *prx*, *prh* and *prj*. Relay *prk* releases when its circuit is opened at *prj1*. The release of the various relays holding over wire 909 is controlled by relay *pr1*. Relay *pr1* remains energized as long as at least one of these relays remains operated. For example, if relay *pre* is the one that has not yet released, relay *pr1* holds over the following circuit: ground, left-hand winding of relay *pr1*, resistance R*e*106, front *prl2*, wire 909, relay *prx*, front *pre1*, relay *pre*, battery. Resistance R*e*106 is of a value that allows the holding of relay *prl* but not of the relay or relays capable of being in series with it. Relay *prl* restores at *prl1* the continuity of wire 905, thus indicating that impulse-receiver RSP is fully released and ready to be used for the routing of a new call. In connector CSP relay *pce* controls the homing of all the selection magnets according to the same method. Connector CSP is fully released after the release of *pce*.

In the second-selection stage (Figs. 11 and 12) magnet V*q* energizes, opening at *vq6* the circuit of relay *qcj* and at *vq2* the circuit of relay *qrk*. Relay *qch* releases, having its circuit opened at *qrj4*. Magnets S*p* and S*qx* home owing to the opening of contacts *qch1* and *qch2*. Relay *qta* has its circuit opened at *qch3*; relay *qtb* has its two windings opened, one at *qch3* and the other at *qrk3*; these two relays also release. Relay *qrh* releases owing to the opening of contacts *sqx1* and *sq1*. As in the case of the first-selection stage, a relay *qrl* has been provided to control the homing of all the other relays, said relay *qrl* holding over its upper winding while another relay is holding over general wire 1202. Thus, if relay *qch* is the one that is still energized, relay *qrl* holds over the following circuit: ground, resistance R*e*112, upper winding of relay *qrl*, front *qrl2*, wire 1108, front *qch4*, relay *qch*, battery. The value of resistance R*e*112 is such that it allows the holding of relay *qrl* over the previously-described circuit without however preventing the release of relay *qch*. Upon releasing, relay *qrl* restores at *qrl1* the continuity of wire 1104, thus indicating that impulse-receiver R*ss* has become available.

Figure 9:
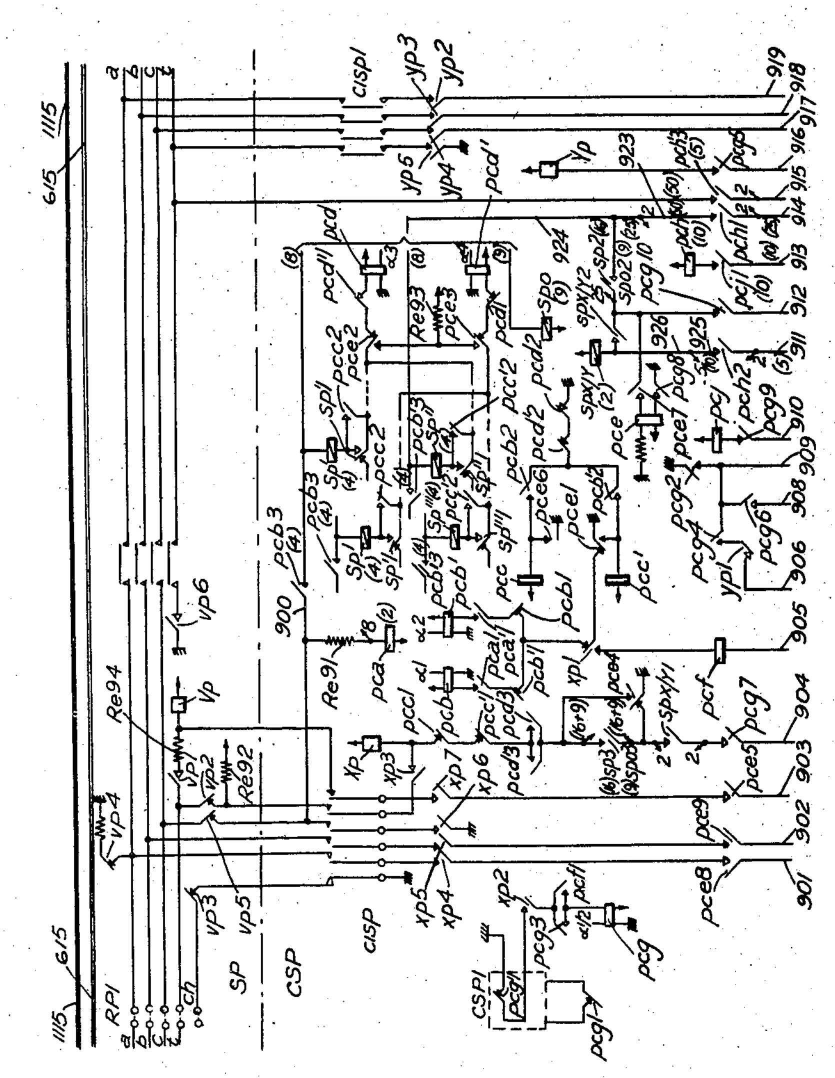
Fig. 9 shows the schematic of the first selector of the group-selecting means and the schematic of the associated connector.
Figure 11:
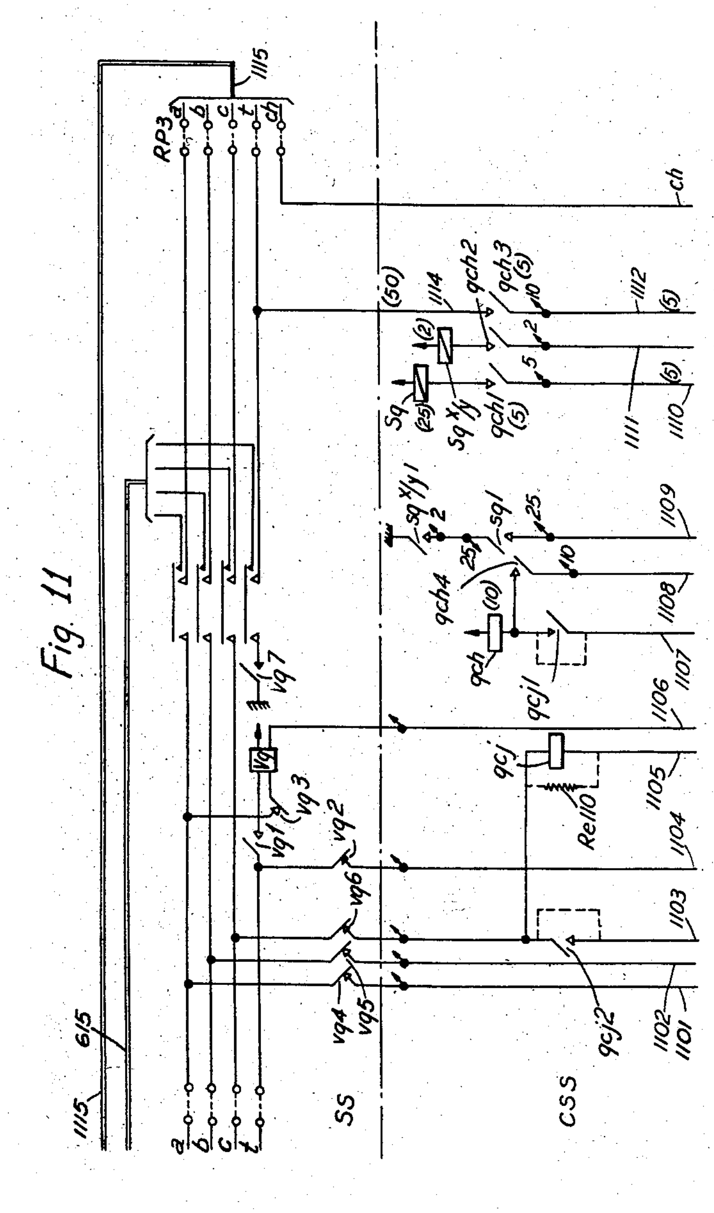
Fig. 11 shows the schematic of the second selector of the group-selecting means and the schematic of the associated connector.

When the connection has been extended up to the fifties selector the ground placed on wire *c* by feeder AL (Fig. 7) is applied, through the first and the second selectors, to wire *c* of fifties selector SC (Figs. 9, 11 and 6).

The following circuit is then completed: ground on wire *c*, back *vc1*, resistance R*e*60, relay *cca*, battery. Connector CSC controls 14 fifties selectors used for the normal routing of calls and 4 fifties selectors used as cooperating selectors; the first 7 normal first selectors and the first 2 cooperating selectors have their *c* wires multipled to a first relay *cca*; the last 7 normal first selectors and the last 2 cooperating selectors have their *c* wires multipled to a second relay *cca*. The *cca* relay operating therefore indicates that the calling fifties selector is comprised in the first or in the second half of the selectors controlled by one and the same connector CSC. It will be assumed throughout what follows that the calling selector is in the first half.

Relay *cca* completes the following circuit at *cca1*: battery, upper winding of relay *ccb*, back *ccb'1*, front *cca1*, back *cce* 4 and *xc1*, ground. Relay *ccb* energizes. Two relays such as *ccb* have been provided; the first (*ccb*) is controlled by front *cca1* and corresponds to the first half of selectors SC having access to connector CSC, the second (*ccb'*) being controlled by front *cca'1* of the second *cca* relay and corresponding to the second half of selectors.

Relay *ccb* prevents at *ccb1* the subsequent operation of relay *ccb'* in the case where one of the SC selectors of the second half was calling during the routing of the call involved; at *ccb2* it completes the following circuit: battery, relay *ccc*, front *ccb2*, back *ccd'2* and *ccd2*, ground. Two *ccc* relays have been provided; the first (*ccc*) is controlled by contact *ccb2* and corresponds to the first half of selectors having access to connector CSC, the second (*ccc'*) being controlled by contact *ccb'2* and corresponding to the second half of selectors. Over its front *ccb3* relay *ccb* prepares the energization of the selection magnet of the multi-connector corresponding to the position of the calling selector.

Relay *ccc* completes the following circuit at *ccc2*: ground on the *c* wire of the calling fifties selector SC, back *vc1*, front *ccb3*, magnet S*c*, front *ccc2*, back *cce1* and *ccd'1*, upper winding of relay *ccd*, battery. Five magnets S*c*, 5 magnets S*c'*, 5 magnets S*c''* and 5 magnets S*c'''* have been provided, or a total of 20 selection magnets. Each of these magnets corresponds to one of the fifties selectors SC having access to connector CSC, with the exception of two of them, since there are only 18 selectors having access to connector CSC. The S*c* magnet operating is therefore individual to the calling fifties selector SC and characterizes said selector. Two relays *ccd* have been provided, the first corresponding to magnets S*c* and S*c''* and the second to magnets S*c'* and S*c'''*.

Relay *ccd* prevents at *ccd1* the subsequent operation of relay *ccd'* as long as the routing of the call involved has not been completed; at *ccd2* it opens the cricuit of relay *ccc*, which, being slow to release, releases only with a certain delay; at *ccd3* it prepares the circuit of connecting magnet X*c*.

The S*c* magnet operating completes a holding circuit for itself over its front *sc1*; at *sc2* it prepares the circuit of magnet X*c*.

When *ccc* releases, it completes the following circuit at *ccc1*: battery, connecting magnet X*c*, front *ccd3*, back *ccc1*, *ccc'1*, *cce3*, front *sc2*, ground.

Magnet X*c* upon operating causes the connection of connector CSC to the calling fifties selector SC through individual switch *cisc*. Owing to this, code-receiving relays *cra* . . . *crd* of impulse-receiver RSC (Fig. 5) are connected to the two line wires over the following circuits:

(1) Relays *cra* and *crb*, rectifiers R*d*51 and R*d*52, wire 606 (Fig. 6), front *xc6*, contact of individual switch *cisc*, line wire *a*;

(2) Relays *crc* and *crd*, rectifiers R*d*53 and R*d*54, back *crz2*, wire 607 (Fig. 6), front *xc5*, contact of individual switch *cisc*, line wire *b*.

Magnet X*c* completes the following holding circuit for itself: battery, magnet X*c*, front *xc2*, contact of individual switch *cisc*, back *vc1*, wire *c* and ground over the circuit already described. Magnet X*c* opens at its back *xc1* the circuit of relay *ccb*, which releases; over its front *xc1* it completes the following two circuits:

(1) Ground, front *xc1*, back *ccj1*, relay *cce*, battery;

(2) Ground, front *xc1*, wire 609 (Fig. 5), back *crz3*, relay *cro*, resistance R*e*56, battery.

Relay *ccb* upon releasing opens at *ccb3* the circuit of selection magnet S*c* and of relay *ccd*, but connector CSC remains connected to the calling selector SC as long as magnet X*c* remains in operating position.

Over its two front contacts *cce1* and *cce2* relay *cce* prepares again the operation of one of the 20 selection magnets for choosing a free line to a terminal selector serving the fifties group comprising the called subscriber;

over its two front contacts *cce*5 and *cce*6 it causes the operation of relays *ccc* and *ccc'*.

In impulse-receiver RSC (Fig. 5) relay *cro* prepares at *cro*2 and *cro*4 the seizure of the marker; at *cro*3 it completes a holding circuit for itself.

In connector CSC relays *ccc* and *ccc'* prepare at *ccc*2 and *ccc'*2 the operation of one of the Sc magnets for the selection of a free line to a terminal selector serving the called fifties group.

When register EN finds a ground polarity on the two line wires across receiving relays *cra* . . . *crd* of impulse-receiver RSC (Fig. 5) it sends said impulse-receiver the last three digits of the called subscriber, always in the form of polarities or of combinations of polarities. The method of receiving these digits is the same as the one already described in the case of the first-selection stage; it is to be noted only that, due to the existence of front *cra*2, relay *crb* cannot operate unless *cra* is operated, this eliminating 4 combinations out of the 16 that can be obtained. Out of the 12 remaining combinations, 10 are used to characterize the hundreds, the tens and the units of the called subscriber.

It will be assumed that the hundreds digit received corresponds to the operation of relay *cra*. This digit is registered at relay *cre*, the following circuit being completed: battery, relay *cre*, back *crx*2, front *cra*1, wire 609 (Fig. 6), front *xc*1, ground. It will be noted that only three relays *cre*, *cre'* and *cre''* have been provided for registering the first digit; the combinations corresponding to the energization of relay *crd* are not used, this reducing to six the number of combinations. This number is sufficient, considering that the line-selecting means serves only 500 subscribers.

During the reception of the hundreds digit the upper winding of relay *crx* is short-circuit over front *cre*1, back *crx*2 and front *cra*1.

When the reception of the hundreds digit has ended, relay *cra* releases, removing at *cra*1 the short-circuit of the upper winding of relay *crx*. Relay *cre* holds and relay *crx* energizes over the following circuit: battery, relay *cre*, front *cre*1, upper winding of relay *crx*, wire 609 and ground over a circuit already described.

Relay *crx* completes a holding circuit for itself over front *crx*1 and wire 609 grounded; over its back *crx*2, *crx*3, *crx*4 it isolates hundreds-digit registering relays *cre*, *cre'* and *cre''*; over its front *crx*2 . . . *crx*5 it prepares the circuit of ten-digit registering relays *crf* . . . *crf'''*; over its front *crx*6 it short-circuits its upper winding in order to apply ground directly to the left-hand terminal of relay *cre* for a purpose that will be explained later.

The tens digit and the units digit are received according to the same method as the hundreds digit. The tens digit is registered at one or more of relays *crf* . . . *crf'''*; the units digit is registered at one or more of relays *crg* . . . *crg'''*. Relay *cry* operates at the end of the reception of the tens digit; relay *crz* operates at the end of the reception of the units digit, that is, when all the digits have been received at impulse-receiver RSC.

When *crz* operates it makes a break in wire 607 over its back *crz*2 in order to tell the register that the reception has been properly effected; over its front *crz*3 it causes the seizure of marker M, the following circuit being completed: wire 609 grounded, front *crz*3 and *cro*4, relay *mba*, resistance Re52, back *mld*5, *mp*3, *mjd*3, *mja*4, relay *mp*, battery. Relays *mba* and *mp* energize. Two relays such as *mba* have been provided in marker M; the first (*mba*) operates when said marker is seized by the first fifties-selector impulse-receiver, the second (*mba'*) operating when the marker is seized by the second fifties-selector impulse-receiver. As has been indicated, one same marker M serves two impulse-receivers RSC.

Relay *mba* completes a holding circuit for itself over its front *mba*1; over its back *mba*1 it prevents the operation of relay *mba'* as long as a call in progress has not been fully routed; over its front *mba*3 it completes the following circuit: battery, relay *mbc*, back *mlc*1, front *mba*3, front *cro*2 and *crz*4, ground. Relay *mbc* energizes. Two relays such as *mbc* have been provided; the first (*mbc*) is controlled by contact *mba*3 and operates when the marker is seized by the first fifties-selector impulse-receiver, the second (*mbc'*) being controlled by contact *mba'*3 and operating when the marker is seized by the second fifties-selector impulse-receiver.

Relay *mbc* prepares at *mbc*1 the operation of marking relays *mcm*, *mdm* and the application of a ground to marking distributor RM; over its front contacts *mbc*2 it causes the transfer of the last three digits of the called subscriber from impulse-receiver RSC to marker M. This transfer is effected as follows. Eleven wires such as 511 have been provided in impulse-receiver RSC (Fig. 5); the first three wires are connected respectively to the left-hand terminals of relays *cre*, *cre'* and *cre''*; the next four wires are connected respectively to the left-hand terminals of relays *crf* . . . *crf'''*; finally, the last four wires are connected respectively to the left-hand terminals of the 4 relays *crg* . . . *crg'''*. The eleven 511 wires are connected respectively, through the medium of contacts *mbc*2, to the eleven 504 wires. The first three 504 wires are connected to three relays *mc*; the next four 504 wires are connected to 4 relays *md*; the last four 504 wires are connected to 4 relays *mu*.

If it is assumed that the hundreds digit received corresponds to relay *cre* (Fig. 5), the tens digit to relay *crf'* and the units digit to relay *crg'''*, the left-hand terminal of each of relays *cre*, *crf'* and *crg'''* will be grounded. In consequence, the following three circuits are completed:

(1) Left-hand terminal of relay *cre* grounded, wire 511, front *mbc*2, wire 504 and the first of the three *mc* relays;

(2) Left-hand terminal of the winding of relay *crf'* grounded, wire 511, front *mbc*2, wire 504 and the second of the *md* relays;

(3) Left-hand terminal of the winding of relay *crg'''* grounded, wire 511, front *mbc*2, wire 504 and the fourth of the *mu* relays.

The first of the three *mc* relays, the second of the four *md* relays and the fourth of the four *mu* relays energize, thus registering the hundreds, the tens and the units digits of the called subscriber.

The relays *mc* provided to register the called subscriber's hundred digit comprise a contact pyramid represented schematically by contacts *mc* . . . *mc''*. Five wires leave this pyramid, each characterizing a given hundreds and terminating at a relay *mcm*. The *mcm* relay characterizing the hundreds dialed therefore energizes over the following circuit: battery, relay *mcm*, contact pyramid *mc''* . . . *mc*, front *mbc*1, back *mlo*1, front *mba*3, front *cro*2 and *crz*4, ground. The relays *md* provided to register the called subscriber's tens digit comprise a contact pyramid represented schematically by contacts *md* . . . *md''*. Ten wires 505 leave this pyramid, each multipled to 5 contacts *mcm*1 respectively associated with the 5 *mcm* relays. At the outlet of contacts *mcm*1 are thus obtained 50 *mdm* relays, each characterizing a given tens in the 500-subscriber group served by the marker involved. The *mdm* relay characterizing the called subscriber's tens energizes over an *mcm*1 contact, pyramid of contacts *md''* . . . *md*, wire 545 (Fig. 5), front *mbc*1 and ground over a circuit already described. The *mu* relays comprise a contact pyramid represented schematically by contacts *mu* . . . *mu''*. Ten wires 506 leave this pyramid, each multipled to 50 contacts *mdm*1 respectively belonging to the 50 *mdm* relays. At the outlet of contacts *mdm*1 are thus obtained 500 marking wires 507, each characterizing a subscriber within the 500-subscriber group served by one and the same marker. In the case under consideration, the 507 wire corresponding to the called subscriber is grounded over a contact mdm1, pyramid of contacts mu" . . . mu, wire 545 (Fig. 5), front mbc1 and a circuit already described.

The 500 marking wires 507 are respectively connected to the 500 input terminals bn51 of distributor RM. This distributor comprises 500 output terminals bn52, each corresponding to a subscriber's position with respect to the terminal selectors and the fifties selectors serving him.

The above-described arrangements allow assigning, within a 500-line group, a given call number to a subscriber capable of occupying any position whatever with respect to the switches serving him. From the preceding explanations it follows that the reception of the called subscriber's last three digits in marker M is translated into the grounding of an input terminal bn51 corresponding to the call number received and of an output terminal bn52 corresponding to the position occupied by the called subscriber on the selector banks. The following circuit is then completed: terminal bn52 grounded, wire 313 (Fig. 3), back la3 and lc4, wire 303, resistance Re31, relay tca, battery. Relay tca energizes.

As has been said in the description of the diagram of Fig. 1, terminal-selector connector CST serves two consecutive subscriber fifties. Wire 313, back la3 and lc4 and wire 303 are individual to each subscriber. The 303 wires of the first 25 subscribers served by connector CST are multipled across resistance Re31 to a tca relay; likewise, the 303 wires of the other 25-subscriber groups served by this same connector are multipled respectively to three other tca relays. The tca relay operating therefore indicates the position of the called subscriber's group among the four 25-subscriber groups served by CST.

The tca relay operating completes the following circuit at tca1: ground, front tca1, wire 403( Fig. 4), relay mga, battery. The tca1 contacts of the two 25-subscriber groups belonging to one and the same fifties are multipled to one and the same mga relay; the mga relay operating therefore characterizes the called subscriber's fifties. Of course, 10 mga relays have been provided in marker M, since there are 10 subscriber fifties in the 500-subscriber group served by one and the same line-selecting means; two out of these 10 mga relays are capable of operating under the action of the CST terminal-selector connector involved; the other eight are connected to the other connectors.

Relay tca prepares at tca2 an energizing circuit for relay tcb.

Relay mga completes the following circuit at mga2 (Fig. 5): ground, front mga2, back mgb1, front mba4, back mgc'1, right-hand winding of relay mgc, wire 528 (Fig. 6), relay acc, resistance Re62, battery. Relays mgc and acc energize. The 10 mga2 contacts corresponding respectively to the 10 fifties are multipled through the medium of contacts mgb1, to one and the same mba4 contact. Over its front mga4 relay mga prepares the sending of the number of the fifties in call-finder connector CCA.

When relays mgc (Fig. 5) and acc (Fig. 6) have operated, the following circuit is completed: ground, front mga4, back mgb3, front mgc2, wire 526 (Fig. 6), relay ach, front acc2, back acd'1, lower winding of relay acd, battery. Relays ach and acd energize in series. Marker M (Fig. 5) includes one mga4 contact, hence one 526 wire per fifties group; the first five 526 wires are connected respectively to the five ach relays (Fig. 6), the last five 526 wires being connected to the five ach' relays. Since the mga4 contact closed characterizes the called subscriber's fifties, the ach relay operating therefore likewise characterizes said fifties.

Relay acd short-circuits at acd2 relay acc, which releases with a certain delay; over its front acd3 it prepares the sequence of operations in the terminal-selector connector.

Relay ach completes a holding circuit for itself over front ach1; over its front ach2 it prepares the sequence of operations in the terminal-selector connector; over its front ach3 it prepares the test circuit for a free line outgoing from the fifties selector and terminating at a terminal selector giving access to the called fifties; over its front ach4 it prepares an energizing circuit for one of the fifties selector selection magnets.

In marker M (Fig. 5) slow-acting relay mp energizes after the lag imposed by its delay in energizing. At mp4 it causes the application of a ground on general holding wire 402, this completing the following two circuits:

(1) Wire 402 grounded, upper winding of relay mtf energized, battery;

(2) Wire 402 grounded, back mjb1, upper winding of mja energized, battery.

Over its front mp5 (Fig. 4) relay mp causes the energization of relay mlb and prepares the called subscriber's double-test circuit.

Relay mja (Fig. 5) completes the following circuit at mja2: ground, front mja2, back mjd1, lower winding of relay mjc energized, battery.

Over its front mlb1 relay mlb completes the following circuit: battery, resistance Re43, front mlb1, relay mlc (which energizes with a certain delay), back mla5, ground.

When relay acc (Fig. 6) releases after the lag imposed by its delay, it completes the following three circuits at acc1:

(1) Ground, front acd3, back acc1, wire 525 (Fig. 5), back mtj1, front mba6, wire 524 (Fig. 6), relay ccf, battery;

(2) Ground, front acd3, back acc1, wire 525 (Fig. 5), back mtc3, upper winding of relay mtc, battery;

(3) Ground, front acd3, back acc1, front ach2 characterizing the called fifties, wire 604 (Fig. 3), front tca2, front tcb'1, lower winding of relay tcb, battery.

Back acc1 (Fig. 6) is multipled to the 10 ach2 contacts corresponding to the 10 fifties; at the outlet of the ach2 contacts are thus obtained ten 604 wires. The first two 604 wires terminate at the CST terminal-selector connector serving the first two subscriber fifties; the next two 604 wires terminate at the connector serving the next two fifties, and so on.

In terminal-selector connector CST (Fig. 3) wire 604 is multipled on the one hand to the tca2 contacts of the two tca relays respectively corresponding to the first and third 25-subscriber groups and on the other hand to the tca'2 contacts of the two tca relays corresponding to the second and fourth 25-subscriber groups. The tcb relay operating therefore characterizes, the same as relay tca, the position occupied by the 25-subscriber group comprising the called subscriber. Relay tcb prepares at tcb2 an energizing circuit for one of the St selection magnets; at tcb3 it completes the circuit of the Stx selection magnet. The tcb3 contacts of the two tcb relays, one characterizing the first 25-subscriber group and the other the third 25-subscriber group, are multipled to one and the same Stx selection magnet; this latter, upon energizing, therefore indicates that the called subscriber is either in the first or in the third 25-subscriber group served by connector CST. Relay tcb prepares at tcb4 a double-test circuit for the called subscriber; at tcb6 it completes the following circuit: battery, relay tcc (which energizes after a short delay), front tcb6, back tcd'2 and tcd2, ground. There is only one tcc relay in the connector CST under consideration, the four tcb6 contacts of the four tcb relays being all placed in parallel with the circuit of said tcc relay.

In fifties-selector connector CSC (Fig. 6) relay ccf upon energizing prepares over its various front contacts ccf1, ccf2 and ccf5 the continuity of the connecting circuits between said connector and the marker.

In marker M (Fig. 5) relay mtc completes the following holding circuit for itself at mtc4: battery, relay mtc, front mtc4, back mta'''1 . . . mta, lower winding of relay mtf, ground. The fluxes produced in the two windings of relay mtf are opposite, but the flux of the upper winding is preponderant and relay mtf remains energized, Relay *mtc* causes the operation of relay *mtd* over its front *mtc*1, resistance Re53 and battery; over its front *mtc*2 it controls the testing of a free line outgoing from the fifties selector and terminating at a terminal selector serving the called subscriber's fifties. As has been indicated in the description of the general operation, fifties selector SC gives access to 52 lines, 40 of which are used for the normal routing of calls, the last 10 lines being connected to cooperating selectors. These 40 lines are divided up into 10 4-line groups, each group being designed to serve a given fifties. Relay *ach* (Fig. 6) determines the group that must be selected. Four relays *mta* are available in marker M (Fig. 5) to choose a free line within this group; these relays are common to the 10 line-groups and each of them characterizes the position of a line within any one group. Each of the *mta* relays is multipled, through the medium of wire 521 (Fig. 6), to 10 *ach*3 contacts respectively belonging to the 10 different *ach* relays. At the outlet of the *ach*3 contacts are thus obtained forty 612 wires respectively corresponding to the 40 lines outgoing from the fifties selector. When one of these lines terminates at a free terminal selector, the corresponding 612 wire is connected to the battery over back *vt*1 (Fig. 3) and resistance Re32.

It will be assumed throughout what follows that there is on the banks of the fifties selector at least one free line terminating at a terminal selector serving the called fifties. The following circuit is then completed: ground, front *mtc*2 (Fig. 5), windings of relay *mta* in series, wire 521 (Fig. 6), front *ach*3 corresponding to the fifties dialed, wire 612 connected to the battery as indicated before. Several relays such as *mta* can operate if there are several free lines capable of serving the fifties dialed.

Relay *mta* opens over its back *mta*1 the circuit of relay *mtc*, which releases; over its front *mta*1 it causes the low-resistance lower winding of relay *mtf* to be placed in parallel with its own high-resistance lower winding in order to lower the test potential on wire 521 and to busy the terminal selector chosen. Assuming said terminal selector is tested only by the marker under consideration, the fluxes produced in the two windings of relay *mtf* are equal and of opposite sense and said relay releases. Relay *mta* prepares at *mta*2 and *mta*3 the operation of the fifties-selector selection magnets.

Relay *mtd* causes at *mtd*2 the operation of relay *mte*; at *mtd*3 it completes a holding circuit for itself.

Relay *mte* prepares at *mte*1 the operation of the fifties-selector selection magnets.

Upon releasing, relay *mft* completes the following holding circuit for relay *mte* at *mtf*1: battery, right-hand winding of relay *mte*, front *mte*2, back *mtf*1, front *mp*4, ground; at *mft*2 it prepares the operation of the fifties-selector selection magnets.

Upon releasing, relay *mtc* short-circuits over its back *mtc*1 and back *mtg*4 relay *mtd*, which releases with a certain delay; at *mtc*2 it opens the circuit of all the *mta* relays that have been able to operate. One of them holds over its front *mta*1 and over its back *mta*1 prevents the holding of the other relays over a similar circuit (back contacts *mta*1 of the four *mta* relays are all placed in series).

When relay *mtd* releases, it completes the following two circuits at *mtd*1:

(1) Ground, front *mp*4, front *mte*1, back *mtd*1 and *mtf*2, front *mta*3, wire 520 (Fig. 6), front *ccf*2, selection magnet S*cx*, battery, and, in parallel with the preceding circuit, magnet S*ax*, battery;

(2) Ground, front *mp*4 and *mte*1, back *mtd*1 and *mtf*2, front *mta*2, wire 522 (Fig. 6), front *ach*4, magnet S*a*, and, in parallel with the preceding circuit, front *ccf*1, selection magnet Sc corresponding to the line selected, front *ccc*2 and *cce*1, resistance *Re*63, battery.

It will be noted that an S*a* selection magnet energizes in parallel with the Sc magnet and that one of the S*ax* or S*ay* magnets energizes in parallel with the S*cx* or S*cy* magnet. This results from the fact that the 18 fifties selectors (14 normal selectors plus 4 cooperating selectors) controlled by connector CSC cannot, for reasons of design explained at the beginning of this description, be placed in one and the same multi-connector. Sixteen out of these 18 selectors have been grouped together to form a first multi-connector; the other two are placed in the same multi-connector as the 14 call finders CA. If the calling fifties selector is either one of these other two selectors it will also be necessary to cause the operation of the selection magnets corresponding to the call-finder multi-connector; thus, in all cases, the energization is caused, on the one hand, of the fifties-selector multi-connector's selection magnets and, on the other hand, of the selection magnets of the multi-connector containing the 14 call finders.

The multi-connector corresponding to the first 16 fifties selectors SC comprises two magnets allowing the selection of a 25-line series, namely, magnets S*cx* and S*cy*, and 25 magnets allowing the selection of a line within each 25-line series, namely, 5 S*c* magnets, 5 S*c*′ magnets, 5 S*c*″ magnets, 5S*c*‴ magnets and 5 S*co* magnets. The 5 S*co* magnets correspond to the 10 cooperating lines mentioned in the description of the junction diagram and are not used in the case under consideration. The 20 magnets S*c* . . . S*c*‴ correspond to the 40 lines used for the normal routing of calls.

Likewise, the multi-connector containing the 14 call finders and the last two fifties selectors comprises two magnets allowing the selection of a 25-line series, namely, magnets S*ax* and S*ay*, and 25 magnets allowing the selection of a line within each 25-line series, namely, 20 S*a* magnets and 5 S*ao* magnets. The 5 S*ao* magnets correspond to the 10 cooperating lines, the 20 S*a* magnets corresponding to the 40 lines used for the normal routing of calls.

In order to obtain the proper operation of the selection magnets corresponding to the line selected, the circuits of said magnets are arranged as follows. Contact *mtf*2 (Fig. 5) is multipled on the one hand to 4 *mta*2 contacts respectively associated with the 4 *mta* relays and on the other hand to the *mta*3 contacts likewise associated with the 4 *mta* relays. At the outlet of the *mta*2 contacts are thus obtained four 546 wires, which are grouped by pairs. Each of the 522 wires thus obtained is mutipled to 10 *ach* 4 contacts associated with the 10 *ach* relays. At the outlet of the *ach*4 contacts are thus obtained twenty 613 wires, each corresponding to two lines occupying different positions in a group. These 20 wires are respectively connected to the 20 S*c* and S*a* selection magnets. At the outlet of the *mta*3 contacts are obtained four 545 wires, which are grouped by pairs; each of the two wires 520 thus obtained corresponds to 20 outgoing lines. The first 520 wire is connected to the S*cx* and S*ax* selection magnets; the second 520 wire is connected to the S*cy* and S*ay* selection magnets.

The S*c* selection magnet and the S*cx* (or S*cy*) selection magnet prepare the connection of the fifties selector to the line selected. The S*c* magnet completes a holding circuit for itself over its front *sc*1; over *sc*2 and *cce*3 it completes a holding circuit for relay *cce*.

The S*a* and S*ax* selection magnets nevertheless play an active role even when the calling fifties selector is not in the multi-connector containing the 14 call finders CA. In effect, when both of these magnets have operated, the following circuit is completed: ground, front *sax*1 (or *say*1), front *sa*1, wire 517 (Fig. 5), relay *mle*, battery. Relay *mle* energizes. The two selection magnets S*a* and S*ax* prepare, one at *sa*2 and the other at *sax*2, an energizing circuit for the connecting magnet of the terminal selector.

Relay *mle* (Fig. 5) prepares at *mle*1 the circuit of relay *mld*.

In terminal-selector connector CST (Fig. 3) slow-acting relay *tcc* operates after the time lag imposed by its delay in energizing. Over its front *tcc*2 it completes the following circuit: battery, upper winding of relay *tcd*, back *tcd'*1, front *tcc*2, selection magnet S*t*, front *tcb*2, wire 303, back *lc*4 and *la*3, wire 313 (Fig. 4) and terminal *bn*52 of marking distributer RM grounded over a circuit already described. As has been indicated, the 100 subscribers served by terminal-selector connector CST are divided up into four 25-line groups. The 303 wires of the first subscribers in each group are all multipled, across a contact *tcb*2, to a first magnet S*t*; the same applies to the 303 wires of the next subscribers, up to the thirteenth subscriber in each group, inclusive. The 303 wires of the last 12 subscribers of the 4 groups are arranged in the same manner and terminate at 12 magnets S*t'*. The S*t* magnet operating therefore characterizes the called subscriber's position within the 25-line group comprising said subscriber.

The S*t* magnet and the S*tx* magnet prepare together the connection of terminal selector ST to the called subscriber. The S*t* magnet completes a holding circuit for itself over its front *st*1 at *st*2 it prepares an energizing circuit for the connecting magnet X*t* of individual switch *cist*.

Relay *tcd* opens over its back *tcd*2 the circuit of slow relay *tcc*, which releases with delay; over its front *tcd*2 it prepares the circuit of X*t*.

When relay *tcc* releases, it completes at *tcc*1 the following circuit for magnet X*t*: battery, magnet X*t*, front *st*2 and *stx*1, back *tcc*1, front *tcd*2, ground. The 25 *st*2, *st'*2 contacts respectively associated with the 25 S*t*, S*t'* magnets are all placed in parallel with the circuit of magnet X*t*, as indicated by the two multipling arrows placed on either side of said contacts; likewise, the two contacts *stx*1 and *sty*1 are placed in parallel with the circuit of magnet X*t*. This arrangement allows causing the energization of the X*t* magnet regardless of whether the S*t* magnet and the S*tx* or S*ty* magnet have operated.

As has been indicated, the multi-connector under consideration comprises 17 individual switches; the first 16 are used as terminal selectors ST; the seventeenth, referenced *cist*, is provided to connect connector CST to the called subscriber. Magnet X*t* upon operating causes the closing of the contacts of individual switch *cist*. Contacts *xt*1 . . . *xt*4 have been provided only to prevent the switch from breaking circuits at the time of release, as that would cause sparks and would entail the premature wearing out of the switch.

The first and the third series of contacts of individual switch *cist* give access to the first two 25-subscriber groups of the hundred; the second and the fourth series of contacts of said switch give access to the last two 25-subscriber groups of the hundred. The cutting in of one or the other series of contacts is effected by means of contacts carried by the *tcb* relays, which, as has been stated, characterize a 25-subscriber group. Two contacts such as *tcb*4, *tcb'*4, *tcb*5, *tcb'*5 are placed in parallel, since two consecutive 25-subscriber groups lead to the cutting in of one and the same series of contacts of individual switch *cist*.

The following circuit is then completed: battery, upper windings of relays *lc* and *la* in series, contact of individual switch *cist*, front *xt*2 and *tcb*4, wire 306 (Fig. 4), left-hand winding of relay *mla*, which energizes, rectifier R*d*40, resistance R*e*42, front *mp*5, ground. Relay *mla* energizes, but relays *la* and *lc* cannot operate owing to the high resistance of the left-hand winding of relay *mla*.

Relay *mla* completes the following holding circuit for itself at *mla*1: ground, middle winding of relay *mla*, front *mla*1, *mlc*1, *mlb*1, resistance R*e*43, battery; over its front *mla*2 it prepares a second holding circuit for itself; over its front *mla*3 it places the low-resistance upper winding of relay *mlb* in parallel with its own high-resistance left-hand winding in order to lower the test potential on wire 306 and busy the called subscriber's line. Line relays *la* and *lc* always remain unoperated, owing to the value of resistance R*e*42. If said subscriber is tested only by the marker under consideration, the flux produced in the upper winding of relay *mlb* cancels the effect of the flux produced in the lower winding and said relay releases. At *mla*4 relay *mla* prepares an energizing circuit for relay *mld*; at *mla*5 relay *mla* opens the circuit of relay *mlc*, but the latter, being slow to release, does not release at the instant under consideration.

Relay *mlb* completes the following circuit over its back *mlb*1: battery, resistance R*e*43, back *mlb*1, front *mla*4, upper winding of relay *mld*, wire 404 (Fig. 5), back *mlo*3, front *mle*1, wire 518 (Fig. 6), front *ccf*5, ground.

Relay *mld* upon operating controls the various operations relative to the connection in the fifties selector and in the terminal selector. At *mld*2 it completes the following holding circuit for itself: battery, upper winding of *mld*, front *mld*2 and *mp*4, ground; over its front *mld*7 it completes the following circuit: ground, front *mld*7, wire 519 (Fig. 6), front *sax*2 and *sa*2, wire 614 (Fig. 3), magnet V*t*, battery, and, in parallel with the preceding circuit, front *xc*4 (Fig. 6), contact of switch *cisc*, magnet V*c*, battery. Wire 519 is multipled to the 2 contacts *sax*2 and *say*2; contact *sax*2 is multipled in turn to the 20 *sa*2 contacts belonging to the 20 S*a* magnets; contact *say*2 is multipled to the 20 *sa*3 contacts of the 20 S*a* magnets. At the outlet of contacts *sa*2, *sa*3 are thus obtained forty 614 wires, each corresponding to an outgoing line of the fifties selector; each 614 wire is connected to magnet V*t* of the terminal selector at which said line terminates.

Magnet V*c* causes the connection of fifties selector SC to the line terminating at the terminal selector chosen; operating magnet V*t* (Fig. 3) causes the connection of terminal selector ST to the called subscriber.

Magnet V*c* (Fig. 6) opens at *vc*1 the circuit of magnet X*c* and the circuit of relay *cca*. At *vc*2 makes a break in chain wire 600; at *vc*3 it makes a break in the availability circuit of the *t* wire; at *vc*4 it removes the ground polarity from the *a* wire so as not to interfere with the conversation; at *vc*5 it causes the sending of ringing current to the called subscriber over the following circuit: battery, generator G*e*61, resistance R*e*64, front *vc*5, back *cp*3 and *cs*3, contact of fifties selector SC, a wire towards the terminal selector (Fig. 3), contact of terminal selector ST, *a* wire, set of subscriber P, *b* wire, contact of terminal selector ST, *b* wire (Fig. 6), contact of fifties selector SC, back *cs*2 and *cp*2, right-hand winding of relay *cs*, ground. Relay *cs*, being a slow relay, does not energize under the effect of the ringing alternating current. Part of the ringing current is shunted over back *cs*5 and condenser C*d*61 back to the calling subscriber (ringing tone). Over its front *vc*6 magnet V*c* completes the following holding circuit for the magnet of the terminal selector: ground, front *vc*6, contact of fifties selector SC, *c* wire towards the terminal selector (Fig. 3), front *vt*2, resistance R*e*34, magnet V*t*, battery; at *vc*7 it completes the following holding circuit for itself: battery, magnet V*c*, resistance R*e*55, front *vc*7, *t* wire and ground on the second selector over a circuit already described.

In terminal selector ST (Fig. 3) connecting magnet V*t* makes at *vt*1 a break in wire 612 in order to keep said terminal selector busy; at *vt*2 it completes a holding circuit for itself, as has been indicated; at *vt*3 it completes the following circuit: ground, resistance R*e*33, front *vt*3, contact of terminal selector ST, upper windings of relays *la* and *lc* in series, battery. The value of resistance R*e*33 is sufficiently low to allow the energization of relays *la* and *lc*. Further, the grounding of the called subscriber's *t* wire across resistance R*e*33 maintains the busy marking on said subscriber.

Relay *la* over its back *la*3 makes a break in wire 303 and thus controls the various operations relative to the release of all the common members used to control the operation of fifties selector SC and the operation of terminal selector ST. In effect, relay *tca*, relay *tcd* and magnet St release as a result of this break in wire 303. Relay tcb and magnet Xt have their circuits opened, the one at tca2 and the other at tcd2. Magnet Stx releases as a result of the opening of contact tcb3.

Relay tca removes at tca1 the ground on wire 403, thus causing in marker M (Figs. 4 and 5) the release of relay mga and hence the full release of said marker. Relay mgc has its circuit opened at mga2. In addition, relay mga opens at mga4 the circuit of relays ach and acd in call-finder connector CCA (Fig. 6). Relay ccf, magnets Sc and Sa and relay mta (Fig. 5) have their circuits opened at acd3, ach4 and vt1, respectively. Magnets Scx and Sax have their circuits opened at mta3. Relay cce releases (Fig. 6) after the opening of front sc2, causing the release of relays ccc and ccc' over cce5 and cce6. In impulse-receiver RSC (Fig. 5) all the relays have their circuits opened, the ground being removed from wire 609 after the opening of contact sc2 in fifties-selector connector CSC (Fig. 6). Relays mbc, mcm, mdm have their circuits opened at crz4. Relay mp, placed in series with relay mba, has its circuit opened at the same time as the latter, but, being slow to release, it releases only shortly afterwards, opening at mp4 the circuits of relays mte, mld and at mp5 the circuit of relay mlb. Relay mlc releases, having its circuit opened at mlb1. The various common members used to control the operation of fifties selector SC and terminal selector ST are fully released and ready to be used for the routing of a new call. It will be noted however that in marker M relay mja holds and relay mjb energizes over the following circuit: battery, lower windings of relays mja and mjb in series, front mja1, ground. Relay mjc always remains energized over front mja2 and back mjd1. The holding of relays mja, mjb and mjc in operating position is due to reasons that will be explained later.

When the called subscriber answers, the two wires of his line are looped metallically and relay cs (Fig. 6) energizes under the effect of the direct current superimposed on the ringing generator's current. At cs1 it completes the following holding circuit for itself: battery, left-hand winding of relay cs, front cs1 and vc6, ground; over its back cs2 and cs3 it stops the sending of ringing current to the called subscriber; over its front cs2 and cs3 it establishes the continuity of the line wires across fifties selector SC; at cs5 it opens the ringing-tone circuit.

The continuity of the line wires between feeder AL and the called subscriber is then established as follows: line wires a and b coming from the feeder (Fig. 9), distributer RP1, front contacts of first selector SP, line wires a and b (Fig. 11), contacts of second selector SS, wires a and b, distributer RP3, cable 1115, line wires a and b of fifties selector SC (Fig. 6), front cs3 and cs2, contacts of fifties selector SC, line wires a and b towards terminal selector ST (Fig. 3), contacts of terminal selector ST, line wires a and b, called subscriber P. The calling and the called subscribers are now connected.

Figure 6:
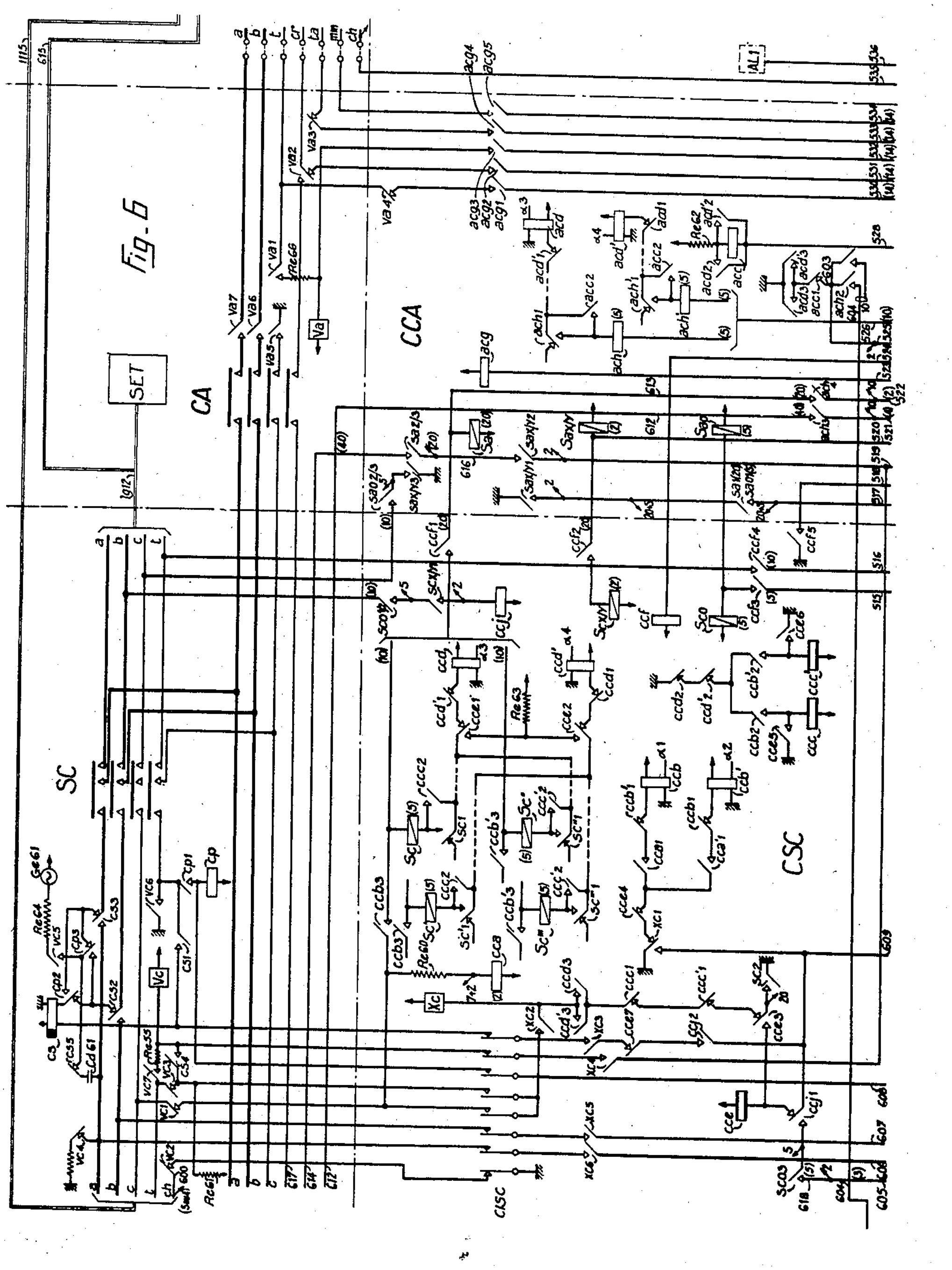
Fig. 6 shows the schematics of the fifties selector, of the call finder and of the associated connectors.
Figure 7:
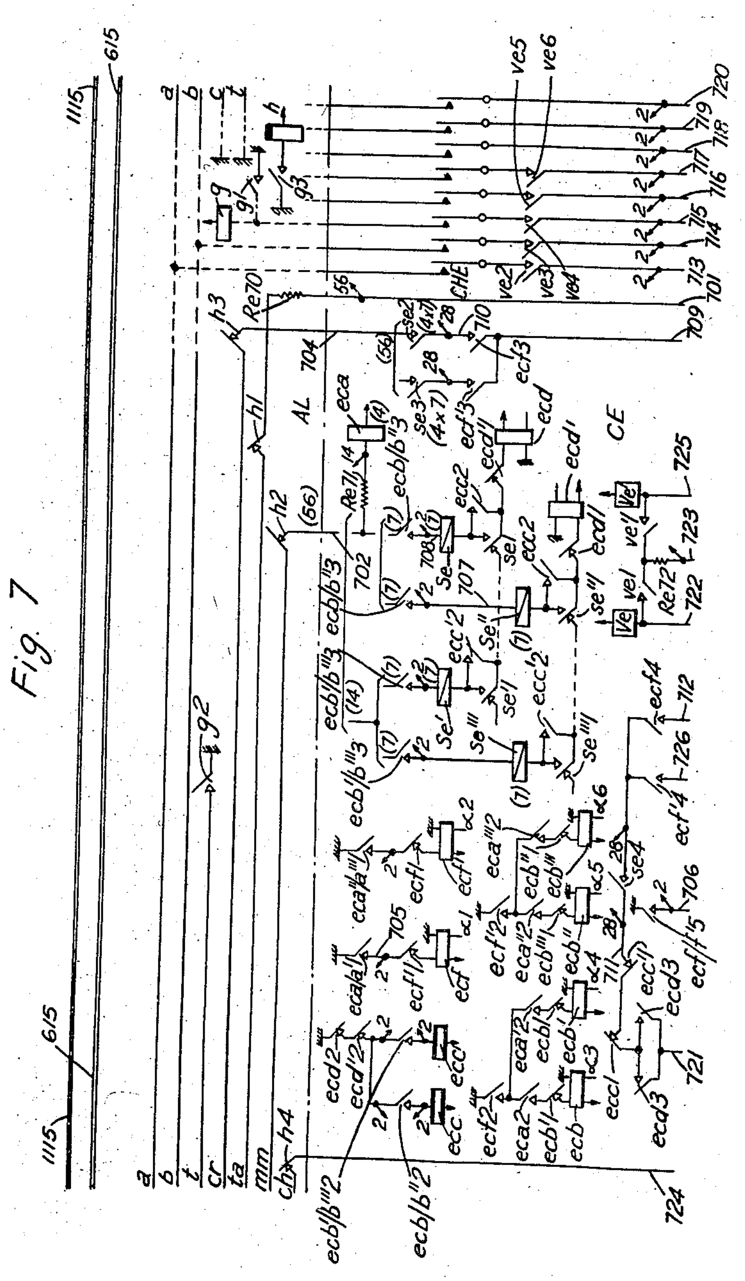
Fig. 7 shows the circuit elements of the feeder and the schematic of the associated connector.
Figure 8:
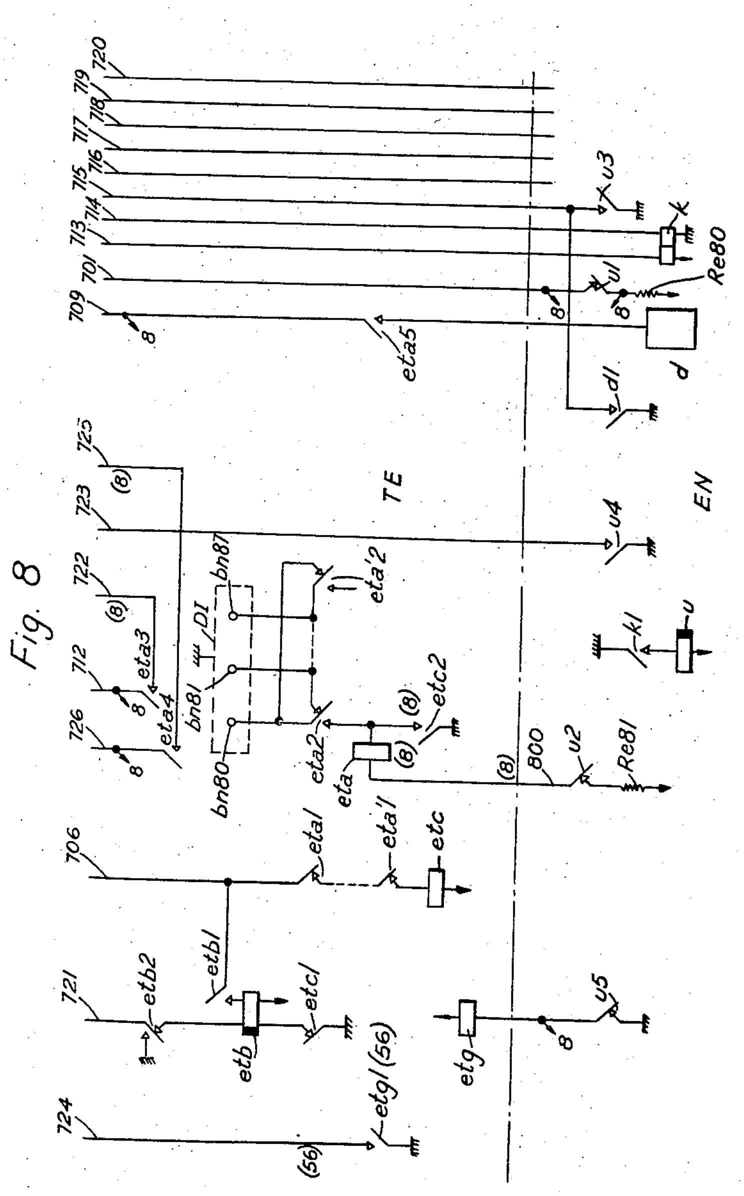
Fig. 8 shows the schematic of the common members controlling the connection of the feeder to a register and such circuit elements of the register as are required for an understanding of the invention.

The holding of the connection is placed under the control of feeder AL (Fig. 7). When the connection is ended, said feeder removes the ground from the t wire, this causing the release of magnet Vp (Fig. 9) and hence the opening of the contacts of first selector SP. Magnet Vp opens at vp6 the holding circuit of magnet Vq (Fig. 11), thus causing the opening of the contacts of second selector SS. Magnet Vq opens at vq7 the holding circuit of magnet Vc (Fig. 6) and hence causes the opening of the contacts of selector SC. Magnet Vc opens at vc6 the holding circuit of Vt (Fig. 3), which releases and hence opens the contacts of selector ST. The various members used to establish the connection between the feeder and the called subscriber are fully released.

In feeder AL (Fig. 7) relay g releases at the end of the connection and at g2 removes the ground on the t wire terminating at call finder CA (Fig. 6); the chain of members connecting the feeder to the calling subscriber releases according to a similar method.

The various special cases that can be encountered in the routing of a call from a calling subscriber P up to the register will now be discussed.

If the first marker M is busy when a call coming from a calling subscriber is registered in the common equipment, the lp relay energized causes the energization of relay maa of marker M' and the operations develop according to the method that has been described for marker M.

Upon proceeding to identify the calling fifties, a free terminal selector is hunted for among the four capable of being reached by a call-finder section and serving a 50-subscriber group. If these four terminal selectors are busy, the corresponding magnets Vt, Vt', Vt'' and Vt''' are energized and the circuit of a relay mgb of marker M is completed: ground (Fig. 3), front vt4 . . . vt'''4, wire 314 (Fig. 4), relay mgb, battery. One mgb relay and one mgb' relay have been provided in marker M for each fifties. Relay mgb energizes when the 4 terminal selectors serving that fifties and capable of being seized by the call finders of the first section are all busy. Relay mgb' is energized when the 4 terminal selectors serving that fifties and capable of being seized by the call finders of the second section are busy. There are therefore 10 mgb relays and 10 mgb' relays in the marker. The mgb relay energized thus indicates that the 4 selectors served by the first call-finder section are busy.

Over its back mgb1 relay mgb opens the energizing circuit of relay acc (Fig. 6), which cannot therefore energize and the call cannot be handled by this section.

It may happen that neither one of the two call-finder sections has any free call finders. In that case, all the back contacts h4 (Fig. 7) of these finders, are open and relays mgd and mgd' cannot energize. Front contacts mgd and mgd'1 prevent the energization of relays mgc or mgc' and the call cannot be handled.

The busy condition of all the registers is characterized by the energization of the u relays and hence by the non-energization of the etg relay. In that case, contact etg1 is open and none of the operations leading to the selection of a register can occur. The call cannot be handled and remains waiting until a register becomes free.

In the description of the system it has been assumed that the double test of the calling subscriber was successful. Consideration will now be given to what happens if that double test is not successful, that is, if marker M' tests the calling subscriber at the same time as marker M. The battery applied to the ringing and cut-off relays causes the energization of relay mla across rectifier Rd40 and front mp5 as in the general case.

Upon energizing, relay mla opens over its back mla5 the energizing circuit of relay mlc, which releases slowly. At its front mla3 relay mla closes its left-hand winding over the upper winding of relay mlb. In that case, the upper winding of mlb is shunted by the upper winding of mlb in the other marker; the flux flowing through the upper winding of the mlb relay involved is not sufficient to oppose the flux flowing through the lower winding of said mlb relay. Relay mlb remains energized and relay mla holds. In marker M relay mlc releases slowly, opening the holding circuit of relay mla over its front mlc1. Relay mla releases, being unable to hold over its left-hand winding, through which a very weak current is flowing. Upon releasing, relay mla re-energizes relay mlc over its back mla5. Marker M' is then in a condition to perform the double test successfully and the routing of the call proceeds as already described for marker M. Marker M is still marked busy, but at the end of a certain period of time relay mab energizes and over its back mab1 opens the energizing circuit of relay maa, thus causing the release of the marker.

However, if marker M' is connected to the calling subscriber before marker M has completed its preliminary operations, at the moment the subscriber is tested said marker M will find in the energizing circuit of relay *mla* a potential approaching ground potential and the calling subscriber will be marked busy. Relay *mla* will be unable to energize and the release of the marker will be effected by relay *mab*.

Generally, if marker M is slow in handling a call, relay *mab*, shunted by a high capacity, energizes after a given time lag and, through the opening of its back *mab*1, opens the energizing circuit of relay *maa*, which releases, releasing the marker and allowing a resumption of operations.

In the foregoing description it has been assumed that only one subscriber was calling. It will now be assumed that several are calling at the same time. The system is then designed to serve them in succession, the first subscriber served being not necessarily the one that called first.

All these calls are registered in common equipment EC and in marker M. Relay *maa* energizes, telling the marker that one or more subscribers are calling out of the 500-subscriber group. As has already been described, the marker completes over front *mad*2 of relay *mad* the energizing circuit of four *tca* relays, each corresponding to a 25-subscriber group capable of comprising one or more calling subscribers. These calls belong to two adjacent fifties, and a given calling fifties will then be selected.

In marker M (Fig. 5) relays *mgd* or *mgd'* energize if the corresponding sections contain at least one free call finder having access to at least one free register. Assuming that *mgd* and *mgd'* energize, they complete the energizing circuits of relays *mgc* and *mgc'* simultaneously. Only one of these two relays energizes, following a certain order of priority already described in a patent application given as a reference. As has already been seen, the energization of relay *mgc* causes the energization of relay *acc*, which determines the selection of the first call-finder connector, for example.

Over its front *acc*2, relay *acc* completes the following circuits: ground, front *mga*4, back *mgb*3, front *mgc*2, wire 526 (Fig. 6), relay *ach*, front *acc*2, back *acd'*1, relay *acd*, battery, and wire 526 (Fig. 6), relay *ach'*, front *acc*2, back *acd*1, relay *acd'*, battery.

The ten 526 wires are divided up into five first wires terminating at five relays *ach* of the first connector and into five other wires terminating at five relays *ach'*, also of the first connector. Relays *acd* and *acd'* energize following a certain order, just as relays *mgc*. For example, if relay *acd* is the first to energize, it opens over its back *acd*1 the energizing circuit of relay *acd'*. In series with relay *acd* are energized the *ach* relays, only one of which can hold, owing to the chain of back contacts such as *ach*1. The *ach* relay energized therefore characterizes the fifties to be served first and capable of comprising one or more calling subscribers.

It is now necessary to serve a single subscriber within said fifties.

The *acd* and *ach* relays energized complete the following circuits over their front *acd*3 and *ach*2: ground (Fig. 6), front *acd*3, back *acc*1 (*acc* is released, short-circuited by front *acd*2), wire 603 multipled to 10 contacts of the *ach, ach'* relays such as *ach*2, wire 604 (Fig. 3), front *tca*2, back *tcb'*1, lower winding of *tcb*, battery, and front *tca'*2, back *tcb*1, upper winding of *tcb'*, battery. Following the method already described in the patent given as a reference, only one of the *tcb* or *tcb'* relays can energize. The *tcb* relay energized thus characterizes the 25-subscriber group that will be given priority.

As has been explained before, selection is then made of a sub-group within the 25-subscriber group comprising the calling subscriber or subscribers by energizing relay *tcd* or relay *tcd'*. If relay *tcd* energizes, the subscriber will be selected from among the first thirteen subscribers of the group of 25, but only on *St* magnet will hold, which will determine the subscriber to be served first. The sequence of operations will be performed according to a method already described.

The case where several feeders are calling will now be discussed.

If several out of the 56 feeders are calling, the four *eca* relays can energize simultaneously; the closing of contacts *eca*1, *eca'*1, *eca''*1 *or eca'''*1 causes the energization of one of the two relays *ecf* or *ecf'*, which are delayed alternately according to a method already described. Assuming relay *ecf* energizes first, a choice is made from among the 28 feeders comprising the calling subscriber or subscribers.

The closing of front *ecf*2, *eca*2 and *eca'*2 completes the energizing circuits of the two relays *ecb* and *ecb'*, which likewise are delayed alternately. The energization of relay *ecb*, for example, will cause a new selection from among the two 14-feeder groups comprising the calling subscriber or subscribers.

In the next stage, through the closing of front *ecb*3, the energizing circuits are completed of relays *ecd* and *ecd'*, respectively in series with magnets *Se* and *Se''*. Relays *ecd* and *ecd'* are delayed alternately according to a method already described and the energization of relay *ecd*, for example, determines a selection only among 7 feeders comprising the calling feeder or feeders. Only one out of the 7 *Se* magnets capable of energizing will be able to hold over its front *se*1. That magnet will correspond to the calling feeder chosen to serve the call in progress. The sequence of operations will occur according to the method already described.

It has been assumed in the description of the general case that distributer DI had not operated yet or had operated 8 *n* times, *n* being a whole number. In that case, priority was given to the *eta* relay located the farthest to the left and connected to the grounded *bn*80 terminal. However, if distributer DI has operated 8 *n*+1 times, *n* being a positive whole number or zero, terminal *bn*81 will be grounded, terminals *bn*80, *bn*82 . . . *bn*87 being isolated. In that case, the *eta* relay that will hold will be the one whose back *eta*2 is the nearest to terminal *bn*81. The same applies if distributer DI has operated 8 *n*+2, 8 *n*+3 . . . 8 *n*+7 times, *n* being a positive whole number or zero.

It may be noted, in the case where several subscribers are calling, that upon the release of the common control members relay *lp*, as already pointed out, remains energized as long as a call has not been completed. In that case, when relay *mld* releases it again completes the energizing circuit of relay *maa*, which energizes and allows marker M to recommence its cycle of operations in order to handle one of the other calls. All the calls are thus handled, including the last one.

The various special cases that can be encountered in the routing of a call from feeder AL to called subscriber P will now be discussed, and to begin with it will be assumed that one and the same connector CSP (Figs. 9 and 10) is seized simultaneously by two first selectors SP. In that case, said connector will serve one of these selectors first, the call routed across the other selector being held waiting until the full release of connector CSP. In effect, two *pca* relays can operate simultaneously if the two selectors belong to different halves of the multi-connector, but only one of the two relays *pcb* or *pcb'* can energize, these two relays having unequal operating times according to a method described. Magnet group *Sp*, *Sp'* or magnet group *Sp''*, *Sp'''* is thus eliminated. Likewise, two *pcd* relays cannot operate simultaneously, for the same reason, the *pcd* relay energized cutting out magnet group *Sp'*, *Sp'''* or magnet group *Sp* . . . *Sp''*. Finally, two magnets such as *Sp* can energize simultaneously over contacts *pcc*2, but, after the opening of said contacts, these two magnets have their energizing circuit opened; one of them holds over its front *sp*1 and over its back *sp*1 prevents the other magnet from holding over a similar circuit. The four back contacts *sp*1 are in effect all placed in series with the circuit of relay *pcd*. Finally, only one out of the 15 *Sp* selection magnets can hold and connector CSP is connected to the corresponding SP selector. When the routing of the call has been completed, all the relays and magnets of connector CSP release according to a method already described, with the exception of the *pca* relay corresponding to the second calling selector. The call routed through this selector is then served in the same manner.

If connector CSP is engaged in routing a call and a second selector starts calling before the routing of said call has been completed, the various operations will follow one another as in the preceding case and the connector will serve both calls in succession. Of course, priority is not necessarily given to the first calling selector; the priority depends only on delay devices associated with relays *pcb, pcb' pcd, pcd'* and on the arrangement of the chains of back contacts *sp*1 . . . *sp'''*1. As indicated in the patent application filed by applicant on January 17, 1952, for "Improvements in Telephone Systems," the priority given to one of relays *pcb, pcb'* or to one of relays *pcd* . . . *pcd'* depends only on chance. However, priority is given to the particular *Sp* magnet placed the nearest to relay *pcd* in the chain of back contacts *sp*1.

If the impulse-receiver RSP (Fig. 10) provided to serve connector CSP is busy, relay *prl* is energized and contact *prl*1 open. In connector CSP (Fig. 9) relay *pcf* cannot operate and the sequence of operations cannot occur; the call involved then remains waiting until impulse-receiver RSP again becomes available. In practice, the operating time of the impulse-receiver is very short and the call does not remain waiting long.

If the tester TSP provided to serve impulse-receiver RSP is busy, that is, engaged with some other impulse-receiver, one of back contacts *prn'*1 or *prn''*1 is open and the sequence of operations cannot occur. As in the preceding case, the call involved is held waiting until said tester again becomes available.

If two CSP connectors having access to one and the same RSP impulse-receiver are in calling position simultaneously, priority is given to one of them by acting upon the operating time of the two *pcg* relays according to a method already mentioned. The same applies if two RSP impulse-receivers having access to one and the same TSP tester are simultaneously in calling position.

If the banks of first selector SP contain no line capable of routing the call, none of the *pta* relays can operate and the sequence of operations cannot occur. In that case a time device provided in the register causes the full release of the first-selection stage by removing the ground from the *c* wire, and this causes the release of the *pca* relay and hence the release of all the other relays of said stage. The register thereupon again seizes first selector SP, which is connected to impulse-receiver RSP through connector CSP as in the general case. The register sends impulse-receiver RSP the two digits provided for the routing of the first and second selectors, but together with the first digit it transmits a polarity causing the operation of relay *prd*. Relay *pre'''* energizes then over battery, relay *pre'''*, back *prx*4, front *prd*1, wire 909, front *pcg*2, ground. Relay *ptf* energizes over *prn*7 and *pre'''*2.

The sequence of operations develops as in the general case, but with a change in the priority given to the various *pta* relays. Contact *ptf*1 being in operating position, the *pta* relay operating holds over its front *pta*2 and over its back *pta*2 prevents the other *pta* relays from holding over similar circuits. Under these conditions, the order of prioriity given to the various *pta* relays can be changed by suitably arranging the chain of back contacts *pta*2. This inversion of priority is not useful in the case under consideration; it has been provided for only for the following case. The call may have been routed through the first and second selectors up to a fifties selector, the progress of the call being then unable to continue for some reason or other. Under these conditions, it is of interest to select some other first-selector outgoing line that will perhaps allow routing the call up to the called subscriber.

If the second hunting effected by the tester of the first-selection stage proved fruitless, the register would cause the release of all the members seized. Such release brings about finally the removal of the ground from the calling subscriber's *t* wire (Fig. 3); relay *la* of said subscriber releases but slow relay *lc* remains energized over the following circuit: battery, lower winding of relay *lc*, back *la*1, front *lc*1, wire *a*, loop of calling subscriber P, wire *b*, back *la*2, ground. Relay *lc* then controls, according to a known method, the sending of the busy tone to the calling subscriber.

Second selector SS (Figs. 11 and 12) can be seized only if the CSS connector and the RSS impulse-receiver to which it has access are free; it has been indicated, in fact, that the availability circuit (*t* wire) passes through these two members. The case of a second selector having access only to busy common members is thus similar to the preceding case. Tester TSP being rigidly associated with impulse-receiver RSS, it is always available if said impulse-receiver itself is available.

In the line-selecting means (Figs. 3 to 6) the connector CSC provided to serve fifties selector CS may already be seized by a call. In that case, said connector handles the calls in succession according to the same method as for the first-selection stage.

If the M marker serving fifties selector SC is busy, relay *mp* is energized, contact *mp*3 is open, relay *mba* cannot energize and the sequence of operations cannot occur. In that case, the call involved is held waiting until the marker again becomes available.

If the banks of fifties selector SC contain no free line among the four lines terminating at the terminal selectors serving the called fifties, the call is routed through a cooperating selector, as will now be explained. The four terminal selectors ST serving a given fifties and connected to one and the same fifties-selector section have their contact *vt*4, *vt'*4, *vt''*4, *vt'''*4 placed in series. If these four selectors are busy, these four contacts are closed and wire 314 is grounded, this causing the energization of relay *mgb* in marker M. Relay *mgb'* corresponds to the 4 terminal selectors connected to the second fifties-selector section. Since 10 50-subscriber groups are served by this marker, 10 *mgb* and 10 *mgb'* relays have been provided.

Relay *mgb* makes a break in wire 528 at *mgb*1, this preventing the energization of *mgc* and the seizure of connector CCA; it completes the following circuit over its front *mgb*1: ground, front *mga*2, *mgb*1, *mba*7, relay *mtj*, battery. Marker M comprises 10 *mga*2, *mgb*1 circuits, each corresponding to a 50-subscriber group; these 10 circuits are multipled to a single contact *mba*7. There is only one *mtj* relay in the marker. At *mgb*3 relay *mgb* makes a break in wire 526, the relays connected to said wire in the call-finder connector not being used in the case of the routing of the call through a cooperating selector.

Relay *mtj* completes the following circuit over its front *mtj*1: ground, front *mtj*1 and *mba*6, wire 524 (Fig. 6), relay *ccf*, which energizes, battery; it completes the following circuit over its front *mtj*2: ground, front *mtj*2, resistance Re65, back *mac*3, *mtb*4 . . . *mtb'''*4, *mtg*, which energizes, battery.

Relay *mtg* prepares at *mtg*1 the circuit of a relay *mtb* for testing for an available cooperating line; it completes the following circuit for *mtd* over its front *mtg*4: ground, relay *mtd*, back *mtc*1, front *mtg*4, Re53, battery.

Relay *mtd* closes at *mtd*2 the circuit of relay *mte* and completes a holding circuit for itself at *mtd*3.

Relay *ccf* (Fig. 6) prepares at *ccf*4 the circuit for testing for an available cooperating line; at *ccf*3 it prepares the circuit of one of the 6 *Sco* selection magnets corresponding to cooperating lines.

In order to test for a cooperating line capable of routing the call, there are 10 *mtb* relays (Fig. 5) in marker M. Each of these relays connects, through the medium of a wire 516 and of a contact ccf4 (Fig. 6), to the test wire t of a line lg12 terminating at a cooperating selector SET. The scheme of selector SET and of the common members controlling its operation is identical with that of fifties selector SC and of its associated common members. A free cooperating line lg12 has its test wire t connected to the battery.

It is not sufficient that a cooperating line lg12 terminate at a free SET selector in order to be able to select it—it is still necessary that said selector have access to at least one free line terminating at a terminal selector serving the fifties comprising the called subscriber.

Figure 5:
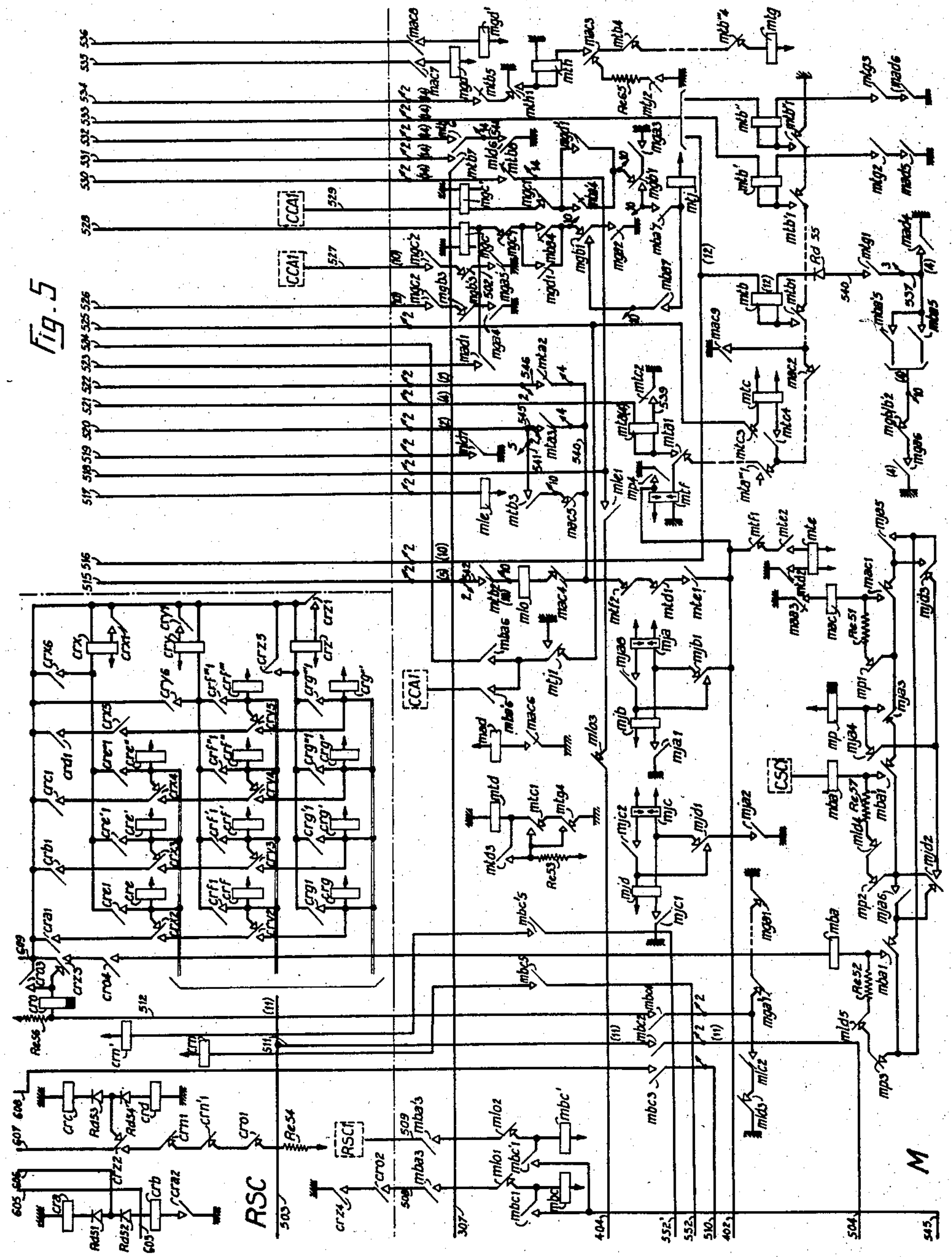
Figure 16:
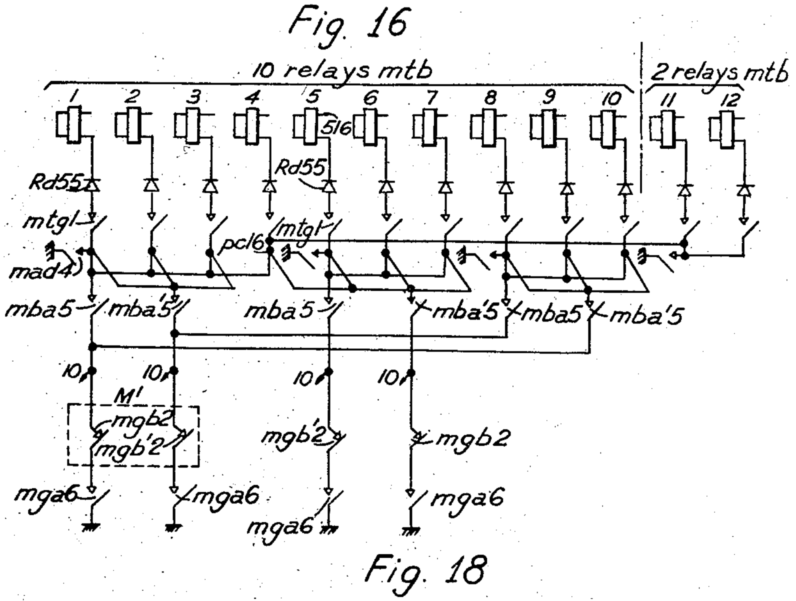
Fig. 16 is a detailed schematic of the chain circuits used in the marker for the selection of cooperating lines.
Figure 18:
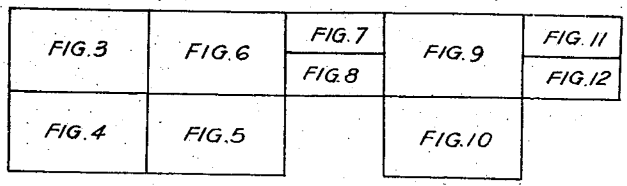
Fig. 18 shows the connecting scheme of Figs. 3 to 12.
Figure 17:
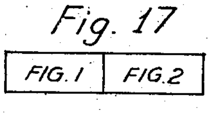
Fig. 17 shows the conecting scheme of Figs. 1 and 2.
Figure 19:
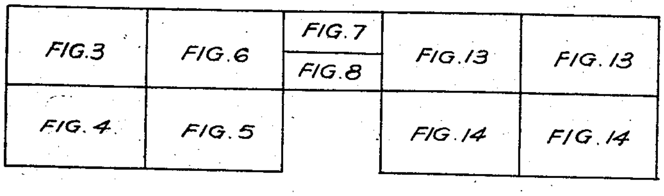
Fig. 19 shows the connecting scheme of Figs. 3 to 8, 13 and 14, provided for the case of low-capacity automatic switchboards.

To that end, chain circuits have been provided, represented schematically by *mga*6, *mgb/b'*2, *mba*5 in Fig. 5 but shown in detail in Fig. 16. The first 10 *mtb* relays shown to the left in Fig. 16 correspond respectively to the 10 cooperating lines. These 10 lines, on the banks of the fifties selectors SC of the first section, are divided up into 3 groups, respectively comprising 4, 3 and 3 lines. The 4 lines of the first group, corresponding to *mtb* relays 1 to 4, give access to the terminal selectors connected to the first section of fifties selectors controlled by marker M'; if there is at least one free terminal selector among them, contact *mgb*2 of marker M' is closed and the first four *mtb* relays are grounded over *mba*5, *mgb*2, *mga*6. Contact *mba*5 is multipled to ten circuits *mgb*2, *mga*6, each corresponding to a 50-subscriber group.

The three lines of the second group, corresponding to the *mtb* relays numbered 5 to 7, give access to the terminal selectors connected to the second section of fifties selectors controlled by the marker involved (M); if there is at least one free terminal selector among them, contact *mgb'*2 of the marker involved (M) is closed and the three *mtb* relays of the second group are grounded over *mba*5, *mgb'*2, *mga*6.

The three *mtb* lines of the 3rd group correspond to the *mtb* relays numbered 8 to 10; they give access to the terminal selectors connected to the second section of fifties selectors controlled by marker M'; if there is at least one free terminal selector among them, contact *mgb'*2 of this marker is closed and *mtb* relays 8 to 10 are grounded over *mba*5, *mgb'*2 of marker M', *mga*6.

In the case of the fifties selectors of the second group that are controlled by marker M, the distribution of the cooperating lines is made in a slightly different manner. These lines are divided up into 3 groups, respectively comprising 3, 4, and 3 lines; the first group gives access to the terminal selectors of section 2—2 (2nd section of the 2nd chain); the second group gives access to the terminal selectors of section 1—1 (1st section of the 1st chain); the third group gives access to the terminal selectors of section 2—1 (1st section of the 2nd chain). The circuits allowing the grounding of the *mtb* relays are arranged in identical fashion, but pass through contacts *mba'*5.

The last two *mtb* relays (relays No. 11 and 12) are used only in the case of calls coming from local subscribers, as has been indicated.

The *mtb* relays 1 to 4 on the one hand and 5 to 7 on the other are connected across common point *pc*16; rectifiers R*d*55 prevent the untimely grounding of relays 1 to 4 over *mba*5, *mgb'*2, *mga*6 and, in general, any confusion among relays belonging to different groups.

Other modes can be envisaged of grouping the cooperating lines on the banks of the fifties selectors controlled by the second marker M', in order to ensure a suitable distribution of the traffic among the various terminal selectors.

It will be assumed throughout what follows that the called subscriber's fifties comprises at least one free terminal selector connected to the banks of the second section of fifties selectors served by the marker involved (M). In that case, one of the *mtb* relays of the second group, relay No. 5, for example, energizes over the following circuit: ground, front *mga*6, back *mgb'*2 of the marker involved (M), front *mba*5, front *mtg*1, rectifier R*d*55, windings of *mtb* in series (Figs. 16 and 5), wire 516 (Fig. 6), front *ccf*4 and *t* wire connected to battery across cooperating selector SET. This *mtb* relay energizes.

Over its front *mtb*1 relay *mtb* causes the low-resistance lower winding of relay *mtf* to be placed in parallel with its own high-resistance lower winding, in order to decrease the test potential on wire 516 and to mark the selected cooperating line busy. If said line is tested only by the marker involved, the fluxes produced in the two windings of relay *mtf* are equal and of opposite sense and said relay releases. Relay *mtb* prepares at *mtb*2 and *mtb*3 the circuit of the selection magnets corresponding to the cooperating line selected; at *mtb*4 it opens the circuit of relay *mtg*, which releases.

Relay *mtf* upon releasing completes at *mtf*1 the following holding circuit for relay *mte*: battery, right-hand winding of relay *mte*, front *mte*2, back *mtf*1 front *mp*4, ground; at *mtf*2 it prepares the energizing circuits of the selection magnets corresponding to the cooperating line selected.

If there are several cooperating lines capable of routing the call on the banks of fifties selector SC, several *mtb* relays have been able to operate simultaneously; however, contacts *mtg*1 are broken and all these relays have their energizing circuits opened; one of them holds over its front *mtb*1 and over its back *mtb*1 prevents the other *mtb* relays from holding over similar circuits.

Relay *mtg* short-circuits at *mtg*4 and *mtc*1 relay *mtd*, which releases with a certain delay.

Relay *mtd* completes at *mtd*1 the following circuits for the two selection magnets corresponding to the cooperating line selected:

(1) Ground, front *mp*4 and *mte*1, back *mtd*1, *mtf*2 and *mac*5, front *mtb*3, wire 541, wire 520 (Fig. 6), selection magnet S*ax*, battery, and, in parallel with the preceding circuit, front *ccf*2, magnet S*cx*, battery;

(2) Ground, *mp*4 and *met*1, back *mtd*1, *mtf*2, *mac*4, relay *mlo*, which energizes, front *mtb*2, wire 542, wire 515 (Fig. 6), front *ccf*3, magnets S*ao* and S*co* in parallel, battery.

For the selection of a cooperating line there are two selection magnets S*cx* and S*cy* allowing the selection of a group of 5 cooperating lines from among the 10 and 5 magnets S*co* allowing the selection of a line within a group of 5. Relay *mlo* (Fig. 5) is multipled to 10 contacts *mtb*2 respectively corresponding to the 10 cooperating lines. Ten 542 wires are thus obtained, which are suitably grouped in order to energize the selection magnet S*co* (or S*ao*) corresponding to the cooperating line selected. Likewise, contact *mac*5 is multipled to 10 contacts *mtb*3 respectively corresponding to the 10 cooperating lines; the wires 541 outgoing from said contacts are also suitably grouped in order to energize the selection magnet S*cx/y* (or S*ax/y*) corresponding to the line chosen.

Selection magnet S*co* prepares at *sco*1 the circuit of relay *ccj*; at *sco*3 it prepares the circuit of a relay that is to connect the fifties-selector impulse-receiver to the cooperating-selector impulse-receiver.

Magnets S*ax* and S*ao* together complete the following two circuits:

(1) Ground, front *sax*1 and *sao*1, wire 517 (Fig. 5), relay *mle*, which energizes, battery;

(2) Ground, front *sax*3 and *sao*2 (Fig. 6), *c* wire and relay *cca* for seizing the cooperating-selector connector over a circuit already described.

Contact *sax*3 is multipled to 5 contacts *sao*2; likewise, contact *say*3 is multipled to 5 contacts *sao*3, this giving at the outlet of contacts *sao*2, *sao*3 10 *c* wires, each corresponding to a cooperating line. Contacts *scx/y*1 and *sco*1/2 are arranged according to the same method.

In marker M (Fig. 5) relay *mlo* opens at *mlo1* the circuit of relay *mbc*, which releases.

Relay *mbc*, over its two front contacts *mbc1* and *mbc2*, causes the release of the various relays that have registered in the marker the called subscriber's last three digits, that is, relays *mc, md, mu, mcm, mdm*. At the same time it removes the ground from terminal *bn51* of marking distributer RM, this causing in terminal-selector connector CST (Fig. 3) the release of relay *tca* and hence the return to normal of all the other relays.

When the receiver associated with cooperating selector SET is seized, it causes, according to a method already described, the application of a ground to the *b* wire and the following circuit is completed: ground on *b* wire, front *sco1* and *scx1*, relay *ccj*, battery. Relay *ccj* energizes. Over its back *ccj1* it opens the circuit of slow relay *cce*; over its front *ccj1* it completes the following circuit: ground, front *xc1*, *ccj1*, *sco3*, wire 605 (Fig. 5), relay *crm*, battery; over its front *ccj2* it prepares an energizing circuit for relay *cs* in fifties selector SC.

The function of relay *crm* consists in connecting the impulse-receiver of fifties selector SC to the cooperating-selector impulse-receiver. The impulse-receiver of the fifties selector SC involved is capable of being connected to any one of the other three impulse-receivers serving the 500-subscriber group. For that purpose, front *ccj1* is multipled to 5 contacts *sco3* associated with the 5 different S*co* magnets, this giving five 618 wires at the outlet of contacts *sco3*. These wires are grouped in pairs, which gives three 605 wires respectively connected to 3 relays *crm* (sic-Translator). The *crm* relay energized indicates that the impulse-receiver involved must be connected to the impulse-receiver controlling the cooperating selector chosen. Since two out of the four receivers serving the 500-subscriber group are capable of being connected two by two, there are six possible combinations and a total of 6 *crm* relays should be provided for the 500-subscriber group.

Relay *crm* controls the retransmission of the called subscriber's last three digits from impulse-receiver RSC to the impulse-receiver controlling the cooperating selector. The eleven 503 wires (Fig. 5) connected respectively to registering relays *cre . . . cre''*, *crf . . . crf'''*, *crg . . . crg'''* are further connected, over contacts *crm1*, to similar relays in the impulse-receiver controlling the cooperating selector. The digits received at receiver RSC are therefore transferred to the impulse-receiver RSC' associated with the cooperating selector. Thus, for example, if relay *cre* is energized in impulse-receiver RSC, relay *cre* of impulse-receiver RSC' energizes over the following circuit: battery, relay *cre* of impulse-receiver RSC', contact *crm1*, wire 503, left-hand terminal of relay *cre*, front *cre1* and *crx6*, wire 609 (Fig. 6), contact *xc1*, ground. The other registering relays of impulse-receiver RSC' (Fig. 5) energize over similar circuits and hold according to the same method as that described for impulse-receiver RSC.

When relay *cce* releases (Fig. 6) it completes the following circuit at *cce7*: ground, front *xc1* and *ccj2*, back *cce7*, front *xc3*, front contact of individual switch *cisc*, left-hand winding of slow relay *cs*, battery; at *cce5* and *cce6* it opens the circuit of slow relays *ccc* and *ccc'*.

Relay *cs* prepares a holding circuit for itself at *cs1*; over its back *cs2* and *cs3* it prevents the subsequent sending of ringing current by G*e*61, said current to be sent from the cooperating selector onward; over its front *cs2* and *cs3* it establishes the continuity of the *a* and *b* line-wires across fifties selector SC; over its front *cs4* it completes the following circuit for connecting-magnet V*c* of selector SC: battery, V*c*, front *cs4*, back *vc3*, *t* wire and ground over an already-described circuit in the group-selecting means.

Magnet V*c* completes a holding circuit for itself at *vc7*; at *vc1* it opens the holding circuit of magnet X*c* and of relay *cca*; at *vc6* it completes the following holding circuit for relay *cs*: battery, left-hand winding of relay *cs*, front *cs1* and *vc6*, ground. In addition, magnet V*c* causes the connection of fifties selector SC to the cooperating line selected.

The various common members that have controlled the operation of selector SC are thereupon released according to a method similar to that already described. In the cooperating-selection stage the various operations develop according to the same method as for the fifties-selection stage, this leading to the connection of the cooperating selector to a free terminal selector serving the fifties group comprising the called subscriber.

In the foregoing description it has been assumed that selectors SET were connected to the banks of fifties selectors SC (Fig. 6) in order to be used as cooperating selectors. These selectors SET can likewise be connected to the banks of the second selectors over a cable such as 615, this allowing selectors SET to be used also as normal selectors. In that case, arrangements are provided in the second-selection stage to give priority in selection to fifties selectors that are used only as fifties selectors, selectors SET not being selected unless all the preceding selectors are busy. The number of selectors SET to be provided will be a little larger than if said selectors were used only as cooperating selectors. These arrangements make it possible to use the entire number of SC and SET selectors more efficiently and to obtain great flexibility in the distribution of the traffic.

The moment terminal-selector connector CST (Fig. 3) is seized, several wires such as 303 can be grounded if there are other called subscribers in one and the same 100-subscriber group. In that case, said connector will serve said subscribers in succession, according to a method similar to the one described for the case where several first selectors having access to one and the same connector are simultaneously in calling position.

If the called subscriber is busy, one at least of the two contacts *la3* and *lc4* is open; wire 303 is not grounded and the sequence of operations cannot occur in the terminal-selector connector. In that case, the *mga* relay corresponding to the called subscriber's fifties group cannot energize in marker M (Figs. 4 and 5). Relay *cro* of impulse-receiver RSC is then short-circuited over the following circuit: ground, back *mga1 . . . mga'1*, front *mbc4* and left-hand terminal of *cro*. After a predetermined time lag, slow relay *cro* releases and causes the sending of battery to register EN over the following circuit: battery, R*e*54, back *cro1*, *crn'1*, *crn1*, front *crz2*, wire 607 (Fig. 6), front *xc5*, contact of switch cisc, *b* wire and register over a circuit already described. The register causes the release of all the members seized, excepting the subscriber line relay equipment, said equipment sending the calling subscriber the busy tone according to a method already described.

If the called subscriber is tested simultaneously by the two markers of the line-selecting means, the upper winding of relay *mlb* (Fig. 4) is shunted by the similar winding of the other marker's *mlb* relay; the flux produced in said upper winding is not sufficient to cancel out the effect of the flux of the lower winding, relay *mlb* remaining operated. Relay *mlc*, whose circuit is opened at *mla5*, releases after a predetermined time lag and opens at *mlc1* the circuit of the middle winding of relay *mla*. This latter relay releases; it cannot in fact hold over its left-hand winding, which is shunted by the low resistance of the upper winding of relay *mlb*.

In the other marker testing the called subscriber, slow relay *mlc* does not have strictly the same characteristics as the *mlc* relay of the marker under consideration and its delay in releasing is not the same. Throughout what follows it will be assumed that the *mlc* relay of the other marker is still operated when the *mlc* relay of the marker under consideration releases.

In the marker here involved, relay *mla* upon releasing cuts out, at *mla3*, the low-resistance upper winding of relay *mlb*. Owing to this, the potential on wire 303 is modified and takes a value closely approaching the one it would have if the called subscriber were not tested by the marker under consideration. In the other marker M, the double-test operations develop according to the method indicated for the general case; relay *mlb* releases and relay *mld* energizes and controls the connection of the switches to the line selected.

In the marker involved, *mla* causes at *mla5* the re-energization of slow relay *mlc*. This latter short-circuits the general holding relay of the impulse-receiver over: ground, back *mld3*, front *mlc2*, *mbc4*, left-hand terminal of *cro*. This latter releases and, according to the same method as where the called subscriber is busy, causes the sending of battery to the register over back *cro1*. The register releases all the members seized, save the calling subscriber's line relay equipment, said subscriber receiving the busy tone from said equipment.

It may be of interest to send the register an indication relative to the called subscriber's category. An "absent subscriber" indication, for example, will cause the register to release the selectors seized and the routing of the call to an operator's position. In the example described, two different category indications can be sent. The subscribers of the first category have all their *bn51* terminals connected to terminal *bn58*. After the reception of the called subscriber's last three digits at the marker, terminal *bn51* is grounded and the following circuit is completed: ground, terminal *bn51* and *bn58*, wire 552 (Fig. 5), front *mbc5*, relay *crn*, battery. Relay *crn* energizes and over its front *crn1* sends a positive polarity to wire 607 and from there to the register over a circuit already described. The second-category indication is given according to the same method but using terminal *bn59* and relay *crn'*.

The various cases where the call is routed without the intervention of the second-selection stage will now be described.

According to a first arrangement, a first-selection stage of the group-selecting means can select a line to a fifties selector or an outgoing office either directly or in combination with a second selector for one and the same given called group and depending upon whether said first selector has or has not direct access to a free line in the group dialed. In such a case, the selection of a group is determined by the reception of two selective combinations; the first indicates that the first selector will make a direct selection or a selection through a second selector, depending upon the busy condition of the free access paths; the second selective combination indicates the group called.

Figure 10:
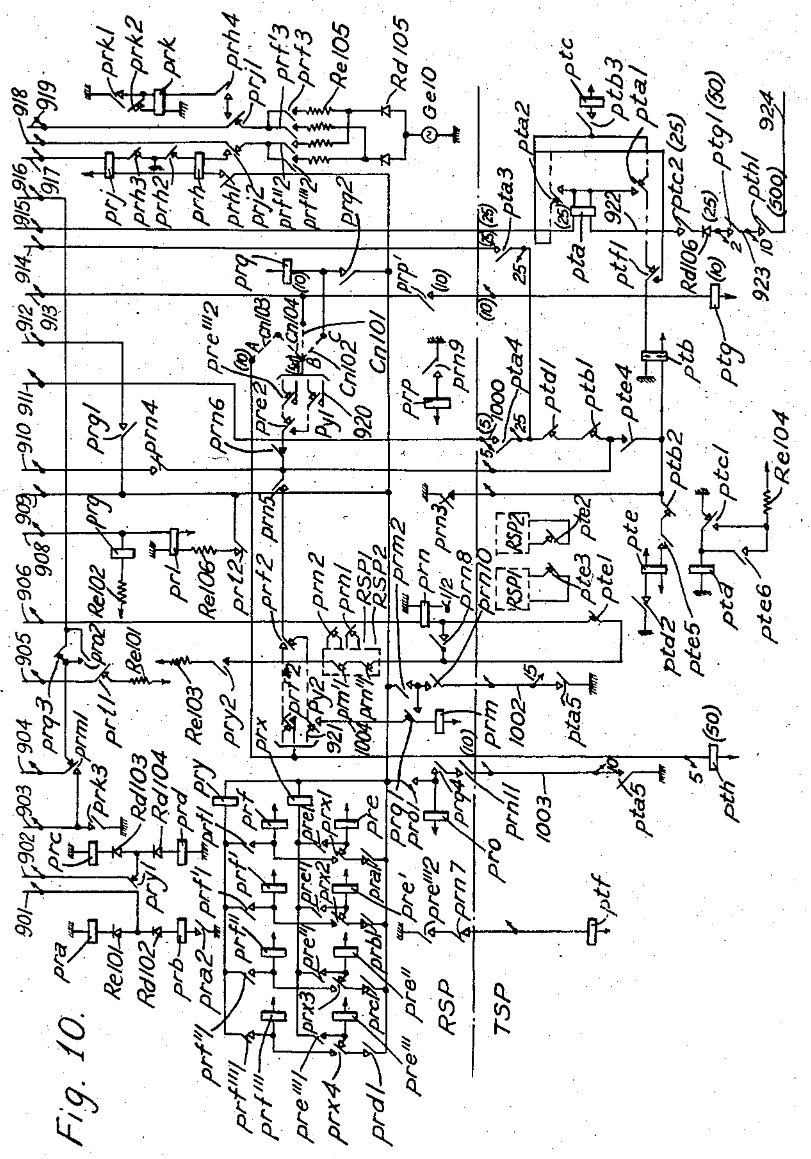
Fig. 10 shows the schematic of the impulse-receiver and of the tester provided for controlling the operation of the first selector of Fig. 9.

As has been indicated, six different combinations can be received by registering relays *pre*, *pre'* and *pre''* of impulse-receiver RSP (Fig. 10). Five out of these six combinations are used to select a group of lines outgoing from the first selector; the sixth combination is a special combination corresponding to no digit but indicating that the first selector must or must not make a direct selection, depending upon the busy condition of the lines. Outgoing wire 920 of contact pyramid Py1 corresponding to this sixth combination is connected to relay *prq*, instead of to one of the *ptg* relays, over connection *cn102*. The reception of this combination is thus translated into the energization of *prq*.

Relay *prq* prepares, if needed, over its front *prq1*, an energizing circuit for relay *prm*; at *prq2* it completes a holding circuit for itself over wire 909 and the ground on contact *pcg2* in connector CSP (Fig. 9); at *prq3* (Fig. 10) it makes a break in wire 916 in order to modify the circuit of operating magnet Y*p* (Fig. 9); at *prq4* it prepares, if needed, an energizing circuit for *pro*.

The combination received by relays *pre . . . pre''* does not allow causing the operation of the *pch* relay (Fig. 9) controlling the selection in the first-selection stage. When the register sends the second combination, which is received by relays *prf . . . prf'''*, outgoing wire 921 of contact pyramid Py2 corresponding to this combination is grounded, this causing, first, the energization of relays *pth* as in the general case and, second, the energization of a relay *ptg* and of a relay *pch* over connections *cn103*, *cn104* and *cn101*. In that case, the same combination received by relays *prf . . . prf'''* controls the first selection and, if need be, the second selection.

It will be assumed by way of example, that this group comprises 25 lines; as indicated, a test relay *pta* has been provided for each of these lines. Contacts *pta5* of the first 15 *pta* relays are multipled to one and the same wire 1002; the contacts of the last 10 *pta* relays are multipled to one and the same wire 1003. It will be assumed first that the line selected corresponds to one of the first 15 *pta* relays. The following circuit is then completed: ground, front *pta5*, wire 1002, front *prn10* and *prq1*, relay *prm*, battery. Relay *prm* energizes, thus indicating that the line selected must be reached without the aid of the second selector.

Relay *prm* completes the following circuit over its front *prm1*: ground, front *pce4* (Fig. 9), *sp3*, *spx1*, *pcg7*, wire 904 (Fig. 10), front *prm1*, wire 903 (Fig. 9), front *pce5* and *xp7*, contact of individual switch *cisp*, operating magnet V*p*, battery; at *prm2* (Fig. 10) it completes a holding circuit for itself over wire 909 and ground on contact *pcg2* (Fig. 9).

Magnet V*p* causes the connection of selector SP to the line selected; the common members associated with said selector release according to a method already described. The second-selection stage is not used.

It will be noted that in the case where the second selector is not used the energization of test relay *pta* of the first tester is obtained over wire 924 (Fig. 12) connection *cn120* and ground.

It will be assumed now that the line selected corresponds to one of the last 10 *pta* relays. The following circuit is then completed: ground, front *pta5* (Fig. 10), wire 1003, front *prn11* and *prq4*, relay *pro*, battery. Relay *pro* energizes. At *pro1* it completes a holding circuit for itself over wire 909 grounded; at *pro2* it completes the following circuit: ground, front *pce4* (Fig. 9), *sp3*, *spx1*, *pcg7*, wire 904 (Fig. 10), back *prm1*, front *pro2*, wire 916 (Fig. 9), front *pcg5*, magnet Y*p*, battery. Magnet Y*p* operates, this causing, as has been indicated in the general case, the seizure of the second-selection stage. The sequence of operations develops as in the general case.

The lines corresponding to the first 15 *pta* relays are seized with priority, so that the second selector is not used unless all these lines are busy.

According to another arrangement, a first-selection stage can select a line to a fifties selector or to a distant office either directly or in combination with a second selector, depending upon the group called. In such a case, the selection of a group is determined by the reception at the impulse-receiver of two selective combinations; the first determines the group selected by the first selector, the second determining the group selected by the second selector, if such a selector is used, or indicating that there is no second selection. In this latter case, said second combination is translated into the grounding of wire 1004 of pyramid Py2, this causing the energization of relay *prm* over back *prq1*. Relay *prm* holds over *prm2* and over its front *prm1* controls the connection in the first selector according to a method already described. All the common members are released and the second selector is not used.

In the second-selection stage (Figs. 11 and 12) it has been assumed that there are several CSS connectors for a single RSS impulse-receiver. It is also possible, depending upon traffic requirements, to provide one CSS connector for one RSS impulse-receiver. In that case, relay *qcj* is no longer necessary; it is replaced with a resistance Re110 and front contacts *gcj*1 and *gcj*2 are short-circuited, as indicated by the dotted-line connections.

It has been assumed that the sending of the ringing current from fifties selector SC (Fig. 6) was effected with the *a* line-wire connected to battery and the *b* wire to ground. In certain cases it may be of interest to reverse the sense of these polarities. Terminal *bn*53 of marking RM (Fig. 4) is then connected to terminal *bn*51. The following circuit is then completed: terminal *bn*51 grounded over a circuit already described, terminal *bn*53, wire 510 (Fig. 5), front *mbc*3, wire 608 (Fig. 6), front contact of individual switch *cisc*, relay *cp*, battery. This relay energizes. At *cp*1 it prepares a holding circuit for itself over contact *vc*6; through the operation of its contacts *cp*2 and *cp*3 it allows the sending of ringing current to the called subscriber with battery on the *b* wire and ground on the *a* wire. This ringing current will be sent after the connection of fifties selector SC to the line selected.

In the foregoing descriptions it has been assumed that, in order to route the call to a called subscriber, marker M had been seized by the first fifties-selector connector. If the marker is seized by the second fifties-selector connector, relay *mba'* will be the one energized over resistance Re57, back *mld*4, *mp*2, *mjd*2, *mba*1, *mjd*3, *mja*4, relay *mp* and battery. Relay *mba'* controls for the second fifties-selector connector circuits similar to those already described for the first connector.

It may happen that one and the same marker M is seized simultaneously by a call from a subscriber, by the first fifties-selector connector and by the second fifties-selector connector. In that case, the call to the first connector receives priority over the other two; in effect, relay *mba* energizes and over its back *mba*1 opens the seizure circuits respectively corresponding to the other two calls. Likewise, if marker M is seized simultaneously by the second fifties-selector connector and by a calling subscriber, the call to the second connector receives priority; in effect, relay *mba'* energizes and at *mba'*1 opens the seizure circuit corresponding to the other call.

When marker M has been used a first time and the release is completed, relays *mja*, *mjb* and *mjc* are energized. This arrangement has been provided in order to revise the order of priority given to the various calls that can be received simultaneously by the marker. In fact, when relays *mja*, *mjb* and *mjc* are energized, the seizure circuits of the marker are modified as follows:

(1) Circuit for seizure by the first fifties-selector connector: *mba*, Re52, back *mld*5 and *mp*3, front *mja*5, back *mac*1, front *mja*3, relay *mp*, battery;

(2) Circuit for seizure by the second fifties-selector connector: relay *mba'*, resistance Re57, back *mld*4, *mp*2, front *mja*6 and back *mjd*2 in parallel, back *mba*1, front *mja*5 and the above-described circuit;

(3) Circuit for seizure by a calling subscriber: ground, front *maa*3, relay *mac*, resistance Re51, back *mp*1, front *mja*3, relay *mp*, battery.

Under these conditions, a calling subscriber has priority over calls coming from the two fifties-selector connectors; in effect, relay *mac* upon energizing opens over its back *mac*1 the circuits for seizure of the marker by the two fifties-selector connectors. Likewise, a call originating at the first fifties-selector connector has priority over a call originating at the second connector; in effect, relay *mba* upon energizing opens over its back *mba*1 the circuit for seizure of the marker by the second connector.

When marker M has been used a second time, contact *mp*4 has been closed and then opened. Upon the closing of said contact the following circuit is completed: ground, front *mp*4, front *mjb*1, upper winding of relay *mjb*, battery, and, in parallel with the preceding circuit, front *mja*8, upper winding of relay *mja*, battery. Relay *mjb* holds, but relay *mja* releases, the fluxes produced in their two windings being equal and of opposite sense. When relay *mp*4 (sic-Translator) opens, relay *mjb* releases in turn.

The assembly constituted by relays *mjc* and *mjd* operates exactly the same way as the assembly constituted by relays *mja* and *mjb*, with the sole difference that relays *mjc* and *mjd* are controlled by contact *mja*2 instead of by contact *mp*4. After the routing of the first call, contact *mja*2 was closed, as has been indicated, and relay *mjc* was energized; after the routing of the second call, contact *mja*2 opens and relay *mjd* is placed in operating position. When the marker is seized for the routing of a third call, relays *mja* and *mjb* are therefore unoperated but relays *mjc* and *mjd* are energized.

Under these conditions, the various circuits for seizing the marker are modified as follows:

(1) Circuit for seizure by the first fifties-selector connector: relay *mba*, resistance Re52, back *mld*5, *mp*3, front *mjd*3, back *mac*1, *mja*3, *mba'*1, front *mjd*2, back *mja*4, relay *mp*, battery.

(2) Circuit for seizure by the second fifties-selector connector: relay *mba'*, resistance Re57, back *mld*4, *mp*2, front *mjd*2, back *mja*4, relay *mp*, battery;

(3) Circuit for seizure by a calling subscriber: ground, front *maa*3, relay *mac*, Re51, back *mp*1, *mja*3, *mba'*1, front *mjd*2, back *mja*4, relay *mp*, battery.

The order of priority of the various calls that can be received simultaneously by the marker is as follows:

(1) Call originating at the second fifties-selector connector;

(2) Call coming from a calling subscriber;

(3) Call originating at the first fifties-selector connector.

In fact, the reception of the call having No. 1 priority causes the operation of relay *mba'*, thus opening at *mba'*1 the seizure circuits corresponding to the two other calls; the reception of the call having No. 2 priority causes the operation of relay *mac*, thus opening at *mac*1 the seizure circuit corresponding to the call having no priority.

When the routing of the third call has ended, contact *mp*4 is closed and then opened a third time. Owing to this, relays *mja* and *mjb* are placed in operating position; front *mja*2 being closed, relay *mjc* releases, relay *mjd* always remaining energized. Under these conditions, the various circuits for seizing the marker are modified as follows:

(1) Circuit for seizure by the first fifties-selector connector: relay *mba*, resistance Re52, back *mld*5, *mp*3, front *mja*5 and *mjd*3 in parallel, back *mac*1, front *mja*3, relay *mp*, battery;

(2) Circuit for seizure by the second fifties-selector connector: relay *mba'*, resistance Re57, back *mld*4 and *mp*2, front *mja*6, back *mba*1, front *mja*5 and *mjd*3 in parallel and the above-described circuit;

(3) Circuit for seizure by a calling subscriber: ground, front *maa*3, relay *mac*, resistance Re51, back *mp*1, front *mja*3, relay *mp*, battery.

Under these conditions, the order of priority is as follows, for reasons similar to those already explained: calling subscriber, first fifties-selector connector and second fifties-selector connector.

When the routing of the fourth call has ended, contact *mp*4 is closed and then opened a fourth time. Owing to this, relays *mja* and *mjb* return to normal; relay *mja*2 (sic-Translator) opens and relay *mjd* releases in turn. The four relays *mja* . . . *mjd* are therefore all unoperated and the condition is back to that of a case already discussed.

From the foregoing explanations it follows that if AP, AC1 and AC2 respectively designate a call from a calling subscriber, a call originating at the first fifties-selector connector and a call originating at the second fifties-selector connector, priority is given as follows:

(1) AC1, AC2 and AP when the marker has not been used at all or has been used 4, 8, 12 . . . times, and generally 4 *n* times, *n* being a whole number;

(2) AP1 (sic-Translator), AC1 and AC2 when the marker has been used 1, 5, 9 . . . times, and generally $4n+1$ times;

(3) AC2, AP and AC1 when the marker has been used 2, 6, 10 . . . times, and generally $4n+2$ times;

(4) AP, AC1 and AC2 when the marker has been used 3, 7, 11 . . . times, and generally $4n+3$ times.

The group-selecting means shown in Figs. 9 to 12 allows making a selection from among 2500 lines divided up into a certain number of groups, some corresponding to line-selecting means giving access to local subscribers and the others to lines outgoing to distant offices. This arrangement has been provided for high-capacity exchanges. In low-capacity exchanges the group-selecting means of Figs. 9 to 12 is replaced to advantage with a combined-selection stage, shown in Figs. 13 and 14. This combined-selection stage will now be described.

Figure 13:
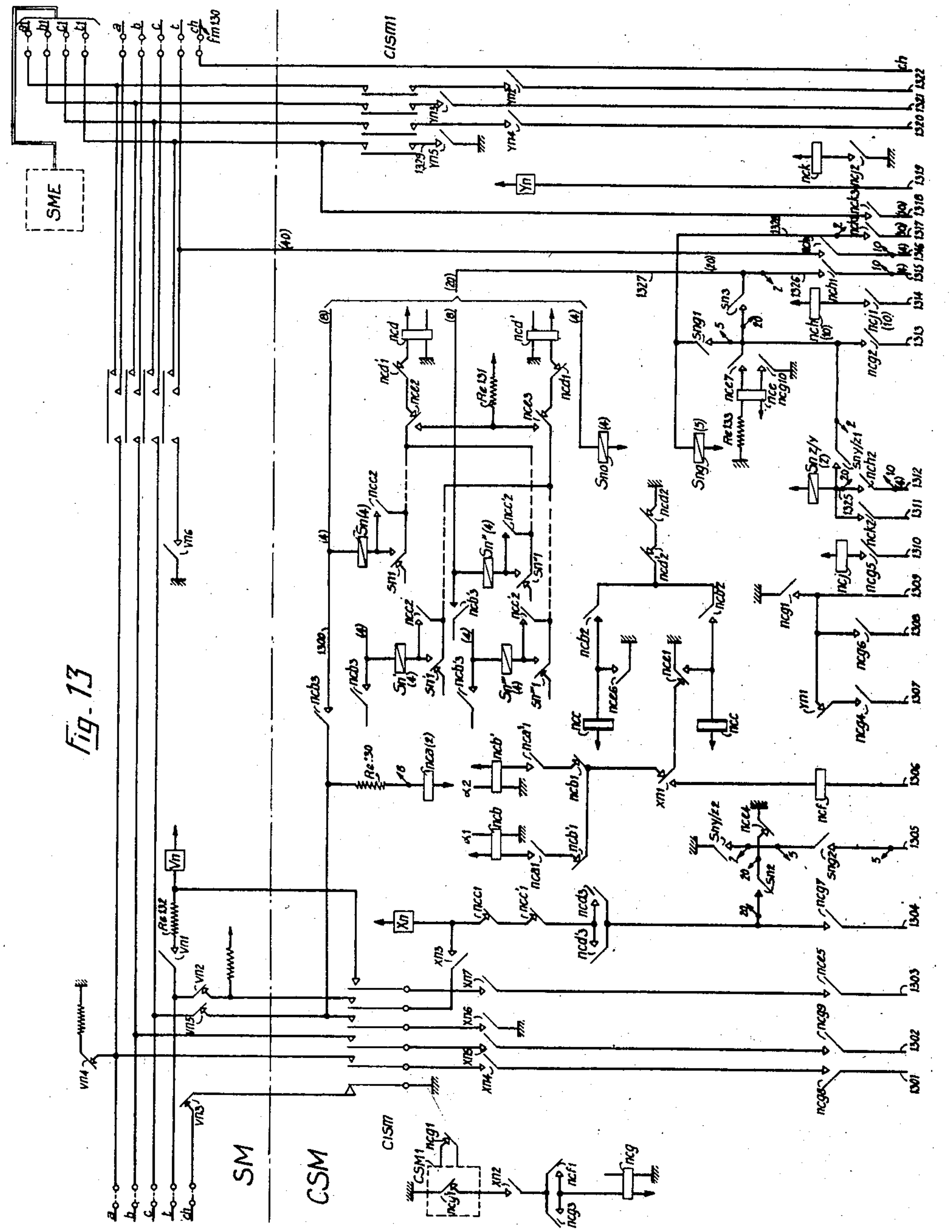
Fig. 13 shows the schematic of a combination selector intended to replace the selectors of Figs. 9 and 11 in the case of a low-capacity exchange.

When the combined selector SM shown in Fig. 13 is seized, the *c* wire is grounded through feeder AL and the following circuit is completed: *c* wire grounded, back *vn*5, resistance R*e*130, relay *nca*, battery. Connector CSM controls 15 combined selectors SC included in one and the same multi-connector. These 15 selectors are divided up into two groups, one comprising 8 and the other 7 selectors. Contacts *vn*5 of the 8 selectors of the first group are multipled to a first relay *nca*; contacts *vn*5 of the 7 selectors of the second group are multipled to a second relay *nca*. The *nca* relay energized therefore characterizes the group comprising the calling combined selector. At *nca*1 relay *nca* completes the following circuit: battery, left-hand winding of relay *ncb*, front *nca*1, back *ncb'*1, *xn*1, *nce*1, ground. Relay *ncb* operates in turn.

Connector CSM includes a relay *ncb* controlled by contact *nca*1 and corresponding to the 8 selectors of the first group and a relay *ncb'* controlled by contact *nca'*1 of the second *nca* relay and corresponding to the 7 selectors of the second group. Relay *ncb* upon operating therefore indicates that the calling selector is comprised in the first group. This relay completes the following circuit at *ncb*2: battery, slow relay *ncc*, front *ncb*2, back *ncd'*2, *ncd*2, ground; at *ncb*3 relay *ncb* prepares the circuit of the selection magnet S*n* corresponding to the calling selector.

Two relays *ncc* and *ncc'* have been provided, one controlled by contact *ncb*2, the other by contact *ncb'*2 and corresponding to the two groups of selectors.

Relay *ncc* completes the following circuit at *ncc*2: ground on the *c* wire of selector SM, back *vn*5, front *ncb*3, magnet S*n*, front *ncc*2, back *nce*2 and *ncd'*1, upper winding of *ncd*, battery. Magnet S*n* and relay *ncd* energize in series.

The multi-connector comprising selector SM comprises 26 selection magnets for selecting lines within a series, only 15 of which can be used in the case under consideration: the 4 S*n* magnets, the 4 S*n'* magnets, the 4 S*n''* magnets and the 3 S*n'''* magnets. In the present phase of operation, these 15 magnets correspond to the 15 selectors SM of the multi-connector. The 1300 wire individual to each selector is connected to the corresponding S*n* magnet. The 4 S*n* and the 4 S*n''* magnets are connected to a relay *ncd*; the 4 S*n'* and the 4 S*n'''* magnets are connected to relay *ncd'*. The S*n* magnet operating therefore characterizes the calling selector's position in the multi-connector.

Relay *ncd* opens at *ncd*2 the circuit of *ncc*, which releases with a certain delay; at *ncd*3 it prepares a circuit for magnet X*n* of switch *cism*.

The S*n* magnet operating completes a holding circuit for itself over its front *sn*1; at *sn*2 it prepares the circuit of magnet X*n*.

When relay *ncc* releases it completes the following circuit at *ncc*1: battery, magnet X*n*, back *ncc*1, *ncc'*1, front *ncd*3 and *sn*2, back *nce*4, ground. Magnet X*n* energizes.

Magnet X*n* opens over its back *xn*1 the circuit of relay *ncb*, which releases; over its front *xn*1 it completes the following circuit: ground, back *nce*1, front *xn*1, relay *ncf* energized, wire 1306 (Fig. 14), back *nrl*1, resistance R*e*140, battery. It is assumed in the example described that contact *nrl*1 is closed, this indicating that combined-selector impulse-receiver RSM is available. Magnet X*n* causes the connection of individual switch *cism* to the line corresponding to the energized S*n* magnet, that is to say, to the calling selector SM.

Individual switch *cism* prepares over its second and third contacts, counting from the left-hand side, the circuit for receiving the coded combination that allows making the selection; over its fourth front contact it completes the following holding circuit for relay *nca*: ground, front *xn*6, contact of individual switch *cism*, resistance R*e*130, relay *nca*, battery. Magnet X*n* holds over: battery, magnet X*n*, front *xn*3, contact of individual switch *cism*, back *vn*2, *t* wire and ground in feeder AL of Fig. 7.

Relay *ncb* upon releasing opens at *ncb*3 the circuit of magnet S*n* and the circuit of relay *ncd*, which release.

Relay *ncf* completes the following circuit at *ncf*1: battery, left-hand winding of relay *ncg*, front *ncf*1 and *xn*2, back *ncg'* of the other connector having access to the same impulse-receiver, ground. This circuit cannot be completed unless contact *ncg'*1 is closed, this in order to prevent the simultaneous operation of the *ncg* relays in one or the other connector and hence the connection of these two connectors to one and the same impulse-receiver.

Relay *ncg* controls the various operations involved in the seizure of impulse-receiver RSM. Over its front *ncg*1 it completes the following circuit: ground, front *ncg*1 and *ncg*6, wire 1308 (Fig. 14), right-hand winding of relay *nrl*, battery; at *ncg*3 (Fig. 13) relay *ncg* completes a holding circuit for itself; at *ncg*10 it completes the circuit of the lower winding of relay *nce* which energizes; over its front *ncg*2, *ncg*4, *ncg*5, *ncg*7 it ensures the continuity of the various connecting wires between connector CSM and impulse-receiver RSM.

Relay *nce* opens over its back *ncel* the circuit of *ncf*, which releases; over its front *nce*1 and *nce*6 it causes the operation of the two relays *ncc'* and *ncc*; over its front *nce*2 and *nce*3 it prepares an energizing circuit for magnets S*n* . . . S*n''*, which will be used for selecting a free outgoing line of the combined selector; at *nce*5 it prepares the energizing circuit of magnet V*n* of combined selector SM; at *nce*7 it prepares a holding circuit for itself.

Relays *ncc* and *ncc'* prepare at *ncc*2 and *ncc'*2 the energizing circuits of selection magnets S*n* . . . S*n'''*.

Relay *nrl* (Fig. 14) opens its contact *nrl*1 in order to busy impulse-receiver RSM; at *nrl*2 it prepares a holding circuit for itself.

The various operations involved in the seizure of selector SM, of connector CSM and of impulse receiver RSM are completed. The *a* and *b* wires are connected to the code-receiving relays over the following circuits:

(1) Wire *a* (Fig. 13), contact of individual switch *cism*, front *xn*4 and *ncg*8, wire 1301 (Fig. 14), and relays *nra* and *nrb* through rectifiers R*d*140 and R*d*141;

(2) Wire *b* (Fig. 13), contact of *cism*, front *xn*5 and *ncg*9, wire 1302 (Fig. 14), back *nrx*1, relays *nrc* and *nrd* through rectifiers R*d*142 and R*d*143.

The register, finding a ground on the *a* and *b* line-wires over the code-receiving relays, sends impulse receiver RSM the digit that is to control the selection of an outgoing line of selector SM. As has already been indicated, the digit is received in the form of polarities or of combinations of polarities, positive or negative, over the two wires 1301 and 1302. Relays *nra* . . . *nrd* allow in principle obtaining $2^4=16$ different combinations; but, owing to the presence of contact *nra*2, the combinations corresponding to relay *nra* unoperated and to *nrb* energized are excluded, this eliminating 4 out of the 16 combinations. Out of the 12 remaining combinations, 10 are used, corresponding respectively to the 10 line-groups on the banks of selector SM. Some of these groups can correspond to local subscribers and others to lines to distant offices.

If it is assumed that the combination received corresponds to the operation of relay *nra*, registering relay *nre* energizes over the following circuit: battery, relay *nre*, front *nra*1, wire 1309 (Fig. 13), front ncg1, ground.

Relay *nre* holds and *nrx* energizes over the following circuit: battery, *nre*, front *nre*1, *nrx*, wire 1309 and ground over the circuit already described.

The 4 relays *nre* . . . *nre'''* used to register the combination received are associated with a certain number of contacts *nre*2 . . . *nre'''*2 arranged in a pyramid Py4. Since 10 different combinations are used, this pyramid comprises 10 outgoing wires 1400, each corresponding to a given combination. Relays *nre* . . . *nre'''* likewise comprise contacts *nre*3 . . . *nre'''*3 which if need be prepare the retransmission of the digit received to a second-selection stage similar to the first-selection stage.

Relay *nrx* makes a break at *nrx*1 in wire 1302, to tell the register that the combination has been properly received; said register ends the transmission of this combination and *nra* releases. Relay *nrx* completes the following circuit at *nrx*2: battery, Re141, front *nrx*2, back *nrn'*1, *nrn''*1, *nte*1, left-hand winding of *nrn*, wire 1307 (Fig 13), front *ncg*4, back *yn*1, front *ncg*1, ground. The preceding circuit cannot be completed unless contact *nte*1 (Fig. 14) is closed, that is, unless combined-selector tester TSM is available. Contacts *nrn'*1, *nrn''*1 are associated with the *nrn* relays of the other impulse-receivers having access to one and the same tester TSM; they have been provided in order to prevent the simultaneous seizure of the tester by several impulse receivers.

Relay *nrn* upon operating controls the various operations involved in the seizure of tester TSM by impulse-receiver RSM. At *nrn*3 it causes the energization of relay *ntb*; at *nrn*4 it prepares the energization of relay *ncj* in connector CSM (Fig. 13); at *nrn*5 (Fig. 14) it prepares the grounding of incoming wire 1401 of pyramid Py4 and hence the energization of the *nch* relay (Fig. 13) characterizing the digit received; at *nrn*6 (Fig. 14) it causes the energization of relay *nrp*; at *nrn*7 it completes a holding circuit for itself; at *nrn*8 it causes the energization of relay *ntg*. Impulse-receiver RSM gives access to a plurality of connectors CSM, all serving combined selectors terminating at the same outgoing lines; in other words, impulse-receiver RSM corresponds to one and the same section of combined selectors. In tester TSM there is one *ntg* relay per RSM impulse-receiver, that is to say, one relay per section of combined selectors.

Relay *nrp* prepares at *nrp*1 the circuit of a relay *nth*. Tester TSM comprises 10 *nth* relays, respectively connected to the 10 outgoing wires 1400 of contact pyramid Py4, each of these relays corresponding to a different combination.

Relay *ntb* completes the following circuit at *ntb*3: battery, relay *ntc*, front *ntb*3, back *nta'*1 . . . *nta*1, upper winding of relay *ntb*, ground. Relay *ntc* energizes. The fluxes produced by the two windings of relay *ntb* oppose each other, but the flux of the lower winding is preponderant and this relay holds.

Relay *ntc* causes over its front *ntc*1 the operation of relay *ntd*; over its front *ntc*2 it prepares the testing of a free line in the group dialed.

Relay *ntd* completes the circuit of relay *nte* at *ntd*2.

Relay *nte* completes the following two circuits at *nte*4:

(1) Ground, front *nrn*3, *nte*4, *nrn*4, wire 1310 (Fig. 13), front *ncg*5, relay *ncj*, battery;

(2) Ground, front *nrn*3 (Fig. 14), *nte*4, *nrn*5, wire 1401, contacts of pyramid Py4, wire 1400, front *nrp*1, relay *nth*, battery.

Relay *nte* prepares a holding circuit for itself at *nte*5; at *nte*6 it completes a holding circuit for relay *ntd*.

Relay *ncj* (Fig. 13) completes the following circuit at *ncj*1: battery, *nch*, front *ncj*1, wire 1314 (Fig. 14), outgoing wire 1400 of pyramid Py4 and ground over a circuit already described. Ten relays *nch* (Fig. 13) have been provided in CSM, which are respectively connected to the 10 outgoing wires 1400 of pyramid Py4, each of these wires corresponding to a combination received from the register. Relay *ncj* completes the circuit of *nck* at *ncj*2.

Relay *nch* prepares at *nch*1 and *nch*2 the circuit of the selection magnets corresponding to the line that must be selected.

Combined selector SM (Fig. 13) gives access to 52 lines. Forty of these lines are used for the normal routing of calls and are connected either to line-selecting means SL or to equipments corresponding to lines outgoing to distant offices. The next 10 lines are used as cooperating lines and are connected to a combined-selection stage similar to the stage under consideration. The last two lines are not used. The 40 lines used for the normal routing of calls are divided up into 10 4-line groups, each group corresponding to a combination received at the impulse-receiver.

To test for a free line in the group dialed, tester TSM comprises 4 relays *nta* and 10 relays *nta'*. Relays *nta* are used in the case of the 40 lines provided for the normal routing of calls; the 10 relays *nta'* are used in the case of the cooperating lines. Throughout what follows it will be assumed that the call can be routed without the aid of a cooperating line. The 4 relays *nta* are common to the 10 line-groups and each characterizes the position of a line in any given group.

The 4 wires 1316 respectively connected to the 4 *nta* relays are each multipled to 10 contacts *nch*3 (Fig. 13) respectively associated with the 10 relays *nch*. At the outlet of contacts *nch*3 are thus obtained 40 *t* wires corresponding respectively to the 40 lines used for the normal routing of calls. When a line is available, the *t* wire is connected to battery.

If there is at least one free line in the group dialed, a relay *nta* (Fig. 14) energizes over: ground, front *ntc*2, windings of *nta* in series, wire 1316 (Fig. 13), front *nch*3, wire *t* and battery. Relay *nta* energizes.

Relay *nta* (Fig. 14) opens over its back *nta*1 the circuit of relay *ntc*, which releases; over its front *nta*1 it places the low-resistance upper winding of relay *ntb* in parallel with its own high-resistance lower winding, in order to decrease the test potential on wire 1316 and mark the line selected busy. Assuming said line is tested only by the tester under consideration, the fluxes produced in the two windings of relay *ntb* are equal and of opposite sense and said relay releases. At *nta*2 and *nta*3 relay *nta* prepares the circuit of the selection magnets corresponding to the line selected.

Relay *ntb* upon releasing prepares at *ntb*1 the circuit of the selection magnets corresponding to the line selected; at *ntb*2 it completes the following holding circuit for relay *nte*: battery, lower winding of relay *nte*, front *nte*5, back *ntb*2, front *nrn*3, ground.

Relay *ntc* upon releasing short-circuits over its back *ntc*1 relay *ntd*, which releases with a certain delay.

If there are several free lines in the group corresponding to the call number dialed, several *nta* relays have been able to operate simultaneously. After the release of relay *ntc*, all said *nta* relays have their energizing circuits opened at *ntc*2; one of them holds over its front *nta*1 and through the opening of its back *nta*1 prevents the holding of the others over a similar circuit.

When relay *ntd* releases, it completes the following circuits at *ntd*1 for the selection magnets corresponding to the line selected:

(1) Ground, front *nrn*3, *nte*4, back *ntb*1, *ntd*1, front *nta*2, wire 1312 (Fig. 13), front *nch*2, magnet S*ny*, battery;

(2) Ground, front *nrn*3 (Fig. 14), *nte*4, back *ntb*1, *ntd*1, front *nta*3, wire 1315 (Fig. 13), front *nch*1, selection magnet Sn, front ncc2, nce2, resistance Re131, battery.

To select on the banks of combined selector SM one from among the 40 lines that can be used for the normal routing of calls, there are two selection magnets, Sny, Snz and 20 selection magnets (no reference given—Translator), namely, 4 magnets Sn, 4 magnets Sn′, 4 magnets Sn″, 4 magnets Sn‴ and 4 magnets Sno. Magnets Sny and Snz allow selecting a series of 20 lines; magnets Sn . . . Sn‴ and Sno allow selecting a particular line within each 20-line series.

To allow the operation of the two selection magnets corresponding to the line selected the circuits have been arranged as follows. Contact ntd1 (Fig. 14) is multipled to 4 contacts nta2 respectively associated with the 4 different nta relays, this giving four 1312 wires at the outlet of contacts nta2; each 1312 wire (Fig. 13) is multipled to 10 contacts nch respectively associated with the 10 nch relays. At the outlet of contacts nch2 are thus obtained 40 wires 1325 respectively corresponding to the 40 outgoing lines of selector SM and used for the normal routing of calls. The 1325 wires corresponding to the 20 lines that must be selected by magnet Sny are all connected to said magnet; likewise, the 1325 wires corresponding to the 20 lines that must be selected by magnet Snz are all connected to said magnet.

According to the same method previously described, at the outlet of contacts nch1 are obtained 40 wires 1326, respectively corresponding to the 40 outgoing lines of selector SM and used for the normal routing of calls. The 1326 wires corresponding to the two lines that must be selected by one of magnets Sn . . . Sn‴, Sno are both connected to that magnet. Twenty wires 1327 are thus obtained, respectively connected to 20 magnets Sn . . . Sn‴, Sno.

The Sn magnet and the Sny magnet that have operated prepare the connection of combined selector SM to the outgoing line selected. Over its front sn1 and sn3 magnet Sn completes the following holding circuit for itself: battery, resistance Re131, front nce2 and sn1, magnet Sn, wire 1327, front sn3 and ncg2, wire 1313 (Fig. 14), front nrx4, wire 1308 (Fig. 13), front ncg6, ncg1, ground.

Selection magnet Sny completes a holding circuit for itself over front sny1, ncg2, wire 1313 and ground over the circuit previously described; at snz2 it completes, together with magnet Sn, the following circuit: ground, front snz2, sn2, ncg7, wire 1304 (Fig. 14), wire 1303 (Fig. 13), front nce5, xn7, front of individual switch cism, connecting magnet Vn of selector SM, battery.

Magnet Vn completes the following holding circuit for itself at vn1: battery, Vn, Re132, front vn1, t wire and ground in the feeder; at vn2 it opens the holding circuit of magnet Xn, which releases; at vn4 it removes the ground from the a wire; at vn5 it isolates the selector's c wire from relay nca.

Magnet Vn causes the connection of the a, b and c wires of selector SM to the a, b and c wires of the line selected. The t wire of that line is grounded over a contact of selector SM and contact vn6 in order to prepare various holding circuits in the next selection stage. The continuity of the line wires is established between a feeder AL and fifties selector SC and the sequence of operations develops as in the general case.

The connection of selector SM to the line selected having been effected, the various common members that have been seized to control that connection will release as follows:

In connector CSM relays nca and ncg release, having their circuits opened respectively at xn6 and xn2. Relay ncj releases, having its circuit opened at ncg5. Relays nch and nck release, having their circuits opened respectively at ncj1 and ncj2. Magnets Sn and Sny release, having their circuits opened at ncg2. Relay nce holds as long as one of magnets Sn . . . Sn‴, Sno, Sny, Snz itself is holding; thus, for example, if magnet Sny is the one still in operating position, nce holds over the following circuit: ground, Re133, upper winding of nce, front nce7 and sny1, magnet Sny, battery. When the selection magnets have returned to normal, relay nce, which further has the circuit of its lower winding opened at ncg10, releases and at nce1 and nce6 opens the circuit of relays ncc and ncc′, which release in turn. Connector CSM is fully released.

In impulse-receiver RSM and in tester TSM (Fig. 14) relays nre and nrx release, having their circuits opened at ncg1 in the connector; relay nrn releases, having its circuit opened at ncg4 and ncg1 in the connector. Relays nrp, nte, ntg and nth have their circuits opened respectively at nrn6, nrn3, nrn8 and nrn5. Relay nta releases when its circuit is opened at nch3 in the connector. Relay nr1 remains energized as long as some other relay holds over wire 1309; thus, for example, if nre is still energized, relay nrl holds over: ground, left-hand winding of nrl, Re142, front nrl2, wire 1309, front nra1, relay nre, battery. Resistance Re142 is so chosen as to allow the holding of nrl without preventing the release of the various relays capable of holding over wire 1309. When all these relays have released, relay nrl itself returns to normal and again closes its contact nrl1 so as to mark impulse-receiver RSM available.

The various common members used to control the operation of combined selector SM are fully released and ready to be used for the routing of a new call.

When the call is ended, ground is removed from the t wire and magnet Vn releases, thus causing the opening of the various contacts of selector SM.

In low-capacity exchanges the above-described combined selection stage may suffice to ensure the connection between the feeder and the line-selecting means or between the feeder and an outgoing-line equipment. When other subscribers or outgoing lines are connected to the automatic switchboard under consideration, that stage might be insufficient but without thus requiring recourse to the group-selecting means of Figs. 9 to 12. Provision is then made, on the banks of combined selectors SM, of a certain number of lines each giving access to a cooperating selector SME (Fig. 13). Said cooperating selector and the common members controlling its operation are identical from a schematic viewpoint with the combined selector and its associated common members.

Figure 15:
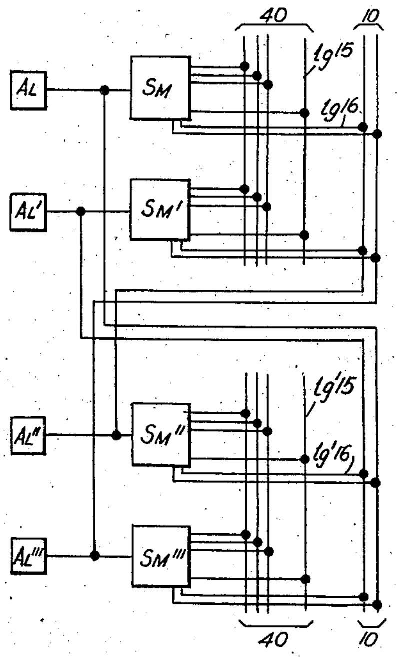
Fig. 15 is a diagram showing the general operation of the combination selectors in the case of cooperation.

In Fig. 15 is shown a first section of combined selectors SM, SM′ jointly serving 40 lines such as lg15 and a second section of combined selectors SM″ and SM‴ jointly serving 40 lines lg′15. If a call uses selector SM, it may happen that all the lg15 lines corresponding to the call number dialed are busy; 10 cooperating lines lg16 are then provided on the banks of said selector SM. These 10 lines are also accessible to SM′. The two lg16 lines shown terminate respectively at the two selectors SM″ and SM‴ of the second section; the other lg16 lines may terminate at selectors (not shown) forming part of other sections. If there is no free lg15 line in the group corresponding to the call number dialed, SM is connected to one of the cooperating lines lg16, to the one terminating, for example, at SM″. Arrangements are provided that prevent selector SM″ from being selected unless it gives access to at least one free lg′15 line in the group corresponding to the call number dialed. Under these conditions, the call, instead of being lost, is routed over line lg′15.

In the last-described example it has been assumed that there are 12 sections of combined selectors; the 10 cooperating lines lg16 outgoing from selector SM will be connected respectively to 10 selectors belonging to different sections. Since selector SM can receive 10 different digits, the 40 lg15 lines will be divided up into ten 4-line groups; selector SM can thus have access, in the group dialed, on the one hand, to 4 lines lg15 and, on the other hand, to 10 cooperating lines lg16 each having access to 4 lines such as lg′15. Selector SM thus has access, all told, to $4+(4\times10)=44$ lines in the group dialed.

Likewise, the section of selectors SM″, SM‴ gives access in common to 10 cooperating lines *lg′*16, which are divided among 10 selectors belonging to other sections.

Of course, a selector such as SM″ can be used either as a cooperating selector or else to route the calls directly; incoming line *lg*17 is therefore connected on the one hand to a line *lg*16 and on the other to feeder AL″.

To select a cooperating line from among the 10 lines connected to combined selector SM, tester TSM (Fig. 14) comprises 10 relays *nta′*, each corresponding to a given cooperating line. Each relay *nta′* is connected, over a wire 1318 and a front contact *nck*3 (Fig. 13), to test-wire *t* of a cooperating line; this wire is connected to battery if that line terminates at a free selector.

A cooperating line cannot be selected unless it terminates at a free selector identical with the one of Fig. 13, but this condition is not sufficient; it is further necessary that said selector belong to a section having access to a free line in the group dialed. To that end, chain circuits have been provided, arranged as follows. Each of the 10 wires 1402 (Fig. 14) connected to the *nta″* relays is multipled, over a contact *ntc*2 and a rectifier R*d*144, to *n* contacts *ntg*1 respectively associated with the *n ntg* relays. At the outlet of contacts *ntg*1 are thus obtained 10× *n* wires 1403. As indicated, each *ntg* relay characterizes one and the same selector section; each wire 1403 thus characterizes both the cooperating line's position on the banks of a selector and the section comprising said selector. Each wire 1403 is connected to one of the left-hand terminals *bn*56 of distributer RP4. This distributer further comprises 12 right-hand terminals *bn*57, each corresponding to the line group that can be reached over one and the same selector section.

The connections within distributer RP4 will depend upon the connections made between normal combined selectors and combined selectors used as cooperating selectors. Generally, if a cooperating line gives access to a selector of the position *n* section, the *bn*56 terminal associated with that line will be connected to the *nth bn*57 terminal. If it is assumed, for example, that the calling selector belongs to section No. 1, and that the 10 cooperating lines outgoing from this selector terminate at selectors belonging respectively to sections 2 to 11, the *bn*56 terminal corresponding to the first cooperating line will be connected to *bn*57 terminal No. 2, the *bn*56 terminal of the second cooperating line being connected to *bn*57 terminal No. 3, and so on.

Each *bn*57 terminal is multipled to 10 contacts *nth*1 respectively associated with 10 different *nth* relays. At the outlet of contacts *nth*1 are thus obtained 12×10=120 chain wires *ch*. Each *ch* wire is thus common to the various lines served by one and the same section of selectors and corresponding to one and the same call number. In the case of calls intended for local subscribers, the lines outgoing from the combined selectors terminate at fifties selectors SC. Each *ch* wire (Figs. 14, 13 and 6) is multipled to the *vc*2 contacts of all the fifties selectors SC connected to the lines outgoing from a combined-selector section and corresponding to one and the same call number. In the example described it has been assumed that each combined-selector section gives access to 40 lines, or 4 lines per call number; each *ch* wire will therefore be multipled to four back contacts such as *vc*2.

From the foregoing explanations it develops that if there is a selector section having access, in the group dialed, to a free fifties selector associated with a free connector, the *bn*57 terminal (Fig. 14) of that section is grounded over the following circuit: wire 1404, front *nth*1, wire *ch* (Figs. 13 and 6), wire 600, back *vc*2, back contact of individual switch *cisc*, ground. If the calling selector has a cooperating line terminating at a selector of that section, the *bn*56 terminal of that line is connected to the *bn*57 terminal of that section and is thus grounded.

The following circuit is then completed: terminal *bn*56 grounded, wire 1403, front *ntg*1, R*d*144, front *ntc*2, windings of *nta′* in series, wire 1318 (Fig. 13), front *nck*3, wire *t*1 and battery in SME. Relay *nta′* energizes.

It will be noted that if several cooperating lines served by the tester under consideration terminate at selectors of one and the same section, several *bn*56 terminals of distributer RP4 can be connected to one and the same *bn*57 terminal, this entailing the risk of causing confusion between the circuits of the two *nta′* relays. A rectifier R*d*144 has been provided in the circuit of each *nta′* relay in order to prevent such confusion.

It will be noted further that one and the same fifties selector can be reached from several TSM testers; consequently, chain wire *ch* (Fig. 13) can be multipled to several distributers RP4, as indicated by arrow *fm*130.

Relay *nta′* opens over its back *nta′*1 the circuit of relay *ntc*, which releases; over its front *nta′*1 it completes a holding circuit for itself and places the low-resistance upper winding of relay *ntb* in parallel with its own high-resistance lower winding, in order to decrease the test potential on wire 1318 and to busy the cooperating line selected. If that line is selected only by the tester under consideration, the fluxes produced by the two windings of relay *ntb* are equal and of opposite sense and this relay releases.

Relay *ntb* prepares at *ntb*1 the circuit of the selection magnets corresponding to the line selected. Relay *ntd*, thereupon short-circuited over back *ntc*1, releases and the following two circuits are completed:

(1) Ground, front *nrn*3, *nte*4, back *ntb*1 and *ntd*1, front *nta′*2, wire 1311 (Fig. 13), front *nck*2, selection magnet S*ny*, battery;

(2) Ground, front *nrn*3 (Fig. 14), *nte*4, back *ntb*1 and *ntd*1, front *nta′*3, wire 1317 (Fig. 13), front *nck*1, magnet S*ng*, battery.

To select the 10 cooperating lines, connector CSM comprises two selection magnets S*ny* and S*nz* and 5 selection magnets S*ng*. Magnets S*ny* and S*nz* allow selecting a group of 5 cooperating lines from among the 10 lines; magnets S*ng* allow selecting a particular cooperating line in the group chosen by S*ny*, S*nz*.

To allow the proper operation of the magnets corresponding to the cooperating line selected, the circuits of said magnets are arranged as follows. Contact *ntd*1 (Fig. 14) is multipled to 10 contacts *nta′*2 associated with the 10 different *nta′* relays, this giving at the outlet of contacts *nta′*2 10 wires 1405 respectively corresponding to the 10 cooperating lines. The five 1405 wires of the cooperating lines of the first group are all connected, over a wire 1311 and a contact *nck*2 (Fig. 13), to magnet S*ny*; the five 1405 wires of the cooperating lines of the second group are all connected, over a wire 1311 and a contact *nck*2, to magnet S*nz*. Contact *ntd*1 (Fig. 14) is multipled to 10 contacts *nta′*3 associated with the 10 different *nta′* relays, this giving, at the outlet of contacts *nta′*3, 10 wires 1317, respectively corresponding to the 10 cooperating lines. Two 1317 wires corresponding to two lines selected by one and the same magnet S*ng* are connected to said magnet over a contact *nck*1. At the outlet of contacts *nck*1 are thus obtained 5 wires 1328, respectively connected to the 5 S*ng* magnets.

The S*ng* magnet operating completes the following holding circuit for itself at *sng*1; battery, magnet S*ng*, front *sng*1 and *ncg*2, wire 1313 (Fig. 14), front *nrx*4, wire 1308 (Fig. 13), front *ncg*6 and *ncg*1, ground.

Magnet S*ny* completes the following holding circuit for itself at *sny*1: battery, magnet S*ny*, front *sny*1, *ncg*2, wire 1313 and the above-described circuit; at *sny*2 it completes, together with magnet S*ng*, the following circuit: ground, front *sny*2 and *sng*2, wire 1305 (Fig. 14), wire 1319 (Fig. 13), magnet Y*n*, battery. Magnet Y*n* energizes.

Magnet Y*n* opens at *yn*1 the holding circuit of relay *nrn* (Fig. 14), which releases; it causes, in addition, the closing of the contacts of individual switch *cism*1 and hence the connection of wires 1329 . . . 1332 (Fig. 13) to wires *t*1, *c*1, *b*1, *a*1 terminating at the cooperating selector SME selected. Wire *t*1 is grounded over the contact of individual switch *cism*1 and contact *vn*5, in order to maintain the busy marking on said selector SME; wire *c*1 is likewise grounded, over the following circuit: second contact of individual switch *cism*1 counted from the left, front *yn*4, wire 1320 (Fig. 14), back *nrj*5, wire 1308 (Fig. 13), front *ncg*6 and *ncg*1, ground. This grounding of wire *c*1 causes the seizure of the cooperating selection stage.

When relay *nrn* releases (Fig. 14) it opens at *nrn*3 the circuit of each of relays *nte, nth, ncj* and *nch*; at *nrn*6 it opens the circuit of relay *nrp*; at *nrn*8 it opens the circuit of relay *ntg*.

Figure 14:
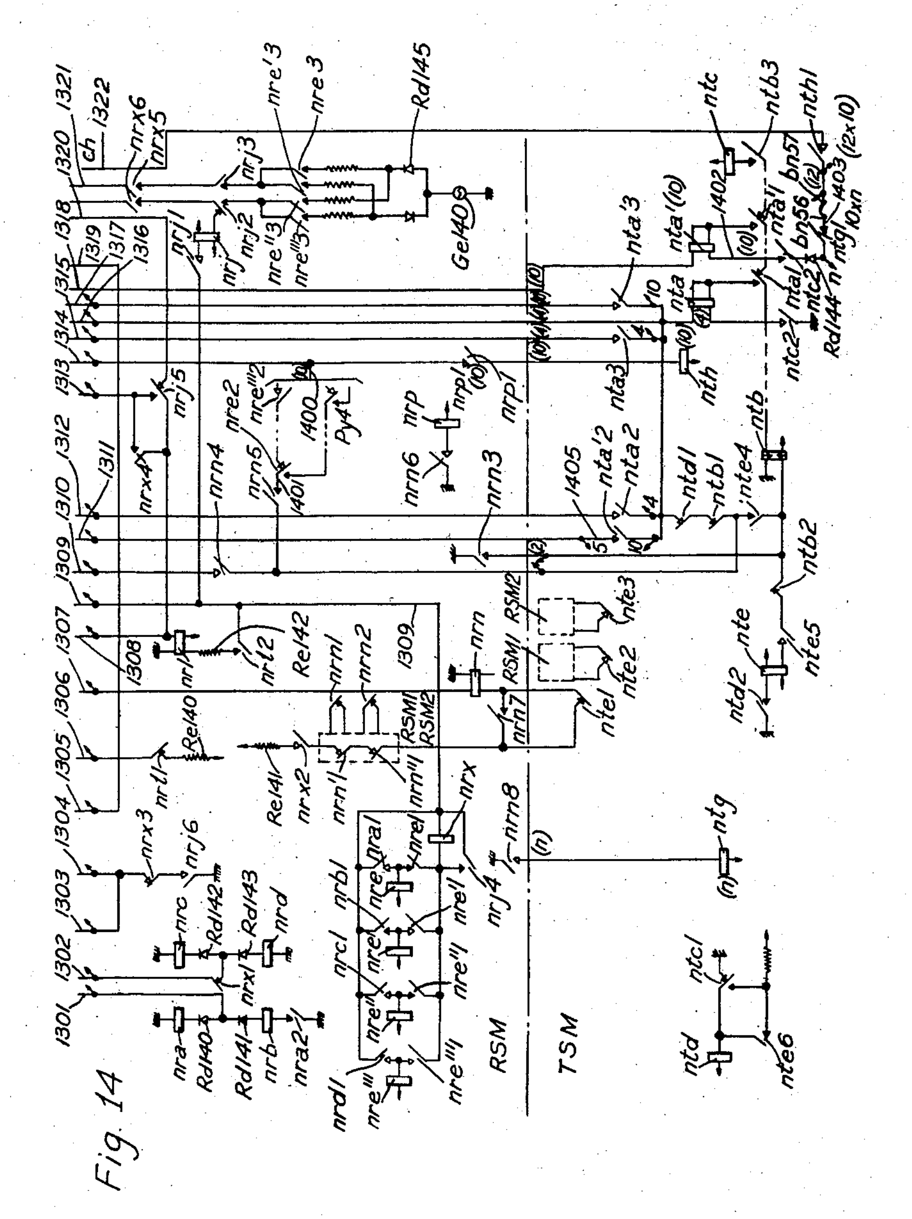
Fig. 14 shows the schematic of the impulse-receiver and of the tester provided for controlling the operation of the combination selector of Fig. 13.

Relay *ncj* (Fig. 13) opens at *ncj*2 the circuit of relay *nck*. Relay *nck* (Fig. 13) opens at *nck*3 the circuit of relay *nta'* (Fig. 14). Tester TSM is completely released and ready to route a new call.

When the impulse-receiver of the cooperating selection stage is in position to receive the coded combination, wire *b*1 is grounded by the same method described in the case of the combined selection stage and the following circuit is completed: wire *b*1 grounded, contact of individual switch *cism*1, front *yn*3, wire 1321 (Fig. 14), front *nrx*6, back *nrj*2, lower winding of relay *nrj*, battery. Relay *nrj* energizes.

Relay *nrj* completes the following holding circuit for itself at *nrj*1: battery, upper winding of relay *nrj*, front *nrj*1, wire 1309 (Fig. 13), front *ncg*1, ground; over its front *nrj*2 and *nrj*3 (Fig. 14) it causes the retransmission of the digit received from the RSM impulse-receiver under consideration to the impulse-receiver of the cooperating selection stage. In the example described, the combination received corresponded to a positive polarity and was registered by relay *nre*; that combination is retransmitted over the following circuit: ground, generator G*e*140, rectifier R*d*145, front *nre*3, *nrj*3, *nrx*5, wire 1322 (Fig. 13), front *yn*2, contact of individual switch *cism*1, wire *a*1. At *nrj*4 (Fig. 14) relay *nrj* short-circuits relay *nrx*, which releases with a certain delay; over its front *nrj*5 it continues to ensure the holding of the selection magnets even after the opening of contact *nrx*4; over its front *nrj*6 it prepares the operation of the connecting magnet of combined selector SM.

Relay *nrx* upon releasing completes the following circuit at *nrx*3: ground, front *nrj*6, back *nrx*3, wire 1303 (Fig. 13), front *nce*5 and *xn*7, contact of switch *cism*, magnet V*n* of selector SM, battery; at *nrx*5 (Fig. 14) it ends the transmission of the coded combination to the cooperating selection stage.

Connecting magnet V*n* (Fig. 13) causes the closing of the contacts of combined selector SM, thus establishing the connection of the *a*, *b* and *c* wires of said selector with the *a*1, *b*1 and *c*1 wires of the cooperating selection stage. As has been indicated, the cooperating selection stage is identical with the combined selection stage and the operations in said cooperating selection stage develop according to a method already described. The connection is then extended from the feeder up to the fifties selector across combined selector SM and cooperating selector SME.

If the banks of a combined selector SM contain two free lines, one terminating directly at a fifties selector and the other at a cooperating line, priority is given to the seizure of the first of these lines. In fact, in that case, a relay *nta* (Fig. 14) and a relay *nta'* energize; after the opening of contacts *ntc*2, these two relays have their energizing circuits opened, relay *nta* holding over its front *nta*1 and preventing over its back *nta*1 the holding of relay *nta'*.

Several combined selectors SM can be in calling position simultaneously; connector CSM serves said calls in succession according to a method already described. The RSM impulse-receiver to which connector CSM has access may be busy; the same applies to the TSM tester to which receiver RSM has access; in both these cases, the routing of the call is held up briefly until said connector or said tester become free again.

Only the case of calls between local subscribers has been considered in the preceding descriptions, but it is quite evident that the automatic switchboard described allows routing calls originating at distant offices, calls intended for distant offices and transit calls. In the first case, the circuit incoming into the office involved terminates, through the medium of suitable equipment, at a group-selecting means giving access to local subscribers; in the second case, the lines outgoing to distant offices are connected to the group-selecting means. The third case is merely a combination of the first two.

It is quite evident that the preceding descriptions have been given only as a non-limitative example and that numerous modifications can be introduced without departing from the scope of the invention. Said descriptions concern the case of a system using cross-bar switches, but a certain number of the arrangements covered could be applied to other telephone systems such as those having rotary switches. It would also be possible to arrange the subscribers otherwise than in groups of 5000, 500 and 50, to provide cross-bar switches comprising different selection-magnet arrangements, or of different capacities, and to modify the number of members used.

What is claimed is:

1. An automatic telephone system comprising a selecting stage having a plurality of individual selecting switches, each switch having a plurality of outlets, and each switch adapted to be seized, a plurality of connectors, each serving a number of different individual selector switches, a plurality of impulse-receivers, each serving a number of different connectors, means in each connector for hunting for a seized individual selector switch associated therewith and connecting said switch to the impulse-receiver associated with said connector, means in each impulse receiver for receiving and registering signals for determining the position of the individual selector switch connected therewith in order to connect said switch to a particular outlet, means operated by said impulse-receiver for positioning said individual selector switch on an outlet determined by said signals when said signals have been registered in said impulse-receiver, a tester common to all said impulse-receivers, means for connecting said tester to a receiver when said impulse-receiver has registered said signals, means in said tester for testing the free or busy condition of a selected outlet and adapted to operate when said outlet is free, means operated by said testing means for causing said impulse-receiver to operate said individual selector switch to complete the connection to said selected outlet, and means operated by the operation of said individual selector switch for disconnecting said connector, said impulse-receiver, and said tester.

2. A line selecting equipment for an automatic telephone system comprising a plurality of lines divided into groups, a group of terminal selectors for each group of lines, each terminal selector of a group having the lines of the associated group of lines terminating therein, a plurality of terminal selector connectors, there being one for each group of terminal selectors connected to the selectors of said group, means connected to said terminal-selector connectors for transmitting thereto an indication of the position of a calling one of said lines in a group of lines associated with said connector, means in each terminal-selector connector for receiving and storing said indication therein, a marker connected to said connectors, means in each of said terminal-selector connectors for transmitting indication of the group of lines including the calling line to said marker, means in said marker for receiving and storing said group-of-lines indication, a plurality of call finders arranged in groups, said terminal selectors being selectively available to said call finders, a plurality of call-finder connectors, each connected to a different group of said call finders and all connected to said marker, means in each marker for selecting and seizing a call finder connector in accordance with said group-of-line indication stored therein, means in said marker for transmitting said line position indication to said seized call finder connector, means under control of said marker for causing said call finder connectors selectively to connect an associated call finder with a terminal selector connectable to said calling line, means under control of said marker for causing said terminal selector connector selectively to connect said selected terminal selector with the calling line, a plurality of sub-group selectors arranged in groups and connected respectively with said call finders, a plurality of sub-group-selector connectors, there being one for each group of sub-group selectors, a plurality of impulse-receivers connected respectively with said sub-group-selector connectors and with said marker, means for seizing a sub-group selector which has access to a called one of said lines, means responsive to the seizure of a sub-group selector for causing the sub-group-selector connector associated therewith to hunt for said seized sub-group selector and to connect it to the impulse-receiver associated with said sub-group-selector connector, said impulse receiver being adapted to receive and register an indication identifying said called line, means in said impulse-receiver for transmitting said called-line indication to said marker, means controlled by said marker for seizing and transmitting said indication to one of said terminal selector connectors having access to a terminal selector which has access to said called line, means in said terminal selector connector for positioning said selected terminal selector on said called line, means in said marker for testing the free or busy condition of said called line, and means controlled by said marker if said called line tests free for causing said terminal selector connector to operate said terminal selector to complete the connection between said terminal selector and said called line.

3. A line selecting equipment, as defined in clam 2, in which the sub-group selector connector serving a group of sub-group selectors and the call finder connector serving the corresponding group of call finders have common control means.

4. A line selecting equipment, as defined in claim 2, in which there are a plurality of chains of terminal selectors, call finders, and sub-group selectors, together with the associated terminal selector connectors, call finder connectors, sub-group selector connectors, impulse-receivers and markers, each of said chains being adapted to serve a given line, and means for excluding other chains for a particular call when one is being used for that call.

5. A line selecting equipment, as defined in claim 4, in which all the terminal selectors in a given chain served by one terminal selector connector are assigned to the same group of lines or to a plurality of consecutive groups of lines.

6. A line selecting equipment comprising a plurality of lines arranged in groups, a plurality of terminal selectors in which said lines terminate, said terminal selectors being arranged in groups, a plurality of terminal selector connectors, there being one for each group of terminal selectors, a marker connected to said terminal selector connectors, means in said marker for registering a plurality of calling line indications when a plurality of calls are made simultaneously from lines of the same group, means for giving one of said indications priority, means for transmitting said calling line indication to the associated terminal selector connector, mean for cyclically modifying the priority thus given to the calling line indications registered in said marker, and means for causing said terminal selector connector under control of said marker to cause an associated terminal selector to connect to the calling line.

7. A line selecting equipment, as defined in claim 2, further comprising a plurality of registers accessible to the call finders, means in the marker for controlling the call finder connector when the line position indication has been received thereby to select a call finder having access to at least one free register.

8. A line selecting equipment comprising a plurality of lines arranged in groups, a plurality of sub-groups selectors also arranged in groups and having access to said lines, a plurality of sub-group selector connectors, there being one for each group of sub-group selectors, a marker, a plurality of impulse-receivers, there being one for each sub-group selector connectors, means for seizing a sub-group selector when a call is received for a line associated with said selector, means for causing the associated sub-group selector connector to hunt for the seized sub-group selector and to connect it to the associated impulse-receiver, means in said impulse-receiver for receiving a portion of the call number characterizing the call within the group, means thereupon to connect said receiver to said marker, and means in said marker for causing said sub-group selector to connect to the called line.

9. A line selecting equipment, as defined in claim 8, further comprising a plurality of cooperating selectors connected in the banks of the sub-group selectors so as to be directly accessible thereto, the grouping of said cooperating selectors on the banks of the sub-group selectors being such that said cooperating selectors will be chosen last by said sub-group selectors, said cooperating selectors also having access to said lines.

10. Line selecting equipment, as defined in claim 2, further comprising means for temporarily establishing a circuit from a calling line to the outlet of a selected call finder over the selected terminal selector, the terminal selector connector associated therewith, the marker, and the call finder connector associated with said call finder, and means for transmitting over said circuit additional indications relating to the calling line.

11. Line selecting equipment, as defined in claim 2, further comprising a line circuit for each line including a cutoff relay, means in the marker for testing a line and, if free, marking it busy before establishing the connection across the various selectors by applying a special potential to said line which can not operate said cut-off relay or stop the hunting operation for the calling line but can operate the testing means, whereby said cut-off relay operates only after the selected terminal selector has been connected to the called line.

12. A line selecting equipment, as defined in claim 2, in which each line has a test wire and there are a plurality of independent sets of terminal selectors, call finders, and sub-group selectors, together with the associated terminal selector connectors, call finder connectors, sub-group selector connectors, impulse-receivers, and markers, each of said sets being connected to a given line and being adapted to serve said given line, and in which each marker has a line-testing device comprising a high resistance relay adapted to be connected to the test wire of a selected line and indicating by its operation or lack of operation the free or busy condition of said line, a low resistance relay adapted to be connected to said test wire by the operation of said high resistance relay in order to mark the associated line as busy and to indicate when it operates that said line is not being tested by two markers simultaneously, a time device, means operated by said high resistance relay for initiating the operation of said time device, means operated by said low-resistance relay for arresting the operation of said time device, said time device adapted to operate after a predetermined time if said low resistance relay is not operated, means operated by said time device for disconnecting said associated low resistance relay, whereby the low resistance relay of a simultaneously testing marker whose time device has not yet operated is allowed to operate, means in each marker for releasing all the selectors between said marker and the selected line and the associated circuits of said selectors when said time device operates, and means in each marker for continuing the setting up of the connection when said low resistance relay operates.

13. An automatic telephone system comprising a plurality of lines, a register, means for connecting a calling one of said lines to said register, a selecting stage comprising a plurality of individual selector switches, each switch having a plurality of outlets, means adapted to be controlled by said register for seizing one of said individual selecting switches and connecting it to said calling line, a plurality of connectors, each serving a number of different individual selector switches, a plurality of impulse-receivers, each serving a number of different connectors, means in each connector for hunting for a seized individual selector switch associated therewith and connecting said selector switch to the impulse-receiver associated with said connector, means in each impulse-receiver for transmitting a signal to said register when it has been connected thereto through an individual selector switch, means in said register adapted to respond to said signal for transmitting signals to said impulse-receiver for determining the position of said seized individual selector switch, means in said impulse-receiver for registering said signals, means operated by said impulse-receiver for positioning said individual selector switch on an outlet identified by said signals when said signals have been registered in said impulse-receiver, a tester common to all said receivers, means for connecting said tester to an impulse-receiver when said impulse-receiver has registered said signals, means in said tester for testing the free or busy condition of a selected outlet and adapted to operate when said outlet is free, means operated by said testing means for causing said impulse-receiver to operate said individual selector switch to complete the connection to said selected outlet, and means operated by the operation of said individual selector switch for disconnecting said connector, said impulse-receiver and said tester.

References Cited in the file of this patent

UNITED STATES PATENTS

| | | |
|---|---|---|
| 2,412,258 | Gillings | Dec. 10, 1946 |
| 2,508,053 | Dehn et al. | May 16, 1950 |
| 2,587,103 | Boyer | Feb. 26, 1952 |
| 2,598,412 | Modee | May 27, 1952 |
| 2,761,012 | Murray et al. | Aug. 28, 1956 |